(12) United States Patent
Hayashibe et al.

(10) Patent No.: US 8,576,486 B2
(45) Date of Patent: Nov. 5, 2013

(54) OPTICAL FILM, ANTIREFLECTION OPTICAL ELEMENT AND MASTER

(75) Inventors: Kazuya Hayashibe, Saitama (JP); Sohmei Endoh, Miyagi (JP); Makiko Oikawa, Miyagi (JP); Shunichi Kajiya, Miyagi (JP)

(73) Assignee: Sony Corporation, Tokyo (JP)

( * ) Notice: Subject to any disclaimer, the term of this patent is extended or adjusted under 35 U.S.C. 154(b) by 349 days.

(21) Appl. No.: 12/744,210

(22) PCT Filed: Sep. 18, 2009

(86) PCT No.: PCT/JP2009/066870
§ 371 (c)(1),
(2), (4) Date: Sep. 1, 2010

(87) PCT Pub. No.: WO2010/035855
PCT Pub. Date: Apr. 1, 2010

(65) Prior Publication Data
US 2011/0235181 A1     Sep. 29, 2011

(30) Foreign Application Priority Data
Sep. 29, 2008 (JP) .................. P2008-250492

(51) Int. Cl.
*G02B 1/10* (2006.01)
(52) U.S. Cl.
USPC ........................................... 359/581
(58) Field of Classification Search
USPC ........................................... 359/581
See application file for complete search history.

(56) References Cited

U.S. PATENT DOCUMENTS

| 7,759,755 B2 * | 7/2010 | Adkisson et al. ............. 257/436 |
| 2007/0159698 A1 * | 7/2007 | Taguchi et al. ............... 359/586 |

FOREIGN PATENT DOCUMENTS

| JP | 2003-240904 | 8/2003 |
| JP | 2005-173120 | 6/2005 |
| JP | 2005-316393 | 11/2005 |
| JP | 2007-076242 | 3/2007 |
| JP | 2007-090656 | 4/2007 |
| JP | 2007-240854 | 9/2007 |
| JP | 2007-256340 | 10/2007 |
| JP | 2007-298918 | 11/2007 |
| JP | 2008-158013 | 7/2008 |
| JP | 2008-209448 | 9/2008 |
| WO | 2006-059696 | 6/2006 |

OTHER PUBLICATIONS

Japanese Office Action issued Mar. 19, 2013 in corresponding Japanese Patent Application No. 2008-250492.
Japanese Office Action issued Dec. 11, 2012 in corresponding Japanese Patent Application No. 2008-250492.
Japanese Patent Office Action issued Aug. 6, 2013 in corresponding Japanese Patent Application No. 2008-250492.

* cited by examiner

*Primary Examiner* — Alessandro Amari
(74) *Attorney, Agent, or Firm* — K&L Gates LLP

(57) ABSTRACT

An optical element includes a base and a large number of structures arranged on the surface of the base, the structures being projections or depressions. The structures are arranged at a pitch shorter than or equal to a wavelength of light in a use environment. An effective refractive index in the depth direction of the structures gradually increases toward the base and has two or more inflection points.

18 Claims, 45 Drawing Sheets

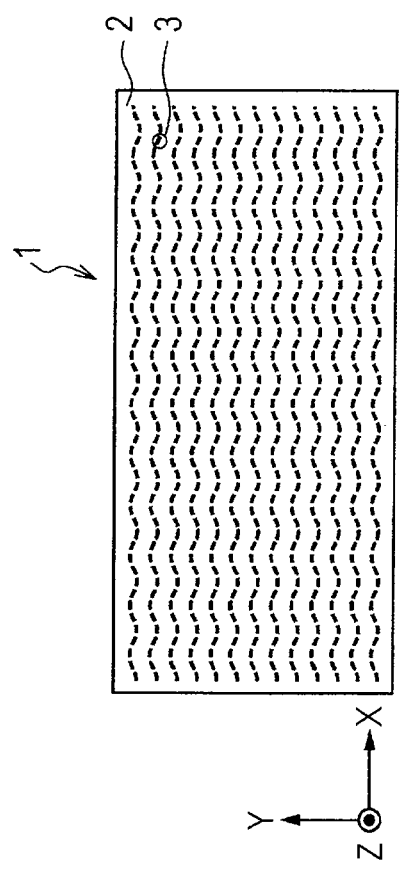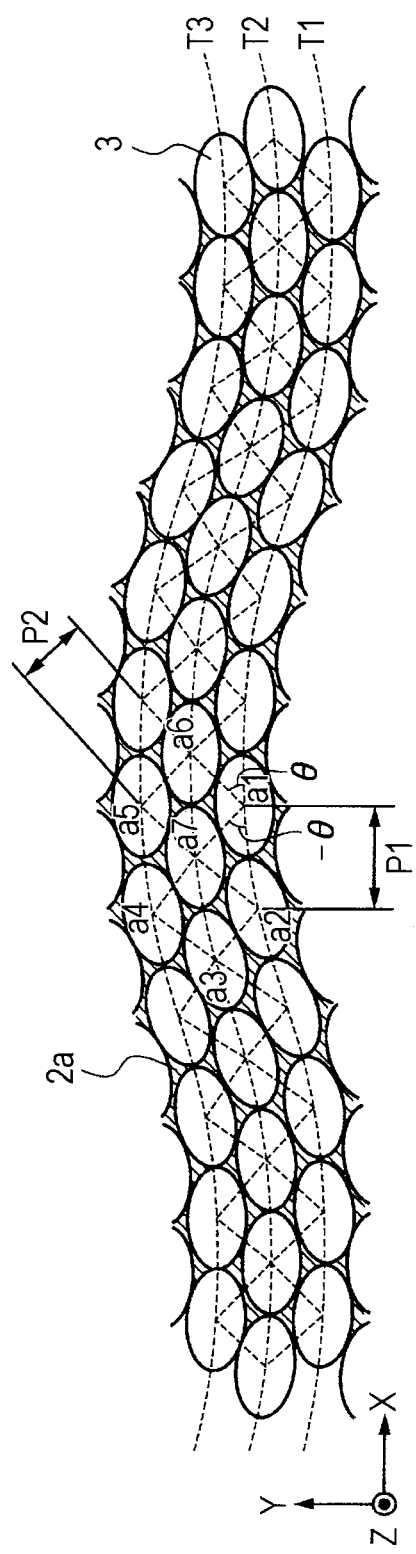

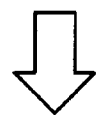

FIG. 22C

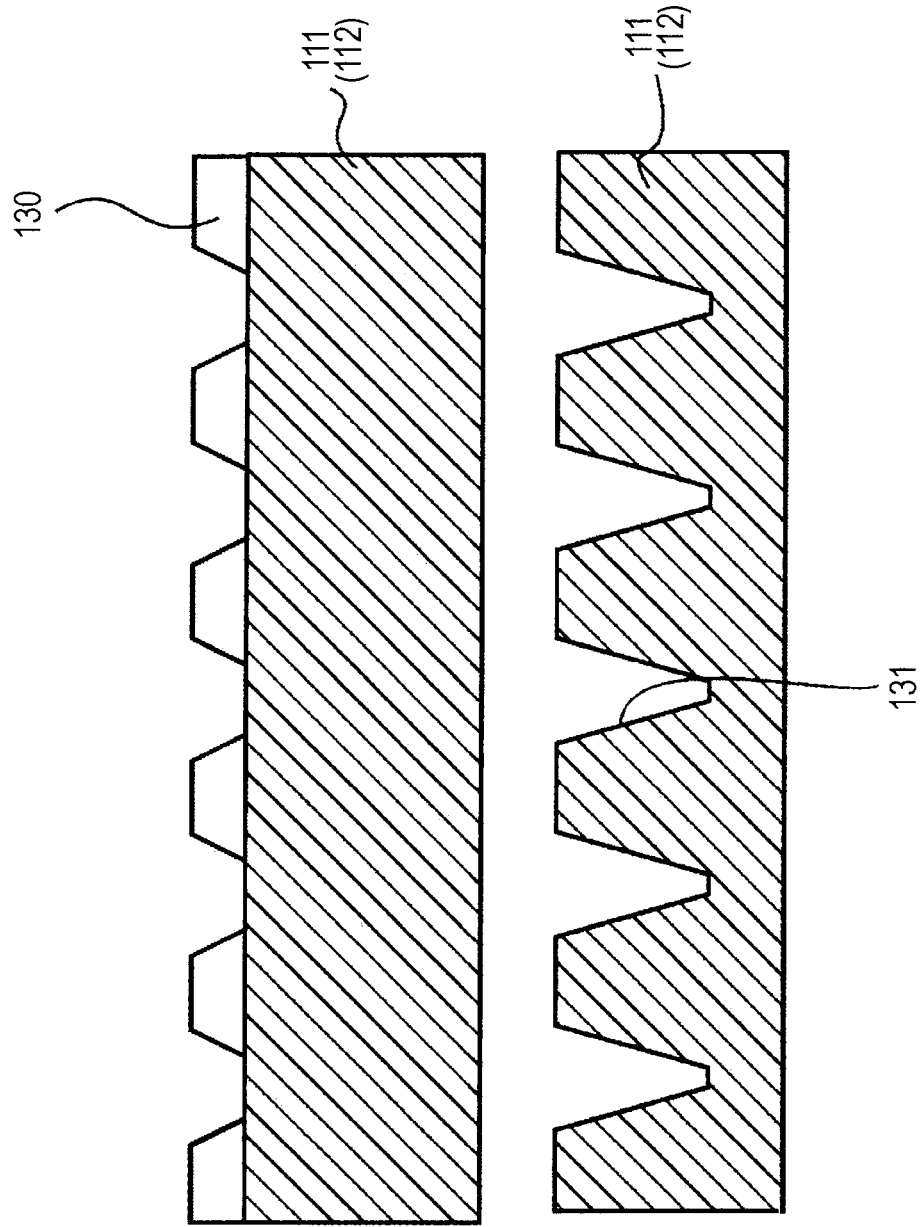

FIG. 36A
FIG. 36B
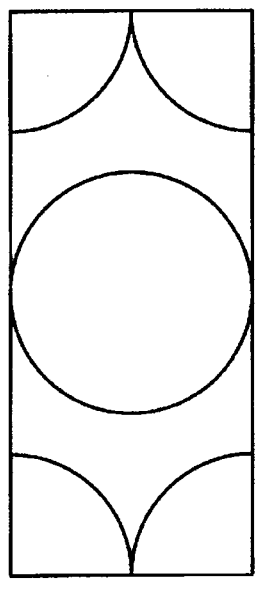
PITCH
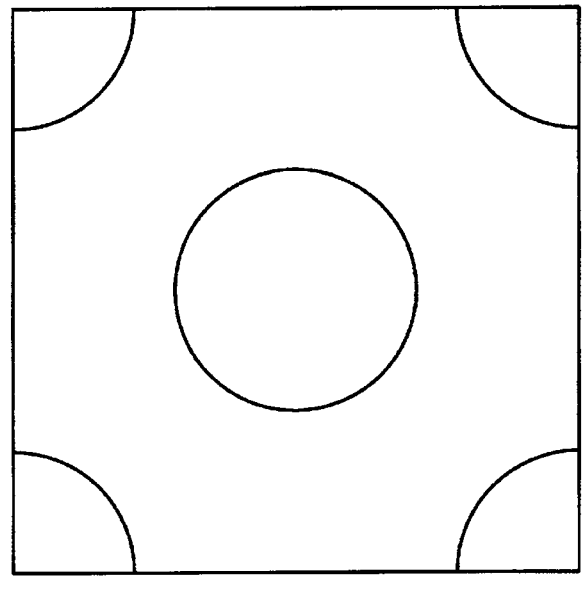
PITCH

EXAMPLE 1-3
· TWO INFLECTION POINTS
· HEXAGONAL LATTICE
PITCH: 400 nm, HEIGHT: 200 nm
(NOTE THAT THE ILLUSTRATED SIZE IS × 0.5)

EXAMPLE 1-2
· TWO INFLECTION POINTS
· HEXAGONAL LATTICE
PITCH: 100 nm, HEIGHT: 300 nm

EXAMPLE 1-1
· TWO INFLECTION POINTS
· HEXAGONAL LATTICE
PITCH: 200 nm, HEIGHT: 300 nm

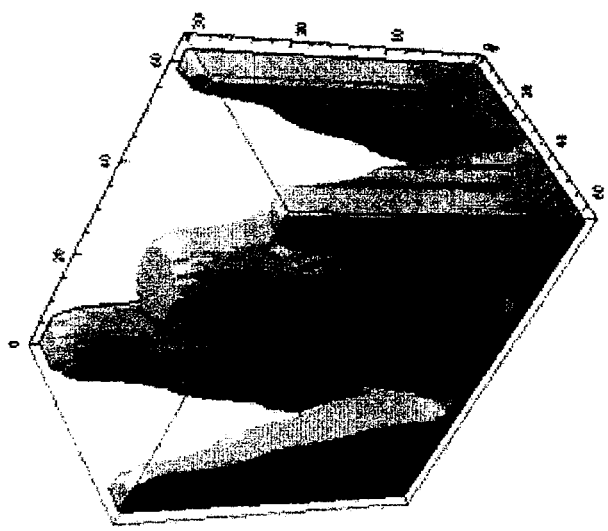

EXAMPLE 4-1
- FIVE INFLECTION POINTS
- TETRAGONAL LATTICE

PITCH: 200 nm, HEIGHT: 300 nm

EXAMPLE 4-2
- FIVE INFLECTION POINTS
- TETRAGONAL LATTICE

PITCH: 100 nm, HEIGHT: 300 nm

EXAMPLE 4-3
- FIVE INFLECTION POINTS
- TETRAGONAL LATTICE

PITCH: 400 nm, HEIGHT: 200 nm (NOTE THAT THE ILLUSTRATED SIZE IS × 0.5)

EXAMPLE 5
· THREE INFLECTION POINTS
· QUASI-HEXAGONAL LATTICE
  (THE LONG SIDES ARE
  LENGTHENED BY 30%)
PITCH: 200 nm, HEIGHT: 300 nm

EXAMPLE 6
· FIVE INFLECTION POINTS
· QUASI-HEXAGONAL LATTICE
  (THE LONG SIDES ARE
  LENGTHENED BY 30%)
PITCH: 200 nm, HEIGHT: 300 nm

EXAMPLE 7
· THREE
  INFLECTION
  POINTS
· HEXAGONAL
  LATTICE
PITCH: 200 nm, HEIGHT: 300 nm

OPTICAL FILM, ANTIREFLECTION OPTICAL ELEMENT AND MASTER

CROSS REFERENCE TO RELATED APPLICATIONS

The present application is a national stage of International Application No. PCT/JP2009/066870 filed on Sep. 18, 2009 and claims priority to Japanese Patent Application No. 2008-250492 filed on Sep. 29, 2008 the disclosures of which are incorporated herein by reference.

BACKGROUND

The present invention relates to an optical element, an optical component having an anti-reflection function, and a master. Specifically, the present invention relates to an optical element in which structures are arranged at a pitch shorter than or equal to a wavelength of light in a use environment.

Conventionally, in an optical element that uses a light-transmissive substrate composed of glass, plastic, or the like, surface treatment is performed to suppress the surface reflection of light. A method in which a minute and dense uneven structure (moth-eye structure) is formed on the surface of the optical element is exemplified as the surface treatment (e.g., refer to refer to "Optical and Electro-Optical Engineering Contact" Vol. 43, No. 11 (2005), 630-637).

In general, in the case where a periodic uneven shape is formed on the surface of an optical element, diffraction is generated when light passes through the periodic uneven shape, which considerably reduces the amount of the light component of transmitted light that goes straight. However, when the pitch of the uneven shape is shorter than the wavelength of light transmitted, diffraction is not generated. For example, if the uneven shape is rectangular, an anti-reflection effect that is effective for single-wavelength light corresponding to the pitch, depth, or the like can be achieved.

Since the above-described optical element has good anti-reflection characteristics, it is expected that the optical element is applied to a solar cell and a display device. The following is proposed as the uneven structure in which anti-reflection characteristics are taken into account.

A minute tent-shaped uneven structure (pitch: about 300 nm, depth: about 400 nm) is proposed as a structure manufactured using electron-beam exposure (e.g., refer to NTT Advanced Technology Corporation, "Master Mold for Forming Anti-reflection (Moth-eye) Structure having no wavelength dependence", [online], [accessed Sep. 1, 2008], Internet <http://keytech.ntt-at.co.jp/nano/prd_0033.html>).

Furthermore, a Super-RENS Technology Team, the Center for Applied Near-Field Optics Research of the Advanced Industrial Science and Technology has proposed a nano-hole structure with a diameter of 100 nm and a depth of 500 nm or more (e.g., refer to the National Institute of Advanced Industrial Science and Technology, "Development of Desktop Device Enabling Nanometer-scale Microfabrication", [online], [accessed Sep. 1, 2008], Internet <http://aist.go.jp/aist_i/press_release/pr2006/pr20060306/pr20060306.html>). Such a structure can be formed by a microstructure formation method that uses an optical disc recording apparatus. Specifically, such a structure can be formed using a nanomachining device based on a thermal lithography technology in which a visible light laser lithography method using a semiconductor laser (wavelength 406 nm) is combined with a thermally nonlinear material (e.g., refer to non-Patent Document 3).

In addition, the inventors of the present invention have proposed a structure having a hanging bell shape or a truncated elliptic cone-like shape (e.g., refer to International Publication No. 08/023,816 Pamphlet). In this structure, anti-reflection characteristics close to those of a structure obtained by electron-beam exposure are achieved. Furthermore, the structure can be manufactured by a method in which a process for making a master of optical discs is combined with an etching process.

SUMMARY

Technical Problem

In recent years, it has been desired that the visibility of various display devices such as a liquid crystal display device is further improved. To satisfy such a demand, it is important to further improve the above-described anti-reflection characteristics of optical elements.

Accordingly, an object of the present invention is to provide an optical element having good anti-reflection characteristics, an optical component having an anti-reflection function, and a master.

Technical Solution

To solve the problems described above, a first invention provides an optical element having an anti-reflection function, including:
a base; and
a large number of structures arranged on a surface of the base, the structures being projections or depressions,
wherein the structures are arranged in a hexagonal lattice, a quasi-hexagonal lattice, a tetragonal lattice, or a quasi-tetragonal lattice at a pitch shorter than or equal to a wavelength of light in a use environment, and
an effective refractive index in a depth direction of the structures gradually increases toward the base and has two or more inflection points.

A second invention provides an optical component having an anti-reflection function, including:
an optical component; and
a large number of structures arranged on a light-entering surface of the optical component, the structures being projections or depressions,
wherein the structures are arranged in a hexagonal lattice, a quasi-hexagonal lattice, a tetragonal lattice, or a quasi-tetragonal lattice at a pitch shorter than or equal to a wavelength of light in a use environment, and
an effective refractive index in a depth direction of the structures gradually increases toward a base and has two or more inflection points.

A third invention provides a master including:
a base; and
a large number of structures arranged on a surface of the base, the structures being projections or depressions,
wherein the structures are used for forming a surface shape of an optical element having an anti-reflection function,
the structures are periodically arranged in a hexagonal lattice, a quasi-hexagonal lattice, a tetragonal lattice, or a quasi-tetragonal lattice at a pitch shorter than or equal to a wavelength of light in an environment where the optical element is used, and
an effective refractive index in a depth direction of the optical element formed by the structures gradually increases toward the base of the optical element and has two or more inflection points.

A fourth invention provides an optical element having an anti-reflection function, including:
a base; and
a large number of structures arranged on a surface of the base, the structures being projections or depressions,
wherein the structures are arranged at a pitch shorter than or equal to a wavelength of light in a use environment,
the structures have a cone-like shape or an elliptic cone-like shape whose top has a curvature, or a truncated cone-like shape or a truncated elliptic cone-like shape, and
an effective refractive index in a depth direction of the structures gradually increases toward the base and has two or more inflection points.

A fifth invention provides an optical element having an anti-reflection function, including:
a base; and
a gradient film formed on the base,
wherein an effective refractive index in a depth direction of the gradient film gradually increases toward the base and has two or more inflection points.

In the present invention, the term "depth direction" means a direction that perpendicularly extends from the surface of the base to the inside of the base. Specifically, when the structures are projections, the depth direction is a direction that perpendicularly extends from the top to the bottom of the projections. When the structures are depressions, the depth direction is a direction that perpendicularly extends from the opening portion to the bottom of the depressions.

In the present invention, the term "tetragonal lattice" means a regular tetragonal lattice. The term "quasi-tetragonal lattice" means, unlike a regular tetragonal lattice, a distorted regular tetragonal lattice.

Specifically, when the structures are arranged linearly, the quasi-tetragonal lattice is a tetragonal lattice obtained by stretching and distorting a regular tetragonal lattice in the direction of the linear arrangement. When the structures are arranged in an arc-like shape, the quasi-tetragonal lattice is a tetragonal lattice obtained by distorting a regular tetragonal lattice in an arc-like shape or a tetragonal lattice obtained by distorting a regular tetragonal lattice in an arc-like shape and stretching and distorting it in the direction of the arc-shaped arrangement. When the structures are arranged in a meandering manner, the quasi-tetragonal lattice is a tetragonal lattice obtained by distorting a regular tetragonal lattice through the meandering arrangement of the structures. Alternatively, the quasi-tetragonal lattice is a tetragonal lattice obtained by stretching and distorting a regular tetragonal lattice in the direction (track direction) of the linear arrangement and distorting through the meandering arrangement of the structures.

In the present invention, the term "hexagonal lattice" means a regular hexagonal lattice. The term "quasi-hexagonal lattice" means, unlike a regular hexagonal lattice, a distorted regular hexagonal lattice.

Specifically, when the structures are arranged linearly, the quasi-hexagonal lattice is a hexagonal lattice obtained by stretching and distorting a regular hexagonal lattice in the direction of the linear arrangement. When the structures are arranged in an arc-like shape, the quasi-hexagonal lattice is a hexagonal lattice obtained by distorting a regular hexagonal lattice in an arc-like shape or a hexagonal lattice obtained by distorting a regular hexagonal lattice in an arc-like shape and stretching and distorting it in the direction of the arc-shaped arrangement. When the structures are arranged in a meandering manner, the quasi-hexagonal lattice is a hexagonal lattice obtained by distorting a regular hexagonal lattice through the meandering arrangement of the structures. Alternatively, the quasi-hexagonal lattice is a hexagonal lattice obtained by stretching and distorting a regular hexagonal lattice in the direction (track direction) of the linear arrangement and distorting through the meandering arrangement of the structures.

In the present invention, the term "ellipse" includes not only mathematically defined perfect ellipses but also ellipses having some distortion. The term "circle" includes not only mathematically defined perfect circles but also circles having some distortion.

In the first to fourth inventions, the effective refractive index in the depth direction of the structures gradually increases and has two or more inflection points, whereby an interference effect can be produced on the surface of the base while a shape effect of the structures is used. Thus, the reflected light on the surface of the base can be reduced.

In the fifth invention, the effective refractive index in the depth direction of the gradient film gradually increases and has two or more inflection points, whereby an interference effect can be produced on the surface of the base. Thus, the reflected light on the surface of the base can be reduced.

Advantageous Effects

As described above, according to the present invention, an optical element having good anti-reflection characteristics can be provided.

Additional features and advantages of the present invention are described in, and will be apparent from, the following Detailed Description and the Figures.

BRIEF DESCRIPTION OF FIGURES

FIG. 21A is a schematic plan view showing an example of a configuration of an optical element according to a ninth embodiment of the present invention.

FIG. 21B is a partially enlarged plan view of the optical element shown in FIG. 21A.

FIGS. 22A to 22D are processing charts for describing a method for manufacturing an optical element according to a tenth embodiment of the present invention.

FIGS. 35A and 35B are schematic views of principal parts that describe an application example in which the present invention is applied to the surface of a Si substrate of the silicon solar cell.

FIG. 36 is a schematic view showing an pitch of structures in Examples.

FIG. 39 is a perspective view showing the shape of structures in Examples 3-1 to 3-3.

DETAILED DESCRIPTION

Figure 1:
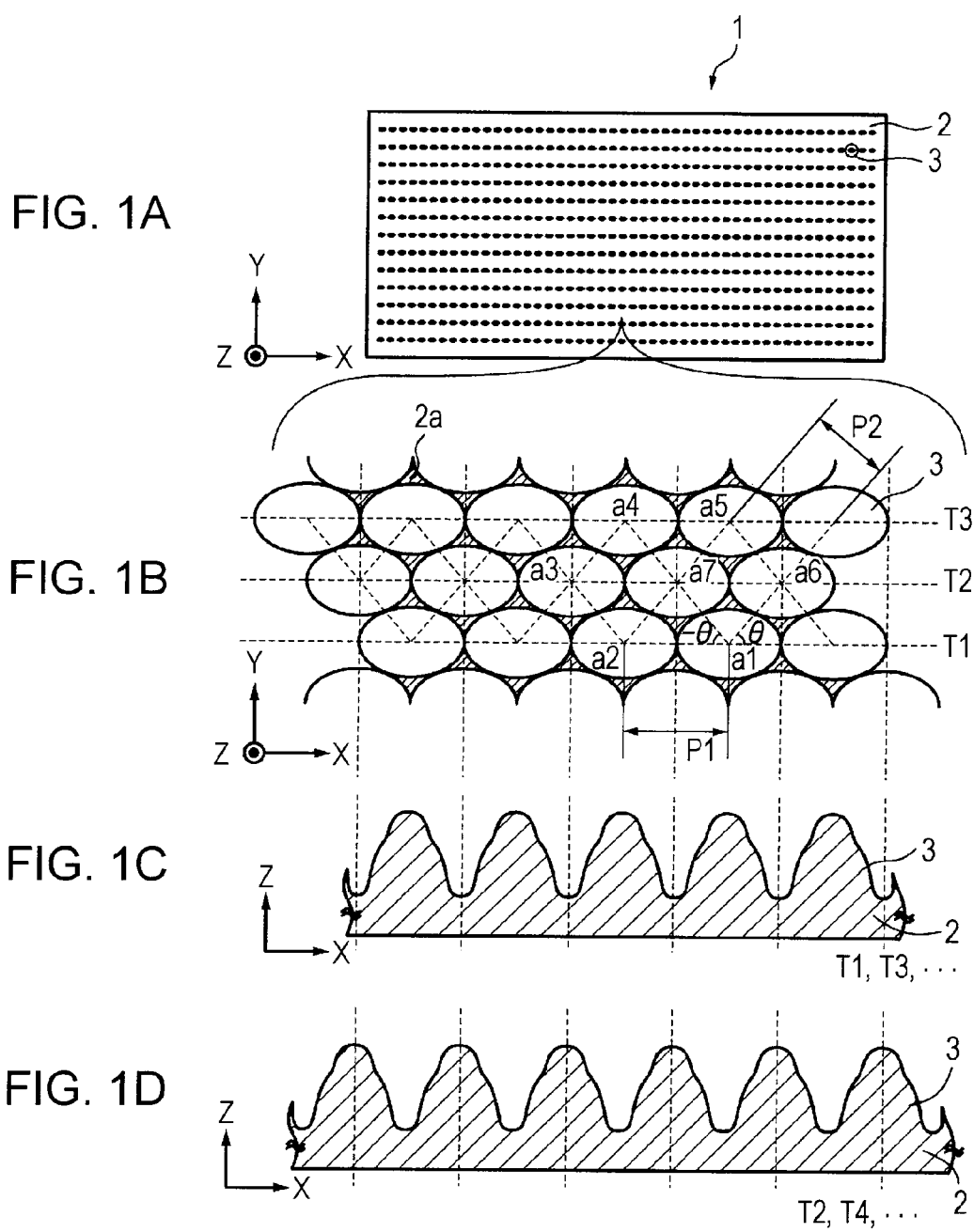
FIG. 1A is a schematic plan view showing an example of a configuration of an optical element according to a first embodiment of the present invention.
FIG. 1B is a partially enlarged plan view of the optical element shown in FIG. 1A.
FIG. 1C is a sectional view taken along track T1, T3, . . . of FIG. 1B.
FIG. 1D is a sectional view taken along track T2, T4, . . . of FIG. 1B.

Embodiments of the present invention are described with reference to the attached drawings in the following order.
1. First Embodiment (an example in which structures are two-dimensionally arranged linearly in a hexagonal lattice: refer to FIGS. 1A and 1B)
2. Second Embodiment (an example in which structures are two-dimensionally arranged in an arc-like shape in a hexagonal lattice: refer to FIGS. 10A and 10B)
3. Third Embodiment (an example in which structures are two-dimensionally arranged linearly in a tetragonal lattice: refer to FIGS. 13A and 13B)
4. Fourth Embodiment (an example in which secondary structures are arranged in addition to primary structures: refer to FIGS. 14C and 14D)
5. Fifth Embodiment (an example in which structures that are depressions are formed on the surface of a base: refer to FIG. 17)
6. Sixth Embodiment (an example in which pillar-shaped structures are one-dimensionally arranged: refer to FIG. 18)
7. Seventh Embodiment (an example of structures having parallel steps: refer to FIG. 19)
8. Eighth Embodiment (an example in which a thin film is formed instead of structures: refer to FIG. 20)
9. Ninth Embodiment (an example in which structures are arranged in a meandering manner: refer to FIG. 21)
10. Tenth Embodiment (an example of an optical element manufactured using a room-temperature nanoimprinting technology: refer to FIGS. 22A to 22D)
11. Eleventh Embodiment (an example of an optical element without a base: refer to FIG. 23)
12. Twelfth Embodiment (a first application example to a display device: refer to FIG. 24)
13. Thirteenth Embodiment (a second application example to a display device: refer to FIG. 25)
14. Fourteenth Embodiment (an application example to a package of an image sensor element: refer to FIG. 26)
15. Fifteenth Embodiment (an example in which a light-absorbing layer is formed on the back of an optical element: refer to FIG. 27)
16. Sixteenth Embodiment (an example in which an optical element itself has light absorbency: refer to FIG. 28)
17. Seventeenth Embodiment (an example in which an optical element is provided in a barrel: refer to FIG. 29)
18. Eighteenth Embodiment (an example in which a transparent conductive film is formed on one principal surface of an optical element: refer to FIG. 30)
19. Nineteenth Embodiment (an example in which structures are formed on both principal surfaces of an optical element: refer to FIG. 31)
20. Twentieth Embodiment (an application example to a touch panel: refer to FIGS. 32A and 32B)
21. Twenty-first Embodiment (an application example to a dye-sensitized solar cell: refer to FIG. 33)
22. Twenty-second Embodiment (an application example to a silicon solar cell: refer to FIG. 34)

<1. First Embodiment>
[Configuration of Optical Element]

FIG. 1A is a schematic plan view showing an example of a configuration of an optical element according to a first embodiment of the present invention. FIG. 1B is a partially enlarged plan view of the optical element shown in FIG. 1A. FIG. 1C is a sectional view taken along track T1, T3, . . . of FIG. 1B. FIG. 1D is a sectional view taken along track T2, T4, . . . of FIG. 1B.

An optical element 1 is suitably applied to various optical components used for displays, optoelectronics, optical communications (optical fibers), solar cells, and luminaries. Specifically, one of a polarizer, a lens, an optical waveguide, a window material, and a display element can be exemplified as the optical component, for example.

The optical element 1 includes a base 2 having a front surface (first principal surface) and a back surface (second principal surface) facing each other and structures 3 that are projections and are formed on the front surface of the base 2. The optical element 1 has an anti-reflection function against light that enters the front surface of the base on which the structures 3 are formed. Hereinafter, as shown in FIG. 1, two axes orthogonal to each other in one principal surface of the base 2 are referred to as an X axis and a Y axis and an axis perpendicular to the principal surface of the base 2 is referred to as a Z axis. Furthermore, when gaps 2a are present between the structures 3, a minute uneven shape is preferably provided to the gaps 2a. By providing such a minute uneven shape, the reflectivity of the optical element 1 can be further reduced.

Figure 2:
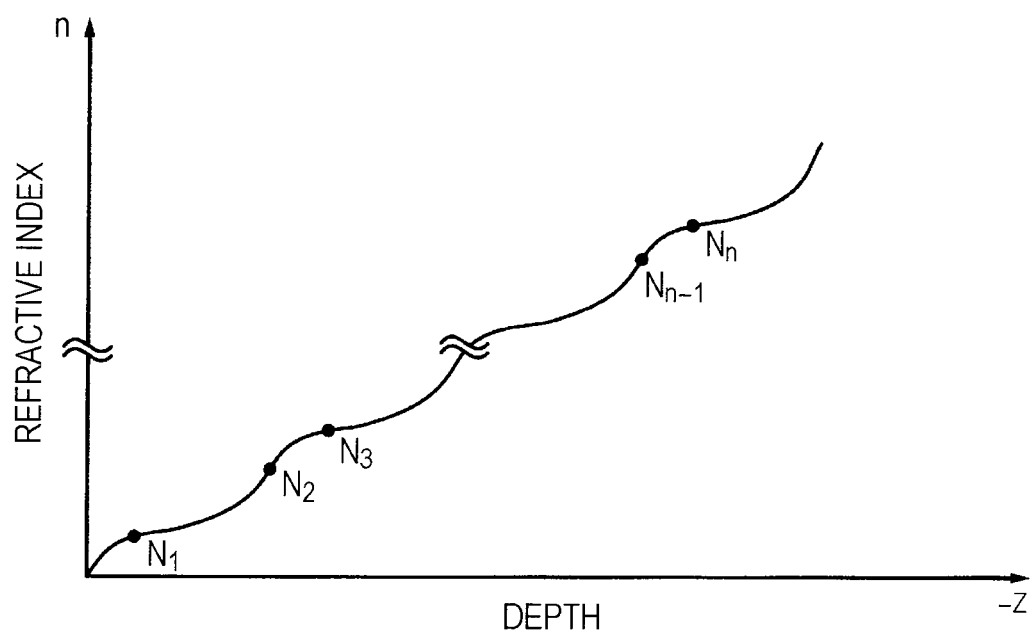
FIG. 2 is a graph showing an example of a refractive index profile of the optical element according to the first embodiment of the present invention.

FIG. 2 shows an example of a refractive index profile of the optical element according to the first embodiment of the present invention. As shown in FIG. 2, the effective refractive index in the depth direction (−Z axis direction in FIG. 1) of the structures 3 gradually increases and has two or more inflection points $N_1, N_2, \ldots, N_n$ (n: an integer of 2 or more). This reduces reflected light because of an interference effect of light, which can improve the anti-reflection characteristics of the optical element. The change in the effective refractive index in the depth direction is preferably a monotonic increase. Furthermore, the change in the effective refractive index in the depth direction is preferably greater on the top side of the structures 3 than an average of a slope of the effective refractive index and is also preferably greater on the base side of the structures 3. This can improve ease of transference while good optical characteristics are achieved.

Hereinafter, the base 2 and the structures 3 constituting the optical element 1 are described in order below.

(Base)

The base 2 is a transparent base having transparency. The base 2 is mainly composed of, for example, a transparent synthetic resin such as polycarbonate (PC) or polyethylene terephthalate (PET) or glass, but the material of the base 2 is not particularly limited to these materials.

The base 2 is, for example, in the shape of a film, sheet, plate, or block, but the shape of the base 2 is not particularly limited to these shapes. The shape of the base 2 is preferably selected and determined in accordance with the shape of the main body of each of various optical devices that require predetermined anti-reflection functions such as displays, optoelectronic devices, optical communication devices, solar cells, and illuminating devices or in accordance with the shape of a sheet- or film-shaped anti-reflection component attached to each of the optical devices.

(Structure)

Figure 3:
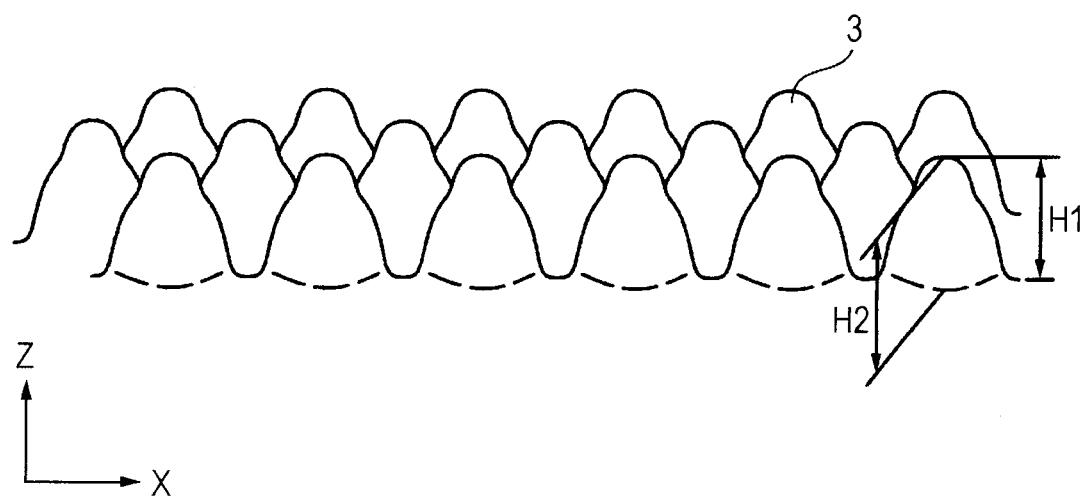
FIG. 3 is a partially enlarged perspective view of the optical element shown in FIG. 1.

FIG. 3 is a partially enlarged perspective view of the optical element shown in FIG. 1. A large number of structures 3 that are projections are arranged on the surface of the base 2. The structures 3 are periodically and two-dimensionally arranged at a pitch shorter than or equal to a wavelength of light in a use environment, for example, at a pitch substantially equal to a wavelength of visible light. The light in the use environment is, for example, ultraviolet light, visible light, or infrared light. Herein, the ultraviolet light is light having a wavelength of 10 nm to 360 nm. The visible light is light having a wavelength of 360 nm to 830 nm. The infrared light is light having a wavelength of 830 nm to 1 mm.

The structures 3 of the optical element 1 has a configuration including multiple rows of tracks T1, T2, T3, . . . (hereinafter collectively referred to as "track T") provided on the surface of the base 2. Herein, the track is a region where the structures 3 are linearly arranged in rows.

In the two adjacent tracks T, the structures 3 arranged on one track are shifted by half a pitch from the structures 3 arranged on the other track. Specifically, in the two adjacent tracks T, at the intermediate positions (at the positions shifted by half a pitch) between the structures 3 arranged on one track (e.g., T1), the structures 3 on the other track (e.g., T2) are disposed. Consequently, as shown in FIG. 1B, in the three adjacent rows of tracks (T1 to T3), the structures 3 are arranged so as to form a hexagonal lattice pattern or a quasi-hexagonal lattice pattern with the centers of the structures 3 being positioned at points a1 to a7. In the first embodiment, the term "hexagonal lattice pattern" means a lattice pattern having a regular hexagonal shape. In addition, the term "quasi-hexagonal lattice pattern" means, unlike a lattice pattern having a regular hexagonal shape, a hexagonal lattice pattern that is stretched and distorted in the track extending direction (X axis direction).

When the structures 3 are arranged so as to form a quasi-hexagonal lattice pattern, as shown in FIG. 1B, the arrangement pitch P1 (distance between a1 and a2) of the structures 3 on the same track (e.g., T1) is preferably longer than the arrangement pitch of the structures 3 between the two adjacent tracks (e.g., T1 and T2), that is, the arrangement pitch P2 (e.g., distance between a1 and a7 or a2 and a7) of the structures 3 in the ±θ direction with respect to the track extending direction. By arranging the structures 3 in such a manner, the packing density of the structures 3 can be further improved.

The height (depth) of the structures 3 is not particularly limited, and is appropriately set in accordance with the wavelength range of light to be transmitted. The height of the structures 3 is preferably smaller than or equal to the average wavelength of light in a use environment. Specifically, when visible light is transmitted, the height (depth) of the structures 3 is preferably 150 nm to 500 nm. The aspect ratio (height H/arrangement pitch P) of the structures 3 is preferably set in the range of 0.81 to 1.46. If the aspect ratio is less than 0.81, the reflection characteristics and transmission characteristics tend to decrease. If the aspect ratio is more than 1.46, the releasing property is decreased during manufacturing of the optical element 1 and it tends to be difficult to remove a replicated replica properly.

Note that, in the present invention, the aspect ratio is defined by formula (1) below:

$$\text{Aspect ratio} = H/P \quad (1)$$

where H is the height of the structures 3, and P is the average arrangement pitch (average period).

Herein, the average arrangement pitch P is defined by formula (2) below:

$$\text{Average arrangement pitch } P = (P1 + P2 + P2)/3 \quad (2)$$

where P1 is the arrangement pitch in the track extending direction (period in the track extending direction), and P2 is the arrangement pitch in the ±θ direction with respect to the track extending direction (where θ=60°−δ, where preferably 0°<δ≤11°, and more preferably 3°≤δ≤6°) (period in the θ direction).

Furthermore, the height H of the structures 3 is the height H2 in the column direction of the structures 3 (refer to FIG. 3). Herein, the term "column direction" means a direction (Y axis direction) orthogonal to the track extending direction (X axis direction) in the surface of the base. When the optical element 1 is manufactured by the manufacturing method described below, the height H1 in the track extending direction of the structures 3 is preferably smaller than the height H2 in the column direction. By satisfying such a relationship of the heights, in the manufacturing method described below, the height of portions other than the portions located in the track extending direction of the structures 3 is substantially the same as the height H2 in the column direction. Therefore, the height H of the structures 3 is represented by the height H2 in the column direction.

In FIG. 3, each of the structures 3 has the same shape. However, the shape of the structures 3 is not limited thereto. The structures 3 having two or more different shapes may be formed on the surface of the base. Furthermore, the structures 3 may be integrally formed with the base 2.

In addition, the structures 3 do not necessarily have the same aspect ratio. The structures 3 may be configured so as to have a certain height distribution (e.g., in the range of about 0.83 to 1.46 in terms of an aspect ratio). By disposing the structures 3 having the height distribution, the wavelength dependence of reflection characteristics can be reduced. Consequently, an optical element 1 having good anti-reflection characteristics can be realized.

The term "height distribution" means that the structures 3 having two or more different heights (depths) are disposed on the surface of the base 2. That is, it means that structures 3 having a reference height and structures 3 having a height different from the reference height are disposed on the surface of the base 2. The structures 3 having a height different from the reference height are disposed, for example, on the surface of the base 2 periodically or aperiodically (at random). For example, the track extending direction, the column direction, or the like may be exemplified as the direction of the periodicity.

Preferably, the structures 3 are mainly composed of, for example, an ionizing radiation curable resin that is cured through ultraviolet rays or electron beams or a thermosetting resin that is cured through heat. Most preferably, the structures 3 are mainly composed of an ultraviolet curable resin that is cured through ultraviolet rays.

Figure 4:
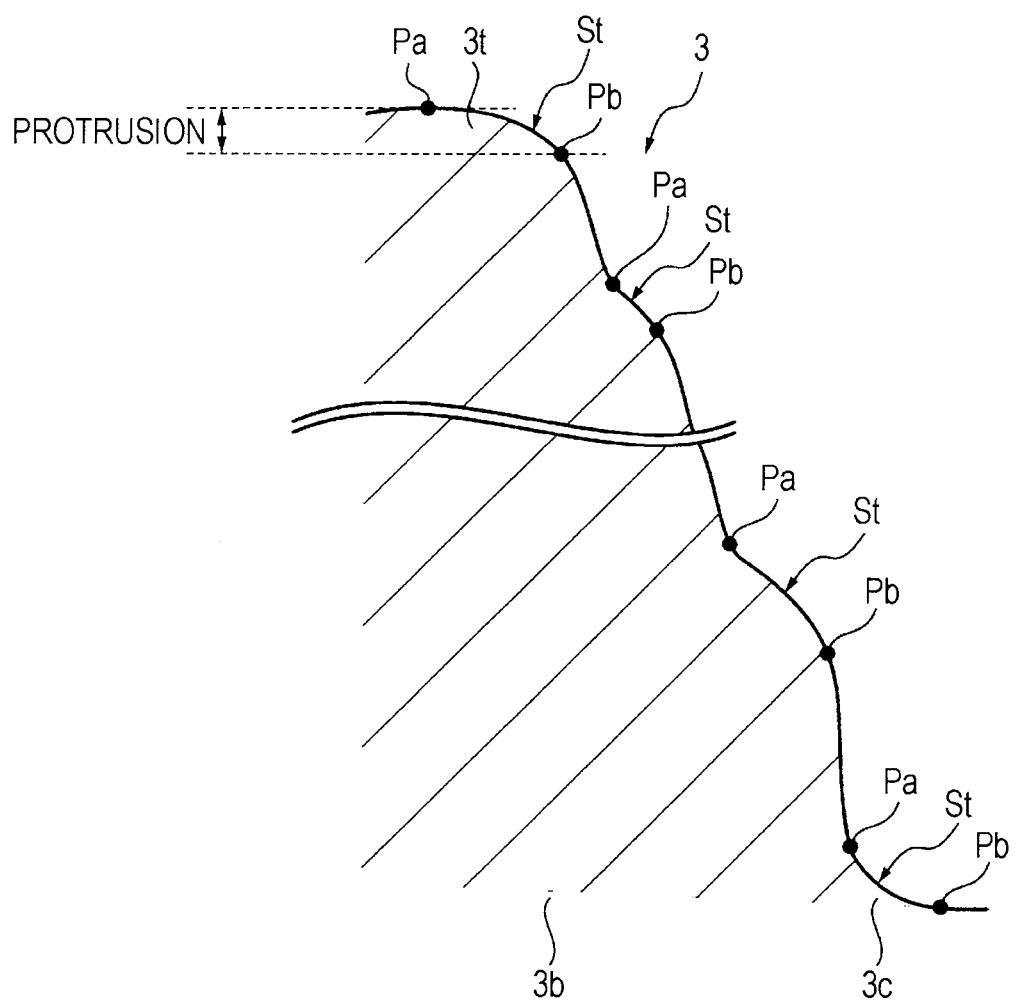
FIG. 4 is a sectional view showing an example of a shape of structures.

FIG. 4 is a sectional view showing an example of the shape of the structures. The structures 3 preferably have a curved surface so as to become wider from the top 3t to the bottom 3b of the structures 3. By providing such a shape, ease of transference can be improved.

The top 3t of the structures 3 has, for example, a flat surface or a convex curved surface. Preferably, the top 3t has a convex curved surface. By providing such a convex curved surface, the durability of the optical element 1 can be improved. Furthermore, a low refractive index layer having a lower refractive index than the structures 3 may be formed on the top 3t of the structures 3. By forming such a low refractive index layer, the reflectivity can be reduced.

The curved surface of the structures 3 preferably has two pairs or more of a first changing point Pa and a second changing point Pb formed in that order in the direction from the top $3t$ to the bottom $3b$. As a result, the effective refractive index in the depth direction (−Z axis direction in FIG. 1) of the structures 3 can have two or more inflection points. Herein, the uppermost point of the top $3t$ is also a first changing point Pa and the lowermost point of the bottom $3b$ is also a second changing point Pb.

In addition, at least one pair of a first changing point and a second changing point formed in that order in the direction from the top $3t$ to the bottom $3b$ of the structures 3 are preferably formed on the side surface of the structures 3 excluding the top $3t$ and the bottom $3b$. In this case, the slope in the direction from the top $3t$ to the bottom $3b$ of the structures 3 preferably becomes gentler at the first changing point Pa and then becomes steeper at the second changing point Pb. Moreover, as described above, when at least one pair of the first changing point Pa and the second changing point Pb formed in that order are formed, the top $3t$ of the structures 3 preferably has a convex curved surface or a hem $3c$ that broadens with a gradually decreasing slope is preferably formed (refer to FIG. 4).

Herein, the first changing point and the second changing point are defined as follows.

Figures 5A, 5B, 5C:
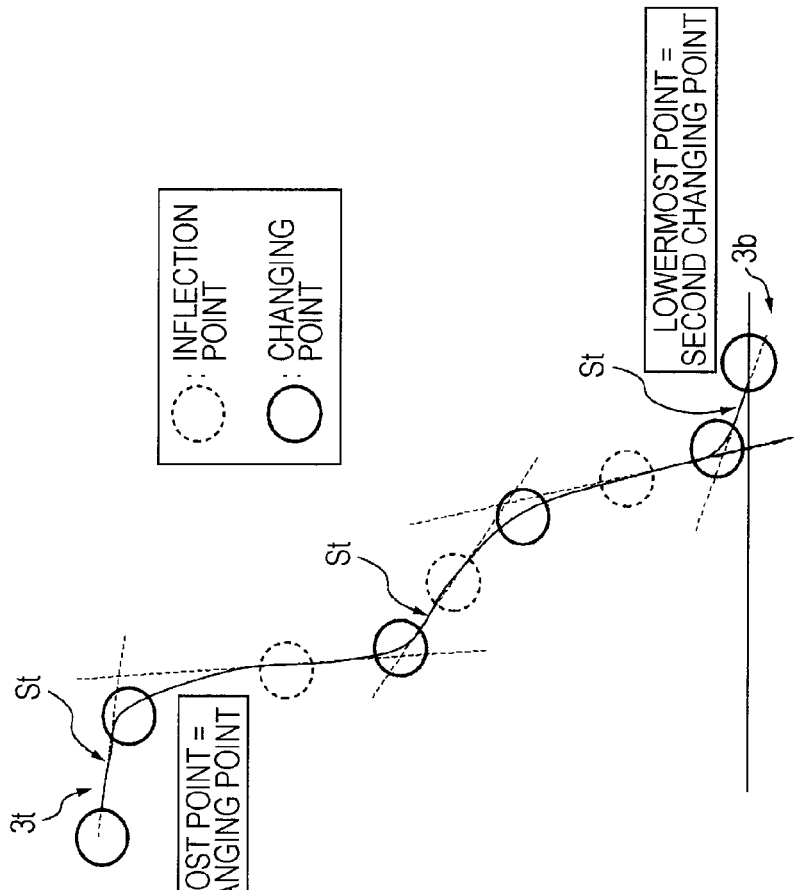
FIGS. 5A to 5C are diagrams for describing the definition of changing points.

As shown in FIGS. 5A and 5B, in the case where the surface from the top $3t$ to the bottom $3b$ of the structures 3 is formed by joining a plurality of smooth curved surfaces in a discontinuous manner in the direction from the top $3t$ to the bottom $3b$ of the structures 3, the joining points are the changing points. The changing points match the inflection points. Although differentiation cannot be performed accurately at the joining points, the inflection points taken as limit are also referred to as an inflection point. When the structures 3 have the above-described curved surface, as shown in FIG. 4, the slope in the direction from the top $3t$ to the bottom $3b$ of the structures 3 preferably becomes gentler at the first changing point Pa and then becomes steeper at the second changing point Pb.

As shown in FIG. 5C, in the case where the surface from the top $3t$ to the bottom $3b$ of the structures 3 is formed by joining a plurality of smooth curved surfaces in a continuous manner in the direction from the top $3t$ to the bottom $3b$ of the structures 3, the changing points are defined as follows. As shown in FIG. 5C, the points, on the curved line, closest from intersection points at which tangent lines of inflection points, the uppermost point, and the lowermost point intersect with each other are referred to as a changing point. Furthermore, as described above, the uppermost point is the first changing point at the top $3t$ and the lowermost point is the second changing point at the bottom $3b$.

The structures 3 preferably have two or more slope steps St, more preferably two or more and ten or less slope steps St on the surface between the top $3t$ and the bottom $3b$. Specifically, the structures 3 preferably have two or more steps between the top $3t$ and the bottom $3b$, the steps including either the top $3t$ or the bottom $3b$ or both the top $3t$ and the bottom $3b$. When the number of slope steps St is two or more, the effective refractive index in the depth direction (−Z axis direction in FIG. 1) of the structures 3 can have two or more inflection points $N_1, N_2, \ldots, N_n$ (n: an integer of 2 or more). Moreover, when the number of slope steps St is ten or less, the structures 3 can be easily manufactured.

The term "slope step St" means a step that is inclined but is not parallel to the surface of the base. By making the step St be inclined with respect to the surface of the base rather than making the step St be parallel with the surface of the base, ease of transference can be improved. Herein, the slope step St is a section defined by the above-described first changing point Pa and second changing point Pb. Furthermore, the slope step St is a concept including a protrusion at the top $3t$ and a hem $3c$ at the bottom $3b$ as shown in FIG. 4. In other words, a section defined by the first changing point Pa and the second changing point at the top $3t$ and a section defined by the first changing point Pa and second changing point Pb at the bottom $3b$ are also referred to as slope steps St.

A conical form can be exemplified as the entire shape of the structures 3. Examples of the conical form include a cone-like shape, a truncated cone-like shape, an elliptic cone-like shape, a truncated elliptic cone-like shape, a cone-like shape whose top has a curvature, and an elliptic cone-like shape whose top has a curvature. Herein, as described above, the conical form has a concept including an elliptic cone-like shape, a truncated elliptic cone-like shape, a cone-like shape whose top has a curvature, and an elliptic cone-like shape whose top has a curvature in addition to a cone-like shape and a truncated cone-like shape. Moreover, the truncated cone-like shape is a shape obtained by removing the top of a cone-like shape from the cone-like shape. The truncated elliptic cone-like shape is a shape obtained by removing the top of an elliptic cone-like shape from the elliptic cone-like shape. Furthermore, the entire shape of the structures 3 is not limited to these shapes, and needs only to be a shape in which the effective refractive index in the depth direction of the structures 3 gradually increases toward the base 2 and has two or more inflection points.

The structures 3 having an elliptic cone-like shape are structures having a conical form in which the bottom face is in the shape of an ellipse, an oblong, or an oval with a major axis and a minor axis, and the top has a curved surface. The structures 3 having a truncated elliptic cone-like shape are structures having a conical form in which the bottom face is in the shape of an ellipse, an oblong, or an oval with a major axis and a minor axis, and the top has a flat surface. When the structures 3 have an elliptic cone-like shape or a truncated elliptic cone-like shape, the structures 3 are preferably disposed on the surface of the base such that the major axis of the bottom face of the structures 3 is directed in the track extending direction (X axis direction).

The cross section of the structures 3 changes in the depth direction of the structures 3 so as to correspond to the above-described refractive index profile. Preferably, the cross section of the structures 3 monotonically increases as the depth of the structures 3 increases. Herein, the cross section of the structures 3 means an area of a section that is parallel to the surface of the base where the structures 3 are arranged.

[Configuration of Roll Master]

Figure 6A:
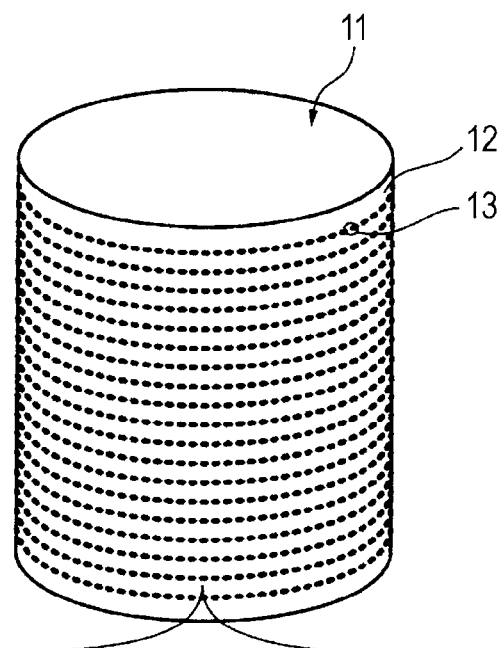
FIG. 6A is a perspective view showing an example of a configuration of a roll master for manufacturing the optical element according to the first embodiment of the present invention.
Figure 6B:
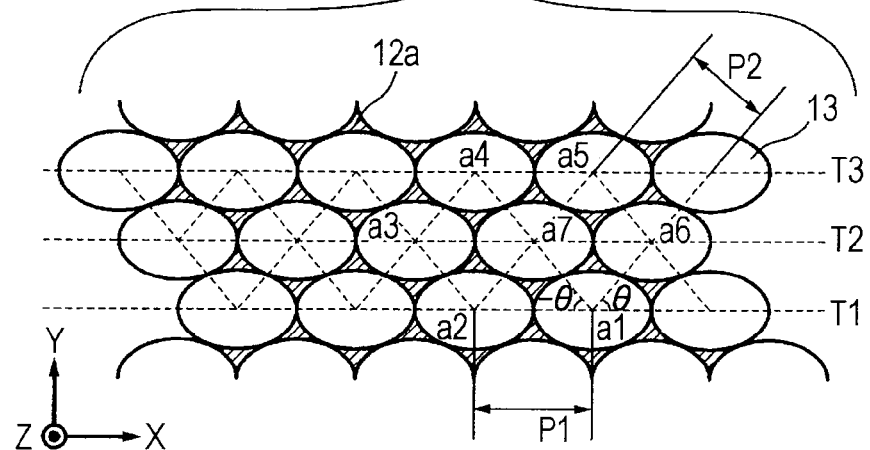
FIG. 6B is an enlarged plan view of the surface of the roll master shown in FIG. 6A.

FIG. 6 shows an example of a configuration of a roll master for manufacturing the optical element having the above-described configuration. As shown in FIG. 6, a roll master 11 includes a large number of structures 13 that are depressions and are arranged on the surface of a cylinder- or column-shaped master 12. The structures 13 are periodically and two-dimensionally arranged at a pitch shorter than or equal to a wavelength of light in an environment where the optical element 1 is used, for example, at a pitch substantially equal to a wavelength of visible light. The structures 13 are arranged on the surface of the cylinder- or column-shaped master 12, for example, in a concentric or spiral manner. The structures 13 are used for forming the structures 3 that are projections on the surface of the above-described base 2. The master 12 can be composed of, for example, glass, but the material is not particularly limited thereto.

[Method for Manufacturing Optical Element]

Figure 7:
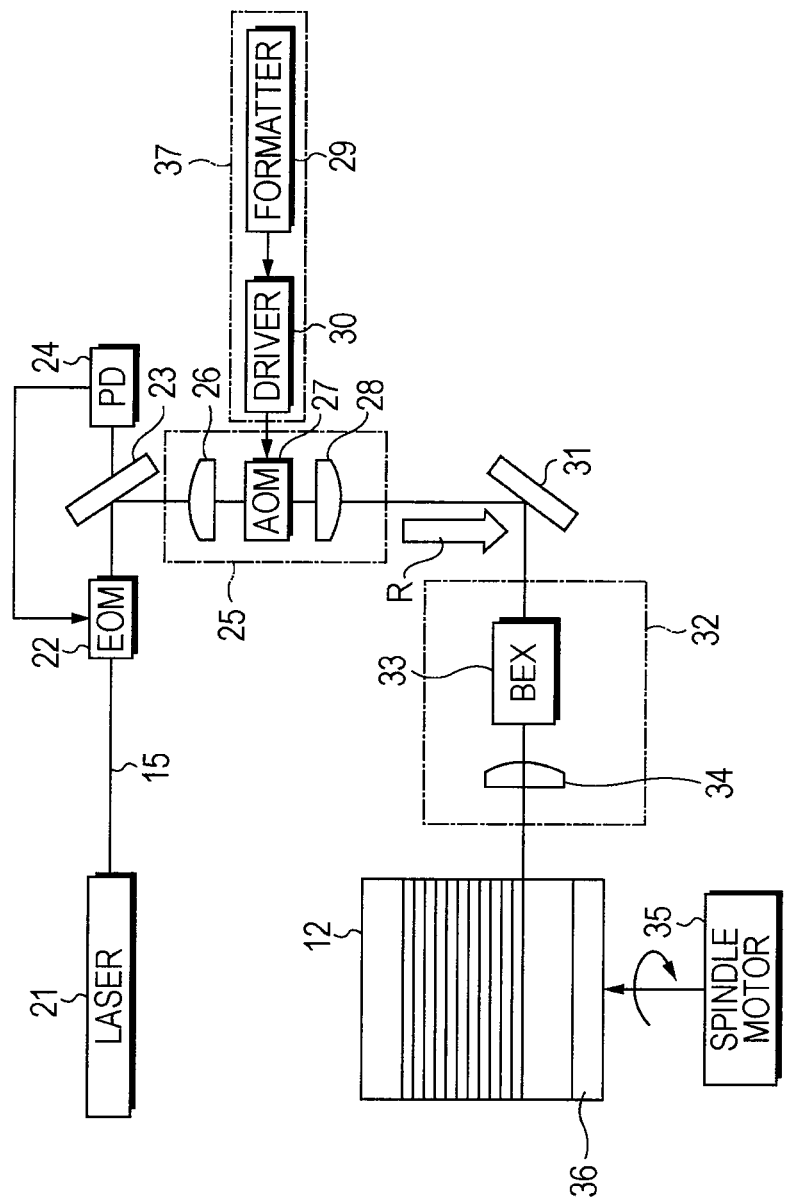
FIG. 7 is a schematic view showing an example of a configuration of a roll master exposure apparatus used in an exposure step of a moth-eye pattern.

Next, an example of a method for manufacturing the optical element having the above-described configuration will be described with reference to FIGS. 7 to 9.

A method for manufacturing an optical element according to the first embodiment is a method in which a process for making a master of optical discs is combined with an etching process. The manufacturing method includes a resist layer formation step of forming a resist layer on a master, an exposure step of forming a latent image of a moth-eye pattern on the resist layer using a roll master exposure apparatus, a development step of developing the resist layer on which the latent image has been formed, an etching step of making a roll master using plasma etching or the like, and a replication step of making a replica substrate using an ultraviolet curable resin. Herein, a RIE (reactive ion etching) apparatus may be used in the etching step.

(Configuration of Exposure Apparatus)

First, a configuration of the roll master exposure apparatus used in the moth-eye pattern exposure step will be described with reference to FIG. 7. The roll master exposure apparatus is configured on the basis of an optical disc recording apparatus.

A laser light source 21 is a light source for exposing the resist layer formed on the surface of the master 12 as a recording medium, and oscillates, for example, a laser beam 15 for recording with a wavelength λ of 266 nm. The laser beam 15 emitted from the laser light source 21 travels in a straight line as a collimated beam and enters an electro optical modulator (EOM) 22. The laser beam 15 transmitted through the electro optical modulator 22 is reflected by a mirror 23 and guided to an optical modulation system 25.

The mirror 23 includes a polarization beam splitter and has a function that reflects one polarized component and transmits the other polarized component. The polarized component transmitted through the mirror 23 is received by a photodiode 24, and the electro optical modulator 22 is controlled in accordance with the signal of the received polarized component to perform phase modulation of the laser beam 15.

In the optical modulation system 25, the laser beam 15 is focused by a collective lens 26 on an acoust-optic modulator (AOM) 27 composed of glass ($SiO_2$) or the like. After the laser beam 15 is intensity-modulated by the acoust-optic modulator 27 and diverged, the laser beam 15 is collimated by a collimating lens 28. The laser beam 15 emitted from the optical modulation system 25 is reflected by a mirror 31 and guided onto a moving optical table 32 in a horizontal and parallel manner.

The moving optical table 32 includes a beam expander 33 and an objective lens 34. The laser beam 15 guided to the moving optical table 32 is shaped into a desired beam form by the beam expander 33, and then applied to the resist layer on the master 12 through the objective lens 34. The master 12 is placed on a turntable 36 connected to a spindle motor 35. Subsequently, the exposure step of the resist layer is performed by intermittently irradiating the resist layer with the laser beam 15 while the master 12 is rotated and the laser beam 15 is moved in the height direction of the master 12. The resulting latent image has, for example, a substantially elliptical shape having a major axis in the circumferential direction. The laser beam 15 is moved by moving the moving optical table 32 in the direction indicated by arrow R.

The exposure apparatus includes a control mechanism 37 for forming, on the resist layer, a latent image corresponding to the two-dimensional pattern of the hexagonal lattice or quasi-hexagonal lattice shown in FIG. 1B. The control mechanism 37 includes a formatter 29 and a driver 30. The formatter 29 includes a polarity inversion unit, and the polarity inversion unit controls the timing when the resist layer is irradiated with the laser beam 15. The driver 30 controls the acoust-optical modulator 27 in response to the output from the polarity inversion unit.

In the roll master exposure apparatus, a polarity inversion formatter signal is synchronized to a rotation controller of the recording apparatus to generate a signal for each track so that two-dimensional patterns are spatially linked to one another, and intensity modulation is performed by the acoust-optical modulator 27. By performing patterning at constant angular velocity (CAV) and at an appropriate number of revolutions, an appropriate modulation frequency, and an appropriate feed pitch, a hexagonal or quasi-hexagonal lattice pattern can be recorded on the resist layer.

Hereinafter, the individual steps in the method for manufacturing the optical element according to the first embodiment of the present invention will be described in order below.

(Resist Layer Formation Step)

Figure 8A:
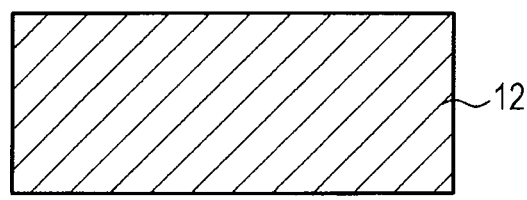
FIGS. 8A to 8C are processing charts for describing an example of a method for manufacturing the optical element according to the first embodiment of the present invention.
Figure 8B:
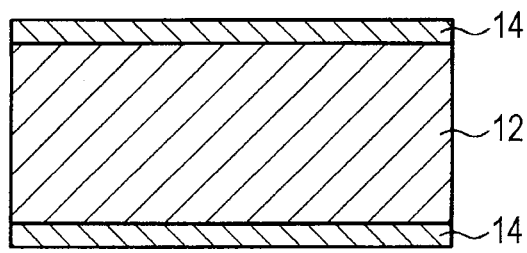

First, as shown in FIG. 8A, a cylinder- or column-shaped master 12 is prepared. The master 12 is, for example, a glass master. Next, as shown in FIG. 8B, a resist layer 14 is formed on a surface of the master 12. The resist layer 14 can be composed of, for example, either an organic resist or an inorganic resist. Examples of the organic resist include novolac resists and chemically-amplified resists. Furthermore, examples of the inorganic resist include metal oxides containing one, or two or more transition metals such as tungsten and molybdenum.

(Exposure Step)

Figure 8C:
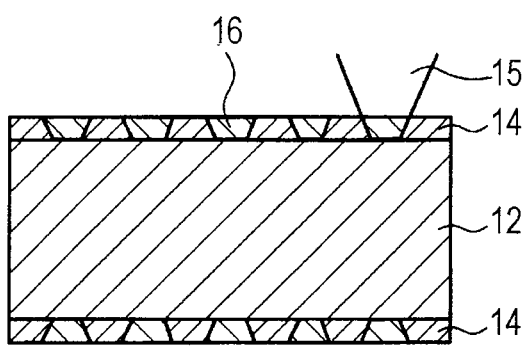

Next, as shown in FIG. 8C, using the roll master exposure apparatus described above, the resist layer 14 is irradiated with the laser beam (exposure beam) 15 while the master 12 is rotated. In this step, the entire surface of the resist layer 14 is exposed by intermittently irradiating the resist layer 14 with the laser beam 15 while the laser beam 15 is moved in the height direction of the master 12. As a result, a latent image 16 following the trajectory of the laser beam 15 is formed over the entire surface of the resist layer 14, for example, at a pitch substantially equal to a wavelength of visible light.

(Development Step)

Figure 9A:
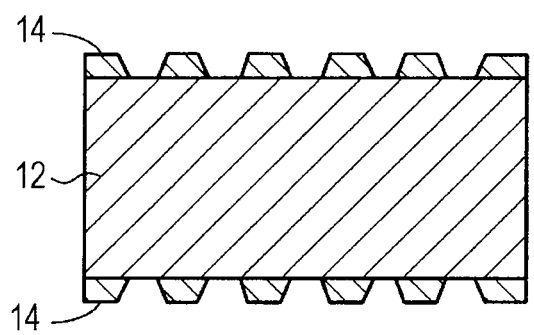
FIGS. 9A to 9C are processing charts for describing an example of a method for manufacturing the optical element according to the first embodiment of the present invention.

Next, a developer is dropwise applied onto the resist layer 14 while the master 12 is rotated, whereby the resist layer 14 is subjected to development treatment as shown in FIG. 9A. In the case where the resist layer 14 is formed using a positive resist, an exposed portion exposed to the laser beam 15 has an increased rate of dissolution in the developer compared with a non-exposed portion. As a result, as shown in FIG. 9A, a pattern corresponding to the latent image (exposed portion) 16 is formed on the resist layer 14.

(Etching Step)

Figure 9B:
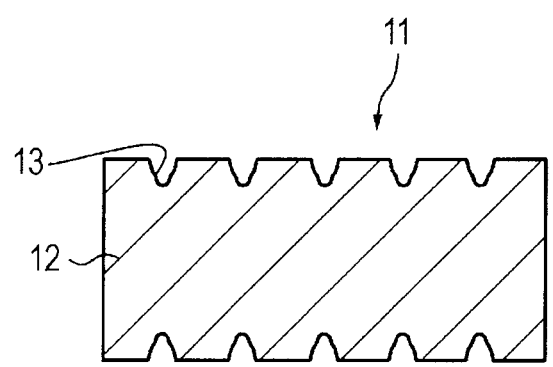

Next, the surface of the master 12 is etched using, as a mask, the pattern of the resist layer 14 (resist pattern) formed on the master 12. Consequently, as shown in FIG. 9B, there can be obtained depressions of an elliptic cone-like shape or a truncated elliptic cone-like shape having a major axis directed in the track extending direction, that is, structures 13. The etching is performed by dry etching or the like. In this step, by alternately carrying out etching treatment and ashing treatment, for example, a pattern of conical structures 13 can be formed, and also a glass master having a depth of three times or more the thickness of the resist layer 14 (selectivity: 3 or more) can be produced to achieve a high aspect ratio of the structures 3. Furthermore, by appropriately adjusting the treatment time of the etching treatment and the ashing treatment, slope steps can be formed on a curved surface of the structures 13.

Thereby, a roll master 11 having a hexagonal lattice pattern or a quasi-hexagonal lattice pattern can be obtained.

(Replication Step)

Figure 9C:
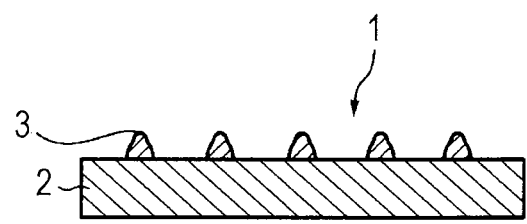

Next, the roll master 11 and the base 2 such as an acrylic sheet to which an ultraviolet curable resin has been applied are brought into close contact with each other. After the ultraviolet curable resin is cured by irradiation with ultraviolet rays, the base 2 is detached from the roll master 11. Consequently, as shown in FIG. 9C, an intended optical element 1 is manufactured.

According to the first embodiment, the change in an effective refractive index in the depth direction is characterized by each of the structures 3, and the effective refractive index gradually increases toward the base 2 and has two or more inflection points $N_1, N_2, \ldots, N_n$ (n: an integer of 2 or more). Therefore, reflected light can be reduced because of an interference effect of light combined with a shape effect of the structures 3. Thus, an optical element having good anti-reflection characteristics can be realized.

Furthermore, when the optical element 1 is manufactured by a method in which a process for making a master of optical discs is combined with an etching process, the time (exposure time) required in the process for making a master can be considerably shortened compared with the case where the optical element 1 is manufactured using electron-beam exposure. Thus, the productivity of the optical element 1 can be significantly improved.

Moreover, when the shape of the top of the structures 3 is a smooth shape but not an acute shape, that is, when the shape of the top has a smooth curved surface that protrudes in the height direction, the durability of the optical element 1 can be improved. The releasing property of the optical element 1 from the roll master 11 can also be improved.

Furthermore, when a step of the structures 3 is a slope step, ease of transference can be improved compared with the case where a parallel step is used. Note that the parallel step will be described later.

<Second Embodiment>

[Configuration of Optical Element]

Figure 10A:
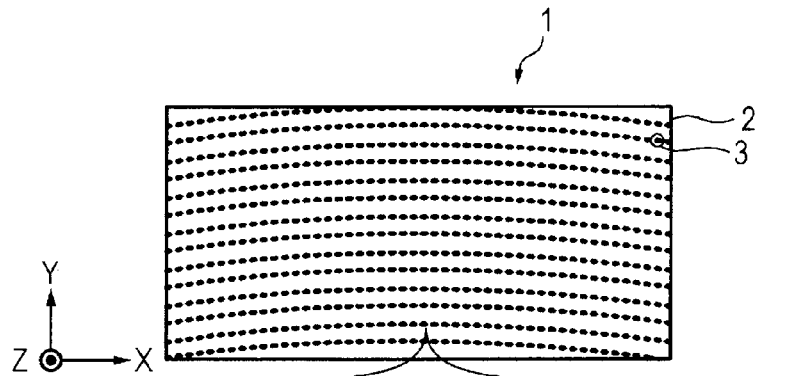
FIG. 10A is a schematic plan view showing an example of a configuration of an optical element according to a second embodiment of the present invention.
Figure 10B:
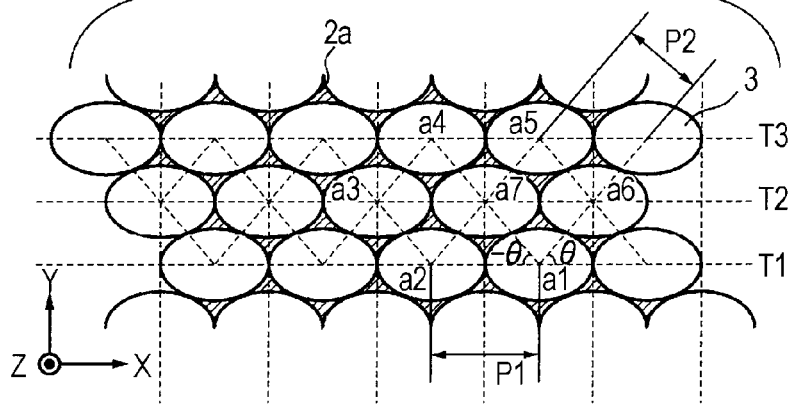
FIG. 10B is a partially enlarged plan view of the optical element shown in FIG. 10A.
Figure 10C:
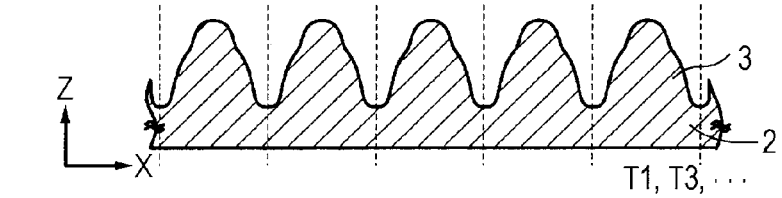
FIG. 10C is a sectional view taken along track T1, T3, ... of FIG. 10B.
Figure 10D:
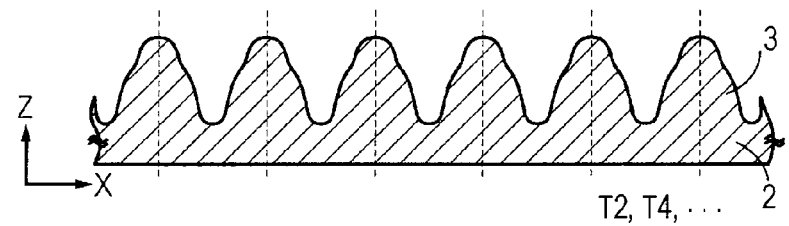
FIG. 10D is a sectional view taken along track T2, T4, ... of FIG. 10B.

FIG. 10A is a schematic plan view showing an example of a configuration of an optical element according to a second embodiment of the present invention. FIG. 10B is a partially enlarged plan view of the optical element shown in FIG. 10A. FIG. 10C is a sectional view taken along track T1, T3, ... of FIG. 10B. FIG. 10D is a sectional view taken along track T2, T4, ... of FIG. 10B.

In an optical element 1 according to the second embodiment, tracks T have an arc-like shape and structures 3 are arranged in an arc-like shape. As shown in FIG. 10B, in the three adjacent rows of tracks (T1 to T3), the structures 3 are arranged so as to form a quasi-hexagonal lattice pattern with the centers of the structures 3 being positioned at points a1 to a7. Herein, the term "quasi-hexagonal lattice pattern" means, unlike a regular hexagonal lattice pattern, a hexagonal lattice pattern distorted in an arc-like shape of the tracks T. Alternatively, the quasi-hexagonal lattice pattern means a hexagonal lattice pattern that is distorted in an arc-like shape of the tracks T and stretched and distorted in the track extending direction (X axis direction).

Except for the configuration of the optical element 1 described above, the configuration is the same as that in the first embodiment, and the description thereof is omitted.

[Configuration of Disc Master]

Figure 11A:
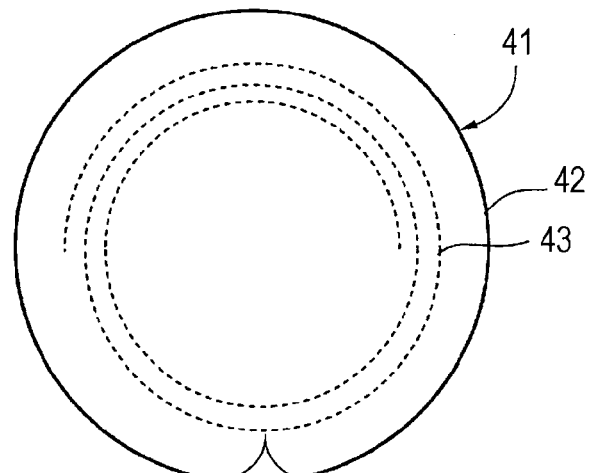
FIG. 11A is a plan view showing an example of a configuration of a disc master for manufacturing the optical element according to the second embodiment of the present invention.
Figure 11B:
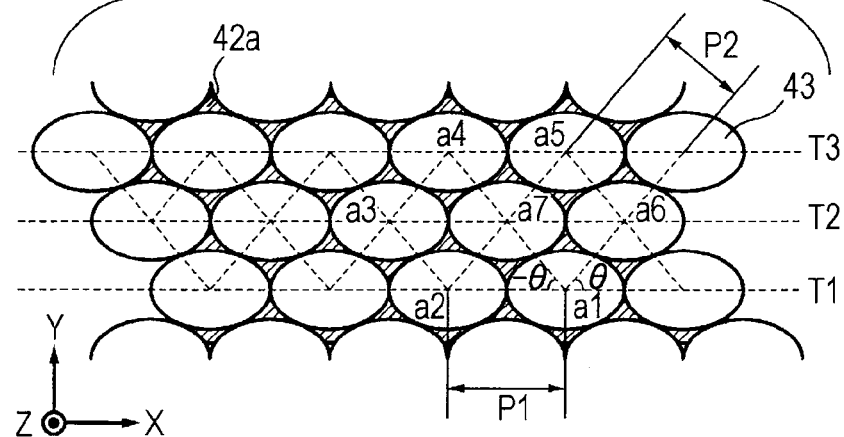
FIG. 11B is an enlarged plan view of the surface of the disc master shown in FIG. 11A.

FIG. 11 shows an example of a configuration of a disc master for manufacturing the optical element having the above-described configuration. As shown in FIG. 11, a disc master 41 has a configuration in which a large number of structures 43 that are depressions are arranged on a surface of a disc-shaped master 42. The structures 13 are periodically and two-dimensionally arranged at a pitch shorter than or equal to a wavelength of light in an environment where the optical element 1 is used, for example, at a pitch substantially equal to a wavelength of visible light. For example, the structures 43 are disposed on concentric or spiral tracks.

Except for the configuration of the disc master 41 described above, the configuration is the same as that of the roll master 11 in the first embodiment, and the description thereof is omitted.

[Method for Manufacturing Optical Element]

Figure 12:
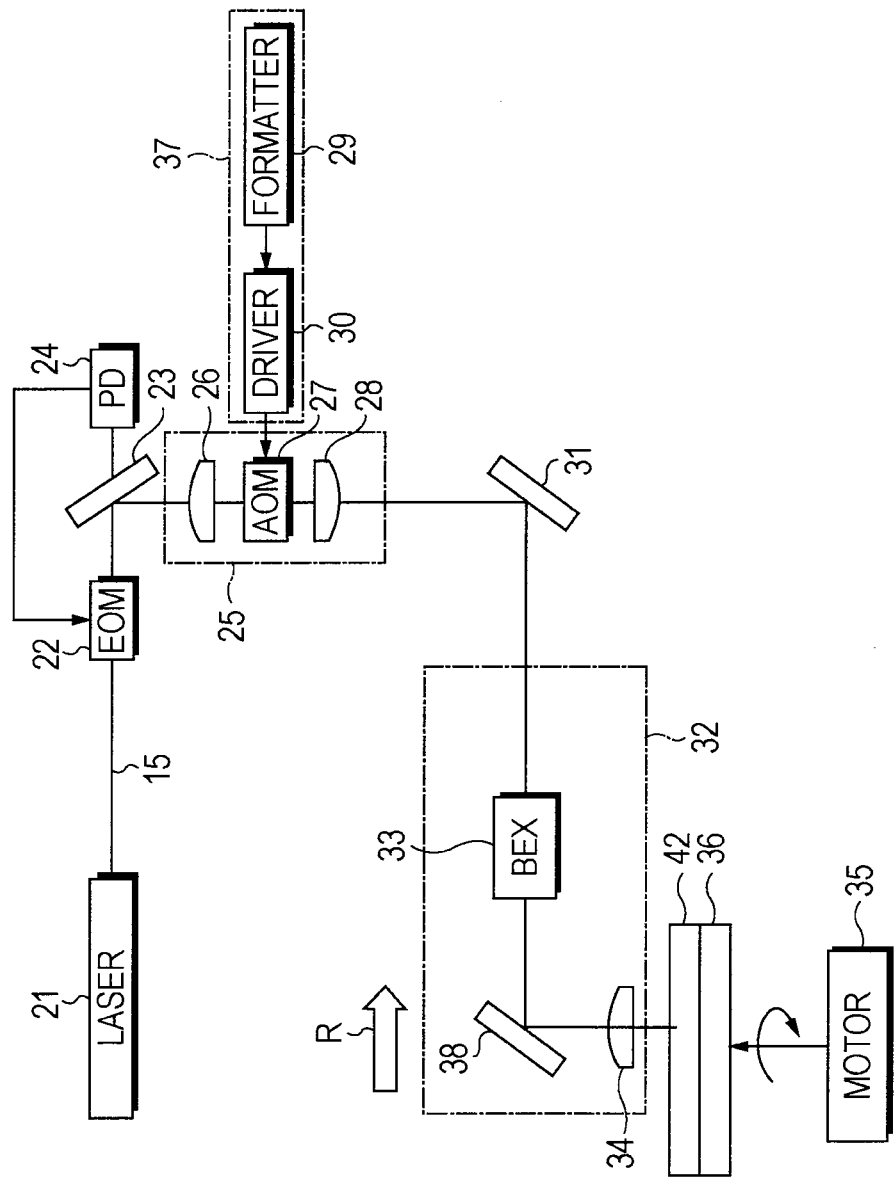
FIG. 12 is a schematic view showing an example of a configuration of a roll master exposure apparatus used in an exposure step of a moth-eye pattern.

FIG. 12 is a schematic view showing an example of a configuration of an exposure apparatus used for making a disc master having the above-described configuration.

A moving optical table 32 includes a beam expander 33, a mirror 38, and an objective lens 34. The laser beam 15 guided to the moving optical table 32 is shaped into a desired beam form by the beam expander 33, and then applied to the resist layer on the disc-shaped master 42 through the mirror 38 and the objective lens 34. The master 42 is placed on a turntable (not shown) connected to a spindle motor 35. Subsequently, the exposure step of the resist layer is performed by intermittently irradiating the resist layer on the master 42 with the laser beam while the master 42 is rotated and the laser beam 15 is moved in the radial direction of rotation of the master 42. The resulting latent image has a substantially elliptical shape having a major axis in the circumferential direction. The laser beam 15 is moved by moving the moving optical table 32 in the direction indicated by arrow R.

The exposure apparatus shown in FIG. 12 includes a control mechanism 37 for forming, on the resist layer, a latent image of the hexagonal lattice or quasi-hexagonal lattice two-dimensional pattern shown in FIG. 11. The control mechanism 37 includes a formatter 29 and a driver 30. The formatter 29 includes a polarity inversion unit, and the polarity inversion unit controls the timing when the resist layer is irradiated with the laser beam 15. The driver 30 controls an acoustic-optical modulator 27 in response to the output from the polarity inversion unit.

The control mechanism 37 synchronizes the intensity modulation of the laser beam 15 performed by the AOM 27, the driving rotational speed of the spindle motor 35, and the moving speed of the moving optical table 32 for each track so that the two-dimensional patterns of the latent image are spatially linked to one another. The rotation of the master 42 is controlled at a constant angular velocity (CAV). In addition, patterning is performed using an appropriate number of revolutions of the master 42 provided by the spindle motor 35, appropriate frequency modulation of laser intensity provided by the AOM 27, and an appropriate feed pitch of the laser beam 15 provided by the moving optical table 32. Thereby, a latent image of a hexagonal lattice pattern or a quasi-hexagonal lattice pattern is formed on the resist layer.

Furthermore, the control signal of the polarity inversion unit is gradually changed such that the spatial frequency (pattern density of the latent image: P1: 330, P2: 300 nm; P1: 315 nm, P2: 275 nm; or P1: 300 nm, P2: 265 nm) becomes uniform. More specifically, exposure is performed while an irradiation period of the resist layer with the laser beam 15 is changed for each track, and frequency modulation of the laser beam 15 is performed by the control mechanism 37 such that P1 becomes about 330 nm (315 nm, or 300 nm) on each track T. That is, the modulation is controlled such that the irradiation period of the laser beam becomes shorter as the track position becomes distant from the center of the disc-shaped master 42. Thereby, a nano-pattern in which the spatial frequency is uniform over the entire substrate can be formed.

Except for the method for manufacturing the optical element described above, the method is the same as that in the first embodiment, and the description thereof is omitted.

According to the second embodiment, as in the case where the structures 3 are linearly arranged, an optical element 1 having good anti-reflection characteristics can be obtained.

<Third Embodiment>

Figure 13A:
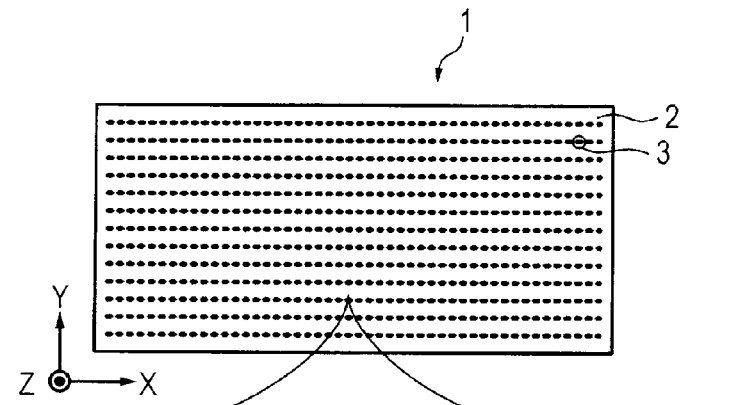
FIG. 13A is a schematic plan view showing an example of a configuration of an optical element according to a third embodiment of the present invention.
Figure 13B:
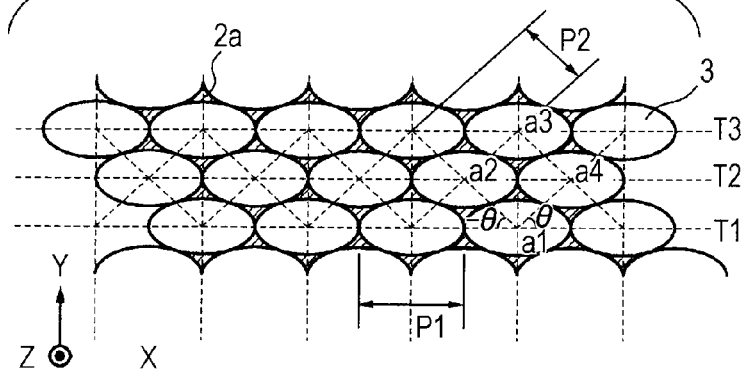
FIG. 13B is a partially enlarged plan view of the optical element shown in FIG. 13A.
Figure 13C:
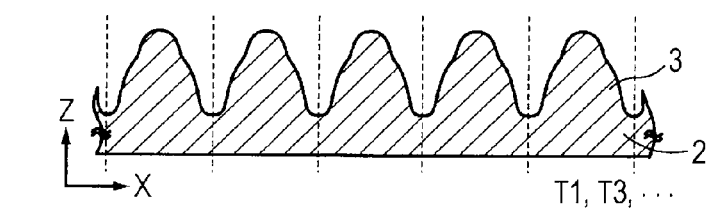
FIG. 13C is a sectional view taken along track T1, T3, ... of FIG. 13B.
Figure 13D:
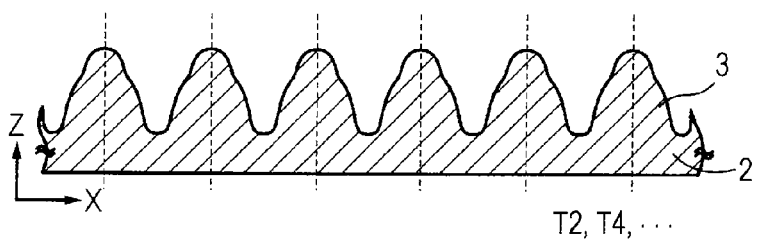
FIG. 13D is a sectional view taken along track T2, T4, ... of FIG. 13B.

FIG. 13A is a schematic plan view showing an example of a configuration of an optical element according to a third embodiment of the present invention. FIG. 13B is a partially enlarged plan view of the optical element shown in FIG. 13A. FIG. 13C is a sectional view taken along track T1, T3, . . . of FIG. 13B. FIG. 13D is a sectional view taken along track T2, T4, . . . of FIG. 13B.

An optical element 1 according to the third embodiment differs from that of the first embodiment in that, in the three adjacent rows of tracks, structures 3 form a tetragonal lattice pattern or a quasi-tetragonal lattice pattern. Herein, the term "quasi-tetragonal lattice pattern" means, unlike a regular tetragonal lattice pattern, a tetragonal lattice pattern that is stretched and distorted in the track extending direction (X axis direction). When the structures 3 are periodically arranged in a tetragonal lattice pattern or in a quasi-tetragonal lattice pattern, for example, the structures 3 lie adjacent to one another in directions of 4-fold symmetry. Moreover, by further stretching and distorting the tetragonal lattice, a structure can also be laid adjacent to the structures on the same track, and an arrangement with high packing density is achieved in which one structure lies adjacent to structures not only in directions of 4-fold symmetry but also at two positions on the same track.

In the two adjacent tracks T, at the intermediate positions (at the positions shifted by half a pitch) between the structures 3 arranged on one track (e.g., T1), the structures 3 on the other track (e.g., T2) are disposed. Consequently, as shown in FIG. 13B, in the three adjacent rows of tracks (T1 to T3), the structures 3 are arranged so as to form a tetragonal lattice pattern or a quasi-tetragonal lattice pattern with the centers of the structures 3 being positioned at points a1 to a4.

The height (depth) of the structures 3 is not particularly limited, and is appropriately set in accordance with the wavelength range of light to be transmitted. For example, when visible light is transmitted, the height (depth) of the structures 3 is preferably 150 nm to 500 nm. The pitch P2 in the θ direction with respect to the track T is, for example, about 275 nm to 297 nm. The aspect ratio (height H/arrangement pitch P) of the structures 3 is, for example, about 0.54 to 1.13. In addition, the structures 3 do not necessarily have the same aspect ratio. The structures 3 may be configured so as to have a certain height distribution.

The arrangement pitch P1 of the structures 3 on the same track is preferably longer than the arrangement pitch P2 of the structures 3 between the two adjacent tracks. Furthermore, the ratio P1/P2 preferably satisfies the relationship $1.4 < P1/P2 \leq 1.5$, where P1 is the arrangement pitch of the structures 3 on the same track and P2 is the arrangement pitch of the structures 3 between the two adjacent tracks. By selecting such a numerical range, the packing density of the structures having an elliptic cone-like shape or a truncated elliptic cone-like shape can be improved. Therefore, anti-reflection characteristics can be improved.

In the third embodiment, an optical element 1 having good anti-reflection characteristics can be obtained as in the first embodiment.

<Fourth Embodiment>

Figure 14A:
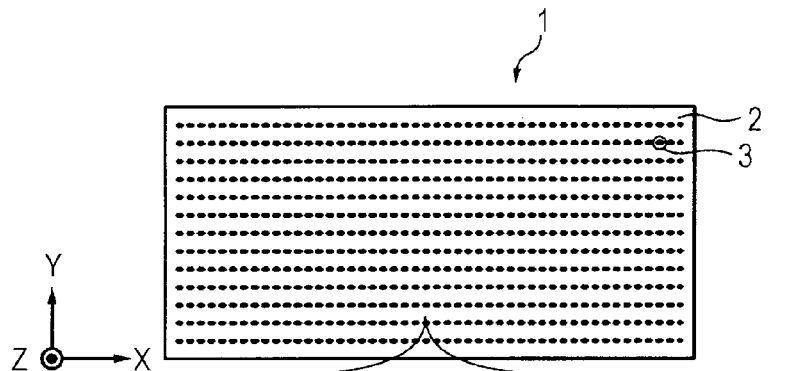
FIG. 14A is a schematic plan view showing an example of a configuration of an optical element according to the third embodiment of the present invention.
Figure 14B:
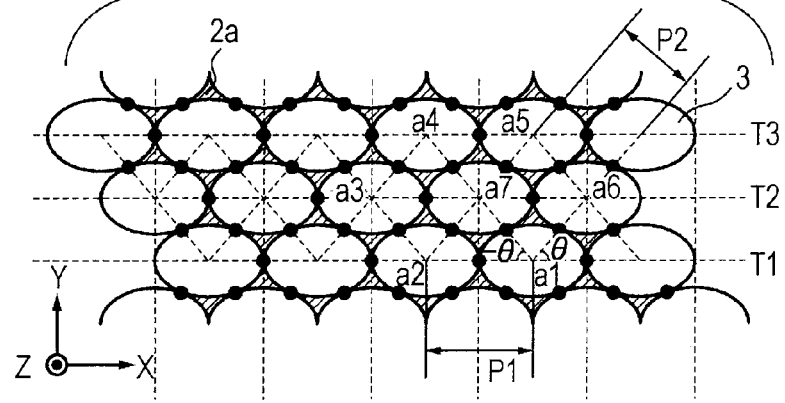
FIG. 14B is a partially enlarged plan view of the optical element shown in FIG. 14A.
Figure 14C:
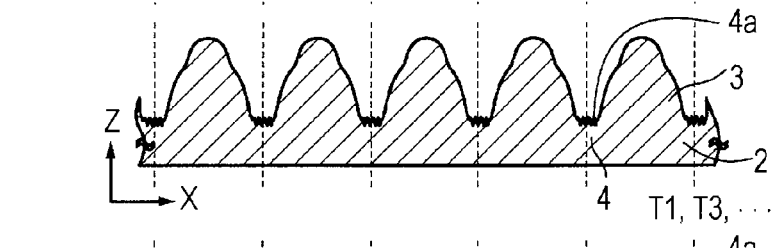
FIG. 14C is a sectional view taken along track T1, T3, ... of FIG. 14B.
Figure 14D:
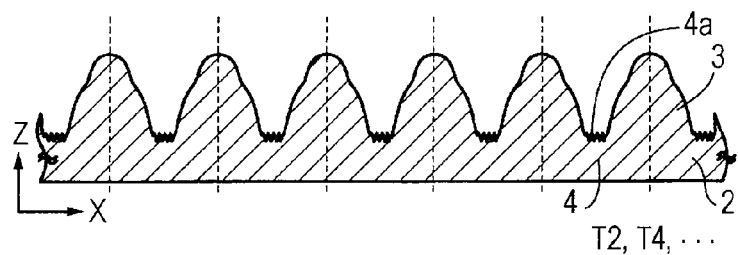
FIG. 14D is a sectional view taken along track T2, T4, ... of FIG. 14B.
Figure 15:
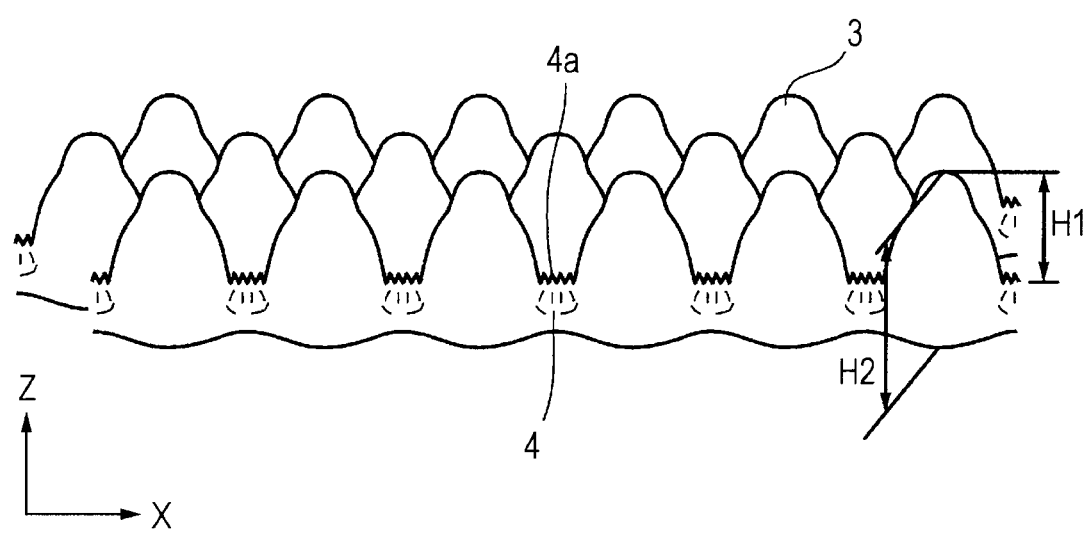
FIG. 15 is a partially enlarged perspective view of the optical element shown in FIG. 14.

FIG. 14A is a schematic plan view showing an example of a configuration of an optical element according to a fourth embodiment of the present invention. FIG. 14B is a partially enlarged plan view of the optical element shown in FIG. 14A. FIG. 14C is a sectional view taken along track T1, T3, . . . of FIG. 14B. FIG. 14D is a sectional view taken along track T2, T4, . . . of FIG. 14B. FIG. 15 is a partially enlarged perspective view of the optical element shown in FIG. 14.

An optical element 1 according to the fourth embodiment differs from that of the first embodiment in that the optical element 1 further includes secondary structures 4 formed on the surface of the base 2. The same parts as those in the first embodiment are designated by the same reference numerals, and the descriptions thereof are omitted. Note that, in the fourth embodiment, the structures 3 are referred to as primary structures 3 to avoid the confusion between the structures 3 and the secondary structures 4.

The secondary structures 4 are structures whose height is smaller than that of the primary structures 3. For example, the secondary structures 4 are small protruding portions. Furthermore, when the height of the secondary structures 4 is smaller than or equal to about ¼ the wavelength of light in a use environment on the basis of an optical path length adopted in consideration of a refractive index, the secondary structures 4 contribute to an anti-reflection function. For example, the height of the secondary structures 4 is about 10 nm to 150 nm. The secondary structures 4 can be composed of, for example, the same material as that of the base 2 and the primary structures 3, but is preferably composed of a material having a lower refractive index than the materials constituting the base 2 and the primary structures 3. This is because the reflectivity can be further reduced. Furthermore, in the above description, the case where both the primary structures 3 and the secondary structures 4 are projections has been mainly described, but the primary structures 3 and the secondary structures 4 may be depressions. Moreover, the projection-depression relationship may be reversed between the primary structures 3 and the secondary structures 4. Specifically, when the primary structures 3 are projections, the secondary structures 4 may be depressions. When the primary structures 3 are depressions, the secondary structures 4 may be projections.

The secondary structures 4 are disposed, for example, between the primary structures 3. Specifically, preferably, the secondary structures 4 are provided in the most adjacent portions of the primary structures 3, and the primary structures 3 are connected to one another by the secondary structures 4 provided in the most adjacent portions. In such a manner, the packing density of the primary structures 3 can be improved. Furthermore, the spatial frequency component of the secondary structures 4 is preferably higher than the frequency component converted from the period of the primary structures 3. Specifically, the spatial frequency component of the secondary structures 4 is preferably two times or higher and more preferably four times or higher the frequency component converted from the period of the primary structures 3. Preferably, the spatial frequency component of the secondary structures 4 is not an integral multiple of the frequency component of the primary structures 3.

From the standpoint of ease of formation of the secondary structures 4, as shown in FIG. 14B, the secondary structures 4 are preferably arranged in positions indicated by black circles where the primary structures 3 of an elliptic cone-like shape, a truncated elliptic cone-like shape, or the like lie adjacent to one another. In such an arrangement, the secondary structures 4 may be formed in all the adjacent portions of the primary structures 3 or may be formed only in the track, such as T1 or T2, extending direction. When the primary structures 3 are arranged periodically in a hexagonal lattice pattern or in a quasi-hexagonal lattice pattern, for example, the primary structures 3 lie adjacent to one another in directions of 6-fold symmetry. In this case, preferably, the secondary structures 4 are provided in the adjacent portions, and the primary structures 3 are connected to one another by the secondary structures 4. Furthermore, when gaps 2a are present between the primary structures 3 as shown in FIG. 14B, from the standpoint of improving the packing density, the secondary structures 4 are preferably formed in the gaps 2a between the primary structures 3. The secondary structures 4 may be formed both in the adjacent portions of the primary structures 3 and in the gaps 2a. Furthermore, the positions in which the secondary structures 4 are formed are not particularly limited to the examples described above. The secondary structures 4 may be formed on the entire surfaces of the primary structures 3.

Furthermore, from the standpoint of improving the reflection characteristics and transmission characteristics, at least one type of minute projections and depressions, for example, minute uneven portions 4a are preferably formed on the surfaces of the secondary structures 4.

Furthermore, in order to obtain an optical element 1 having a good anti-reflection function and small wavelength dependence, minute projections or depressions of the secondary structures 4 are preferably formed so as to have a spatial frequency component of high-frequency wave that is shorter than the period of the primary structures 3. For example, the secondary structures 4 preferably include corrugated, minute uneven portions 4a having minute depressions and projections as shown in FIG. 15. The minute uneven portions 4a can be formed, for example, by appropriately selecting the conditions of etching such as RIE (reactive ion etching) in the optical element manufacturing process or the material for the master. For example, the uneven portions 4a can be formed using Pyrex (registered trademark) glass as the material for the master.

In the fourth embodiment, since the secondary structures 4 are further formed on the surface of the base 2, the anti-reflection characteristics can be further improved compared with the first embodiment.

<Fifth Embodiment>

Figure 16A:
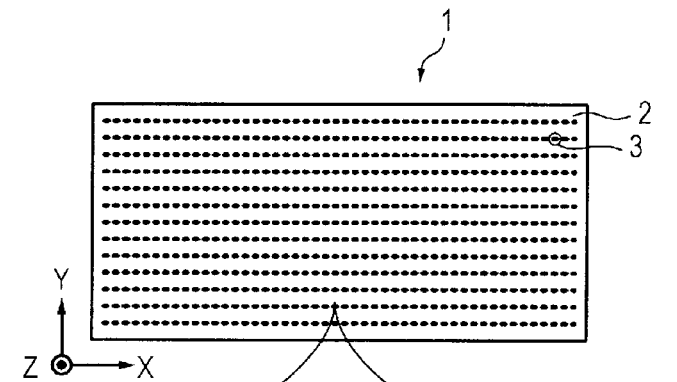
FIG. 16A is a schematic plan view showing an example of a configuration of an optical element according to a fifth embodiment of the present invention.
Figure 16B:
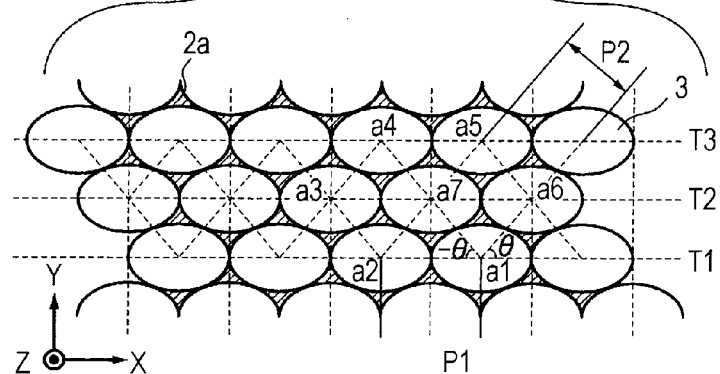
FIG. 16B is a partially enlarged plan view of the optical element shown in FIG. 16A.
Figure 16C:
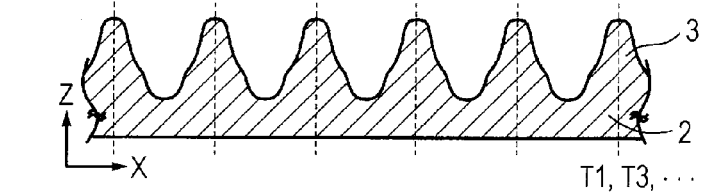
FIG. 16C is a sectional view taken along track T1, T3, ... of FIG. 16B.
Figure 16D:
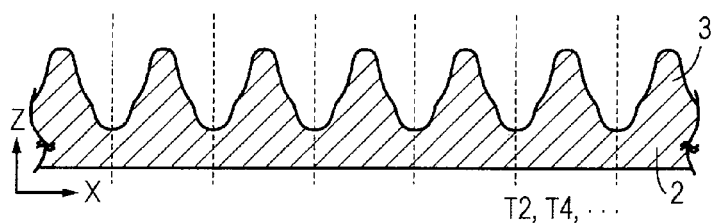
FIG. 16D is a sectional view taken along track T2, T4, ... of FIG. 16B.
Figure 17:
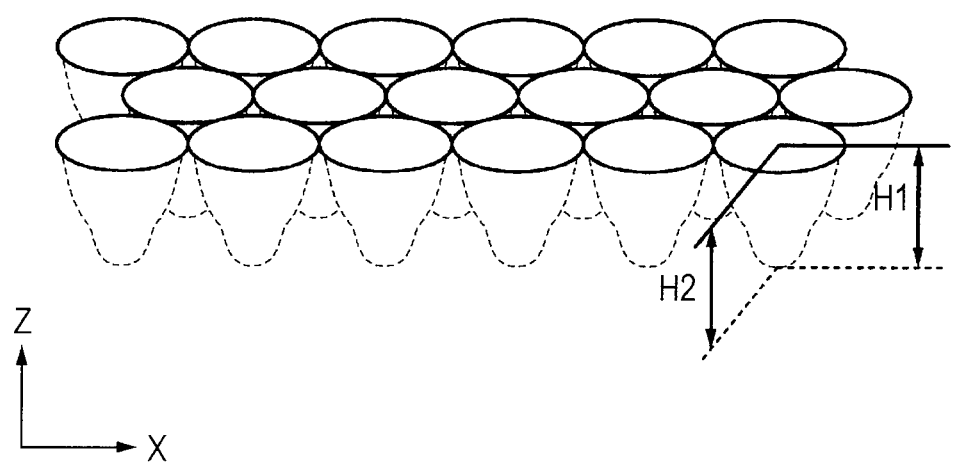
FIG. 17 is a partially enlarged perspective view of the optical element shown in FIG. 16.

FIG. 16A is a schematic plan view showing an example of a configuration of an optical element according to a fifth embodiment of the present invention. FIG. 16B is a partially enlarged plan view of the optical element shown in FIG. 16A. FIG. 16C is a sectional view taken along track T1, T3, . . . of FIG. 16B. FIG. 16D is a sectional view taken along track T2, T4, . . . of FIG. 16B. FIG. 17 is a partially enlarged perspective view of the optical element shown in FIG. 16.

An optical element 1 according to the fifth embodiment differs from that of the first embodiment in that a large number of structures 3 that are depressions are arranged on the surface of the base. The shape of the structures 3 is a depression obtained by reversing the projection of the structures 3 in the first embodiment. Therefore, the effective refractive index in the depth direction (−Z axis direction in FIG. 16) of the structures 3 gradually increases toward the base and has two or more inflection points $N_1, N_2, \ldots, N_n$ (n: an integer of 2 or more). Note that, when the structures 3 are depressions as described above, the opening portions (the entrance portions of the depressions) of the structures 3 that are depressions are defined as a bottom and the lowermost portions (the deepest portions of the depressions) in the depth direction of the base 2 are defined as a top. In other words, the top and bottom are defined using the structures 3 that are insubstantial spaces. In this case, the effective refractive index shown in FIG. 2 gradually increases in the direction from the bottom to the top. The fifth embodiment is the same as the first embodiment except for the above description.

In the fifth embodiment, since the depressions obtained by reversing the projections of the structures 3 in the first embodiment are used, the same effects as in the first embodiment can be achieved.

<Sixth Embodiment>

Figure 18:
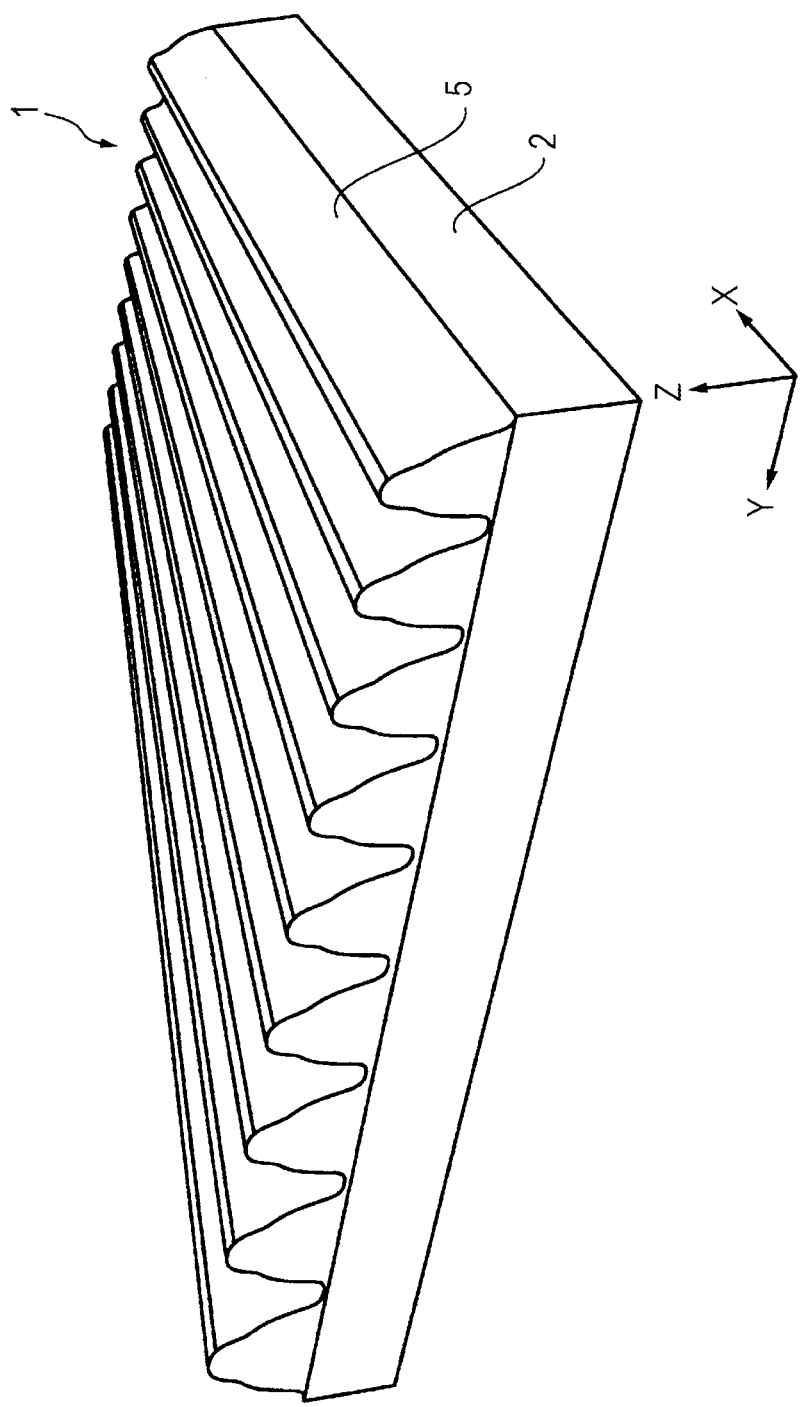
FIG. 18 is a perspective view showing an example of a configuration of an optical element according to a sixth embodiment of the present invention.

FIG. 18 is a perspective view showing an example of a configuration of an optical element according to a sixth embodiment of the present invention. As shown in FIG. 18, an optical element 1 according to the sixth embodiment differs from that of the first embodiment in that the optical element 1 includes pillar-shaped structures 5 that extend in a single direction on the surface of the base and the structures 5 are one-dimensionally arranged on the base 2. Note that the same parts as those in the first embodiment are designated by the same reference numerals, and the descriptions thereof are omitted.

The effective refractive index in the depth direction (−Z axis direction in FIG. 18) of the structures 5 gradually increases toward the base 2 and has two or more inflection points $N_1, N_2, \ldots, N_n$ (n: an integer of 2 or more) in the depth direction.

The structures 5 have a curved surface that uniformly extends in a single direction (Y axis direction). The section (YZ section) obtained by cutting the structures 5 in the direction perpendicular to a ridgeline direction has a sectional shape similar to the refractive index profile shown in FIG. 2.

According to the sixth embodiment, the effective refractive index in the depth direction of the ridgeline gradually increases toward the base 2 and has two or more inflection points $N_1, N_2, \ldots, N_n$ (n: an integer of 2 or more). Therefore, reflected light can be reduced because of an interference effect of light combined with a shape effect of the structures 5. Thus, an optical element having good anti-reflection characteristics can be achieved.

<Seventh Embodiment>

Figure 19:
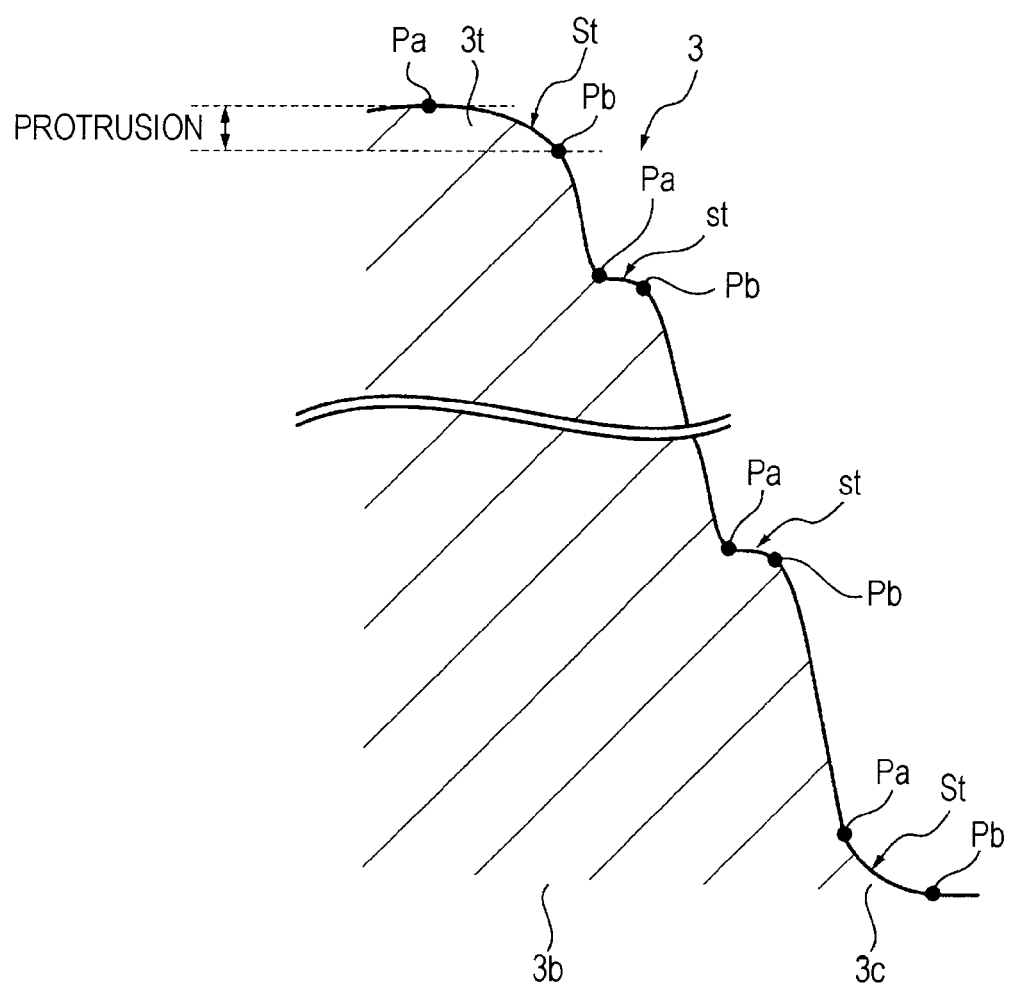
FIG. 19 is a sectional view showing an example of a shape of structures of an optical element according to a seventh embodiment of the present invention.

FIG. 19 shows an example of a shape of structures of an optical element according to a seventh embodiment of the present invention. As shown in FIG. 19, the structures 3 include, on the surface between the top 3t and the bottom 3b, preferably two or more of at least one of parallel steps st and slope steps St, more preferably two or more and ten or less of at least one of parallel steps st and slope steps St. If the number of at least one of the parallel steps st and the slope steps St is two or less, the effective refractive index in the depth direction (−Z axis direction in FIG. 1) of the structures 3 can have two or more inflection points. Furthermore, when the number of at least one of the parallel steps st and the slope steps St is ten or less, the optical element can be easily manufactured.

The parallel step st is a step parallel to the surface of the base. Herein, the parallel step st is a section defined by the first changing point Pa and the second changing point Pb. Note that the parallel step st does not include the top 3t and the bottom 3b that have a planar shape. That is, the steps that are formed between the top 3t and the bottom 3b of the structures 3 excluding the top 3t and the bottom 3b and that are parallel to the surface of the base are called parallel steps.

The seventh embodiment is the same as the first embodiment except for the above description.

<Eighth Embodiment>

Figure 20:
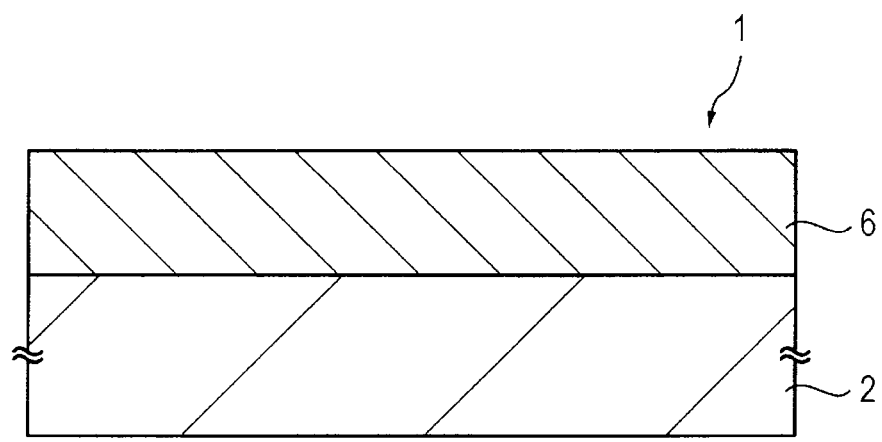
FIG. 20 is a sectional view showing an example of a configuration of an optical element according to an eighth embodiment of the present invention.

FIG. 20 is a sectional view showing an example of a configuration of an optical element according to an eighth embodiment of the present invention. As shown in FIG. 20, an optical element 1 according to the eighth embodiment differs from that of the first embodiment in that a gradient film 6 is formed on the base instead of the structures 3. Note that the same parts as those in the first embodiment are designated by the same reference numerals, and the descriptions thereof are omitted.

The gradient film 6 is a film composed of a material whose composition is gradually changed in the depth direction (thickness direction), whereby the refractive index in the depth direction is gradually changed. The refractive index on the surface side of the gradient film 6 is lower than that on the base side (interface side). The effective refractive index in the depth direction gradually increases toward the base 2 and has two or more inflection points $N_1, N_2, \ldots, N_n$ (n: an integer of 2 or more). Therefore, reflected light can be reduced because of an interference effect of light. Thus, the anti-reflection characteristics of the optical element can be degraded.

The gradient film 6 can be formed by, for example, sputtering. Examples of the film formation method performed by sputtering include a method in which two types of target materials are simultaneously sputtered at a certain ratio and a method in which the content of process gas contained in the film is appropriately changed by performing reactive sputtering while the flow rate of the process gas is changed.

According to the eighth embodiment, the same effects as in the first embodiment can be achieved.

<9. Ninth Embodiment>

FIG. 21A is a schematic plan view showing an example of a configuration of an optical element according to a ninth embodiment of the present invention. FIG. 21B is a partially enlarged plan view of the optical element shown in FIG. 21A.

An optical element 1 according to the ninth embodiment differs from that of the first embodiment in that a plurality of structures 3 are arranged on meandering tracks (hereinafter referred to as wobble tracks). The wobbles of the tracks on the base 2 are preferably synchronized with one another. That is, the wobbles are preferably synchronized wobbles. By synchronizing the wobbles in such a manner, a unit lattice shape of a hexagonal lattice or a quasi-hexagonal lattice can be held and high packing density can be maintained. Examples of the waveform of the wobble tracks include a sine wave and a triangular wave. The waveform of the wobble tracks is not limited to periodical waves, and may be a non-periodical wave. The wobble amplitude of the wobble tracks is set to, for example, about ±10 μm.

The ninth embodiment is the same as the first embodiment except for the above description.

According to the ninth embodiment, since the structures 3 are arranged on the wobble tracks, the occurrence of visual unevenness can be suppressed.

<10. Tenth Embodiment>

[Configuration of Optical Element]

An optical element 1 according to a tenth embodiment differs from that of the first embodiment in that structures 3 obtained using a siloxane resin are disposed on the base 2.

The optical element 1 according to the tenth embodiment is suitably applied to optical elements such as a cover glass and a window material having thermal resistance and high transparency; and packages of an image sensor element (e.g., a CCD image sensor element and a CMOS image sensor element) including such an optical element, a photodiode, a semiconductor laser device, and the like. Furthermore, the optical element 1 according to the tenth embodiment is suitably applied to optical elements such as a front panel having high hardness and thermal resistance and displays including the optical elements. More specifically, the optical element 1 is suitably applied to the packages of image sensors provided to various cameras such as a digital camera (e.g., a single-lens reflex camera and a compact camera), a digital camera equipped in cellular phones, a camera for industrial machines, a security camera, and a camera for image recognition devices.

FIG. 22 is a processing chart for describing a method for manufacturing an optical element according to the tenth embodiment of the present invention. The method for manufacturing an optical element uses a room-temperature nanoimprinting technology.

The method for manufacturing an optical element according to the tenth embodiment of the present invention is characterized by including a step of forming a resin layer by applying a film formation composition containing a siloxane resin on the base; a step of transferring a shape to the resin layer by pressing a mold against resin layer; a step of removing the mold from the resin layer; and a step of irradiating the resin layer from which the mold has been removed, with ultraviolet rays under a reduced pressure.

(Resin Layer Formation Step)

Figure 22A:
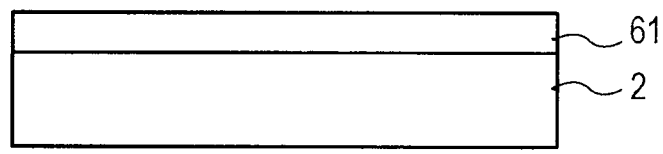

First, as shown in FIG. 22A, a resin layer 61 is formed by applying a film formation composition containing a siloxane resin on the base 2. The application can be performed by, for example, spin coating, but the application method is not particularly limited thereto. The base 2 can be composed of, for example, a glass substrate (e.g., clear glass or quartz) mainly made of glass. A silsesquioxane resin is preferably used as the siloxane resin. The film formation composition is preferably used as the form of a solution by dissolving a component such as the siloxane resin in an appropriate organic solvent. Furthermore, an organic layer and an inorganic layer may be optionally formed on the base 2. Moreover, the thickness of the resin layer 61 is preferably 300 nm or more and 500 nm or less, although depending on the kind of structures 2 to be manufactured.

(Shape Transferring Step)

Figure 22B:
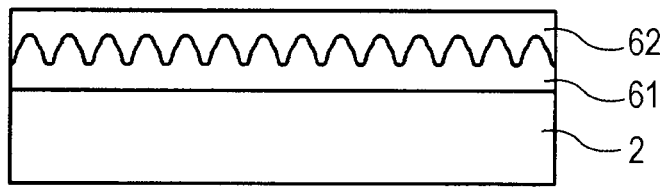

Next, as shown in FIG. 22B, by pressing a mold 62 having a predetermined shape against the resin layer 61 formed on the base 2, the shape of the mold is transferred to the resin layer 61. For example, the die 41 used in the second embodiment can be used as the mold 62, but the mold 62 is not particularly limited. For example, a die manufactured by performing plating on the optical element 1 or the like according to the first or third embodiment may be used. The pressing pressure of the mold 62 is preferably about 5 MPa to 100 MPa. Furthermore, the pressing time is preferably about 10 sec to 20 sec, although depending on the thickness of the resin layer 61. The resin layer 61 having the shape is further hardened by performing pressing for a predetermined time while the mold 62 is pressed against the resin layer 61.

(Removing Step)

Next, as shown in FIG. 22C, the mold 62 is removed from the resin layer 61. As a result, structures 3 obtained by transferring the shape of the mold 62 are formed on the base 2.

(Irradiation Step)

Figure 22D:
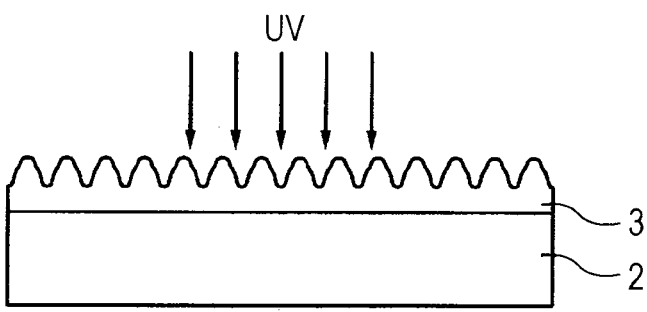

Next, as shown in FIG. 22D, preferably, the resin layer 61 from which the mold 62 has been removed is irradiated with ultraviolet rays L at a reduced pressure of about 10 Torr, and then heated to 300° C. to 400° C. The curing efficiency is increased by applying heat in such a manner. For example, a pencil hardness of 7 H to 9 H is obtained through the heating to 300° C. and a pencil hardness of 8 H to 9 H is obtained through the heating to 400° C. Moreover, when the resin layer 61 is cured at 300° C. to 400° C., the thermal resistance of the optical element 1 manufactured in such a manner is 500° C. or higher, which is sufficiently high thermal resistance for a reflow process.

Through the steps described above, the structures 3 obtained by transferring the shape of the mold 62 can be formed on the base 2.

The optical element 1 according to the sixth embodiment can be used as, for example, a cover glass and a window material provided to the package of image sensor elements, a front panel of displays, and the like. Thus, there can be provided a cover glass or a window material having thermal resistance and high transparency, a front panel having high hardness and thermal resistance, a display including the same, and the like.

<11. Eleventh Embodiment>

Figure 23:
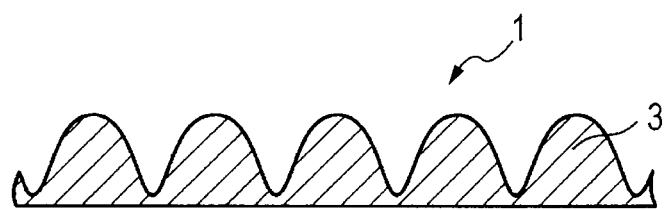
FIG. 23 is a sectional view showing an example of a configuration of an optical element according to an eleventh embodiment.

FIG. 23 shows an example of a configuration of an optical element according to an eleventh embodiment. As shown in FIG. 23, the optical element 1 differs from that of the first embodiment in that there is no base 2. The optical element 1 includes a plurality of structures 3 that are projections and are arranged at a fine pitch shorter than or equal to a wavelength of visible light, and the lower portions of the adjacent structures are connected to each other. The plurality of structures whose lower portions are connected to each other may constitute a mesh as a whole. When the optical element 1 has no base as described above, the flexibility is preferably imparted to the structures 3 by suitably adjusting the elastic modulus of the structures 3. By imparting the flexibility in such a manner, the optical element 1 can be attached to an adherend without an adhesive. Furthermore, the optical element 1 can be attached to a three-dimensional curved surface.

<Twelfth Embodiment>

[Configuration of Liquid Crystal Display Device]

Figure 24:
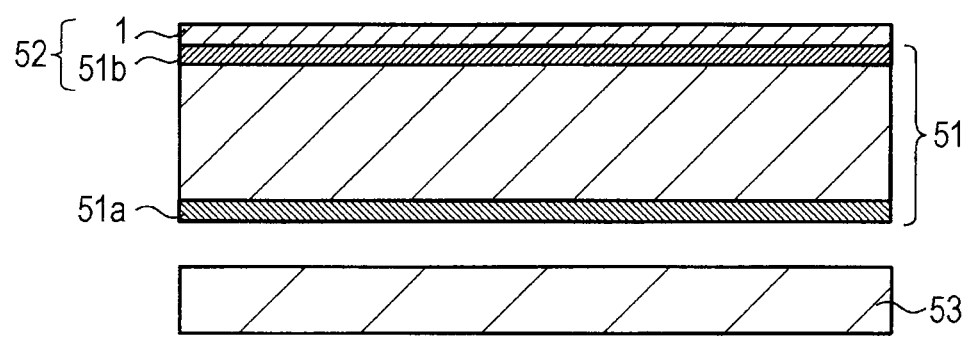
FIG. 24 is a schematic view showing an example of a configuration of a liquid crystal display device according to the ninth embodiment of the present invention.

FIG. 24 shows an example of a configuration of a liquid crystal display device according to a twelfth embodiment of the present invention. As shown in FIG. 24, the liquid crystal display device includes a backlight 53 that emits light and a liquid crystal panel 51 that temporally and spatially modulates the light emitted from the backlight 53 to display an image. Polarizers 51a and 51b are respectively disposed on two surfaces of the liquid crystal panel 51. An optical element 1 is disposed on the polarizer 51b disposed on the display surface side of the liquid crystal panel 51. In the present invention, the polarizer 51b having the optical element 1 disposed on one principal surface thereof is referred to as an anti-reflective polarizer 52. The anti-reflective polarizer 52 is an example of optical elements having an anti-reflection function.

Hereinafter, the backlight 53, the liquid crystal panel 51, the polarizers 51a and 51b, and the optical element 1 constituting the liquid crystal display device will be described in order below.

(Backlight)

For example, a direct-type backlight, an edge-type backlight, or a planar light source-type backlight can be used as the backlight 53. The backlight 53 includes, for example, a light source, a reflecting plate, an optical film, and the like. For example, a cold cathode fluorescent lamp (CCFL), a hot cathode fluorescent lamp (HCFL), an organic electroluminescence (OEL), an inorganic electroluminescence (IEL), a light emitting diode (LED), or the like is used as the light source.

(Liquid Crystal Panel)

Examples of the display mode that can be used for the liquid crystal panel 51 include a twisted nematic (TN) mode, a super twisted nematic (STN) mode, a vertically aligned (VA) mode, an in-plane switching (IPS) mode, an optically compensated birefringence (OCB) mode, a ferroelectric liquid crystal (FLC) mode, a polymer dispersed liquid crystal (PDLC) mode, and a phase change guest host (PCGH) mode.

(Polarizers)

The polarizers 51a and 51b are respectively provided on two surfaces of the liquid crystal panel 51 so that the transmission axes thereof are orthogonal to each other, for example. Each of the polarizers 51a and 51b allows only one of orthogonal polarized components of incident light to pass through and blocks the other component by absorption. Each of the polarizers 51a and 51b may be a uniaxially stretched hydrophilic polymer film such as a polyvinyl alcohol film, a partially formalized polyvinyl alcohol film, an ethylene-vinyl acetate copolymer partially saponified film, or the like, with a dichroic substance, such as iodine or a dichroic dye, adsorbed thereto. A protective layer such as a triacetyl cellulose (TAC) film is preferably formed on two surfaces of each of the polarizers 51a and 51b. When the protective layer is formed in such a manner, the base 2 of the optical element 1 preferably also serves as the protective layer. This is because, in such a configuration, the anti-reflective polarizer 52 can be thinned.

(Optical Element)

The optical element 1 is the same as one of those in the first to eleventh embodiments, and the descriptions thereof is omitted.

According to the twelfth embodiment, since the optical element 1 is disposed on the display surface of the liquid crystal display device, the anti-reflection function of the display surface of the liquid crystal display device can be improved. Thus, the visibility of the liquid crystal display device can be improved.

<Thirteenth Embodiment>

[Configuration of Liquid Crystal Display Device]

Figure 25:
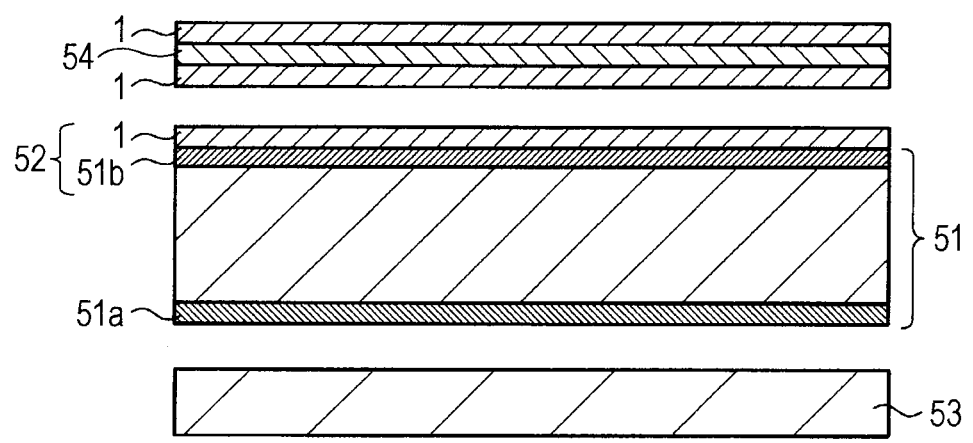
FIG. 25 is a schematic view showing an example of a configuration of a liquid crystal display device according to the tenth embodiment of the present invention.

FIG. 25 shows an example of a configuration of a liquid crystal display device according to a thirteenth embodiment of the present invention. The liquid crystal display device differs from that of the twelfth embodiment in that the liquid crystal display device includes a front member 54 on the front side of the liquid crystal panel 51 and also includes the optical element 1 on at least one of the front surface of the liquid crystal panel 51 and the front and rear surfaces of the front member 54. FIG. 25 shows an example in which the optical element 1 is provided to all the front surface of the liquid crystal panel 51 and the front and rear surfaces of the front member 54. For example, an airspace is formed between the liquid crystal panel 51 and the front member 54. The same parts as those in the seventh embodiment are designated by the same reference numerals, and the descriptions thereof are omitted. Note that, in the present invention, the front surface is a surface on the display surface side, that is, a surface on the viewer's side, and the rear surface is a surface on the side opposite the display surface.

The front member 54 is used for the purpose of providing mechanical, thermal, and weather-resistant protections and a design function to the front surface (viewer's side) of the liquid crystal panel 51. The front member 54 has, for example, a sheet shape, a film shape, or a plate shape. Examples of the material of the front member 54 include glass, triacetyl cellulose (TAC), polyester (TPEE), polyethylene terephthalate (PET), polyimide (PI), polyamide (PA), aramid, polyethylene (PE), polyacrylate, polyethersulfone, polysulfone, polypropylene (PP), diacetyl cellulose, polyvinyl chloride, acrylic resins (PMMA), and polycarbonate (PC). However, the material is not particularly limited to these materials and any material having transparency can be used.

According to the thirteenth embodiment, the visibility of the liquid crystal display device can be improved as in the twelfth embodiment.

<14. Fourteenth Embodiment>

Figure 26:
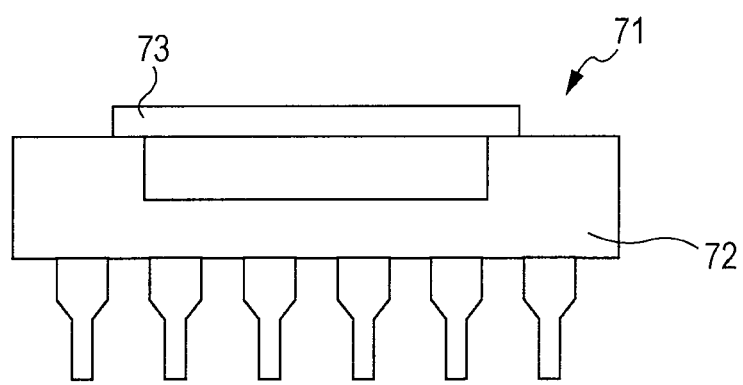
FIG. 26 is a sectional view showing an example of a configuration of a package of an image sensor element according to a fourteenth embodiment of the present invention.

FIG. 26 is a sectional view showing an example of a configuration of a package of an image sensor element according to a fourteenth embodiment of the present invention. As shown in FIG. 26, a package 71 includes an image sensor element 72 and a cover glass 73 fixed so as to cover an opening window of the image sensor element 72. The image sensor element 72 is, for example, a CCD (charge coupled device) image sensor element or a CMOS (complementary metal oxide semiconductor) image sensor element. For example, any one of the optical elements 1 according to the first to eleventh embodiments may be used as the cover glass 73, but the optical element 1 according to the tenth embodiment is particularly preferred.

<15. Fifteenth Embodiment>

Figure 27:
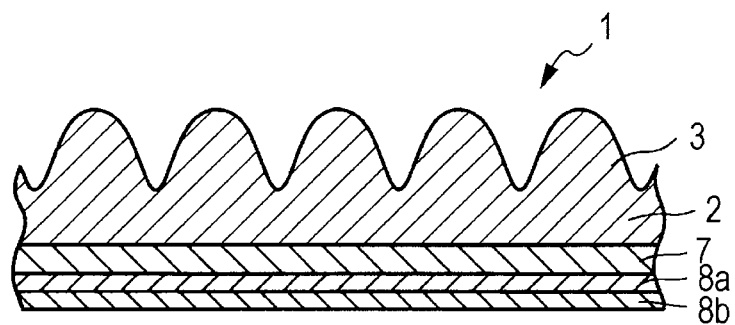
FIG. 27 is a sectional view showing an example of a configuration of an optical element according to a fifteenth embodiment of the present invention.

FIG. 27 is a sectional view showing an example of a configuration of an optical element according to a fifteenth embodiment of the present invention. As shown in FIG. 27, an optical element 1 according to the fifteenth embodiment differs from that of the first embodiment in that the optical element 1 further includes a light-absorbing layer 7 on the back surface (second principal surface) thereof. Furthermore, the optical element 1 may optionally include an adhesive layer between the base 2 and the light-absorbing layer 7 to attach the light-absorbing layer 7 to the base 2 through the adhesive layer. When the adhesive layer is provided in such a manner, the refractive index of the base 2 is preferably equal to or substantially equal to that of the adhesive layer. This can suppress the interface reflection between the base 2 and the adhesive layer. The adhesive layer may have a light-absorbency as with the light-absorbing layer 7. The light-absorbing layer itself may also serve as the adhesive layer.

Furthermore, the optical element 1 may optionally further include an adhesive layer 8a and a detachment layer 8b on the light-absorbing layer 7 in order to attach the optical element 1 to an adherend through the adhesive layer 8a.

The light-absorbing layer 7 has absorbency for light in a use environment or light whose reflection is intended to be reduced. The light-absorbing layer 7 contains, for example, a binder resin and a black coloring agent. Moreover, the light-absorbing layer 7 may optionally further contain additives such as an organic pigment and an inorganic pigment and a dispersing agent for improving dispersion.

Examples of the black coloring agent include carbon black, titanium black, graphite, iron oxide, and titanium oxide. However, the black coloring agent is not particularly limited to these materials. Among them, carbon black, titanium black, and graphite are preferable, and carbon black is more preferable. These materials may be used alone or in combination.

Commercially available carbon black can be used as the carbon black. Examples of the carbon black include #980B, #850B, MCF88B, and #44B available from Mitsubishi Chemical Corporation; BP-800, BP-L, REGAL-660, and REGAL-330 available from Cabot Corporation; RAVEN-1255, RAVEN-1250, RAVEN-1020, RAVEN-780, and RAVEN-760 available from Columbian Chemicals Company; and Printex-55, Printex-75, Printex-25, Printex-45, and SB-550 available from Degussa Corporation. These carbon blacks may be used alone or in combination.

Examples of the binder resin include modified or unmodified vinyl chloride resins, polyurethane resins, phenoxy resins, and polyester resins, in addition to cellulose esters such as cellulose acetate butylate. Furthermore, a thermoplastic resin, a thermosetting resin, an ionizing radiation-curable resin, or the like that is used in a specific method may also be used. An electron beam-curable resin and an ultraviolet curable resin are preferred as the ionizing radiation-curable resin.

The adhesive layer 8a is mainly composed of an adhesive. For example, an adhesive publicly known in the technical field of an optical sheet can be used as the adhesive. Note that, in this specification, a pressure sensitive adhesive (PSA) or the like is regarded as one type of an adhesive. The detachment layer 8b is a detachment sheet for protecting the adhesive layer 8a.

In the fifteenth embodiment, the light-absorbing layer 7 composed of a material having high absorbency for light such as visible light is formed on the back surface of the base, whereby most of the back side reflection can be eliminated. Consequently, there can be suppressed light reflection that occurs on the surface of an unit in the barrel of optical devices such as cameras and telescopes and on the inner periphery surface of the barrel. Thus, optical characteristics such as ghost, flare, and contrast can be improved.

When the adhesive layer 8a is further disposed on the light-absorbing layer 7, the optical element 1 can be easily attached to an adherend such as an optical device including a camera through the adhesive layer 8a. When the detachment layer 8b is further disposed on the adhesive layer 8a, the optical element 1 can be easily handled.

<16. Sixteenth Embodiment>

An optical element 1 according to a sixteenth embodiment differs from that of the fifteenth embodiment in that, instead of the light-absorbing layer 7, at least one of the base 2 and structures 3 contains a black coloring agent such as carbon black so as to have light absorbency.

Figure 28A:
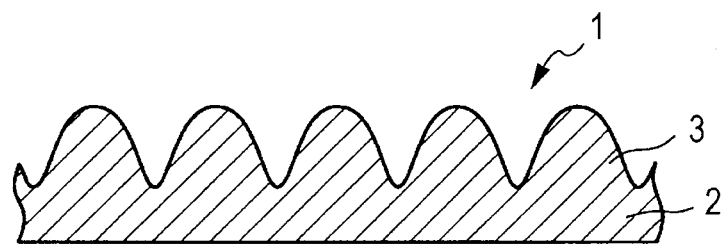
FIGS. 28A to 28C are sectional views showing first to third configuration examples of an optical element according to the fifteenth embodiment of the present invention.

FIG. 28A is a sectional view showing a first configuration example of an optical element according to a sixteenth embodiment of the present invention. As shown in FIG. 28A, the optical element 1 includes the base 2 integrally formed with the structures 3, and both the base 2 and the structures 3 contain the black coloring agent. Thus, both the base 2 and the structures 3 have light absorbency.

Figure 28B:
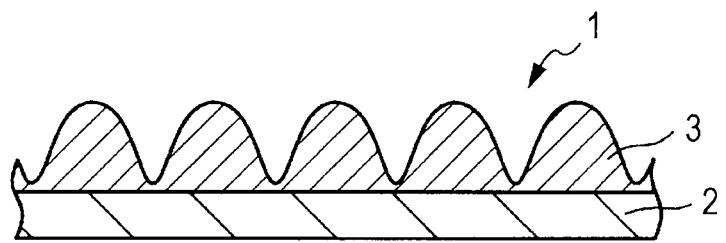

FIG. 28B is a sectional view showing a second configuration example of the optical element according to the sixteenth embodiment of the present invention. As shown in FIG. 28B, the optical element 1 includes the independently formed base 2 and structures 3, and at least one of the base 2 and the structures 3 contains the black coloring agent and has light absorbency. In view of reduction in reflectivity, preferably, only the base 2 contains the black coloring agent and has light absorbency while the structures 3 are transparent.

Figure 28C:
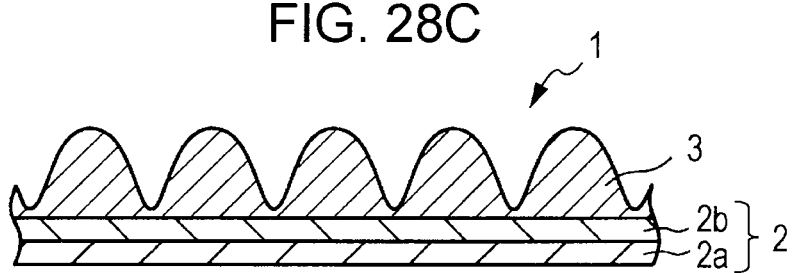

FIG. 28C is a sectional view showing a third configuration example of the optical element according to the sixteenth embodiment of the present invention. As shown in FIG. 28C, the optical element 1 includes the independently formed base 2 and structures 3, and the base 2 is a stacked body. The stacked body has a stacked structure obtained by stacking two or more layers, and at least one layer of the two or more layers contains the black coloring agent and has light absorbency. The structures 3 may contain the black coloring agent and have light absorbency. However, in view of reduction in reflectivity, preferably, only the base 2 contains the black coloring agent and has light absorbency as described above.

In the sixteenth embodiment, since the optical element itself contains the black coloring agent and has light absorbency, the formation of the light-absorbing layer 7 can be omitted. Thus, a light-absorbing layer formation step can be omitted, which can improve productivity. Furthermore, the optical element 1 can be thinned.

<17. Seventeenth Embodiment>

Figure 29:
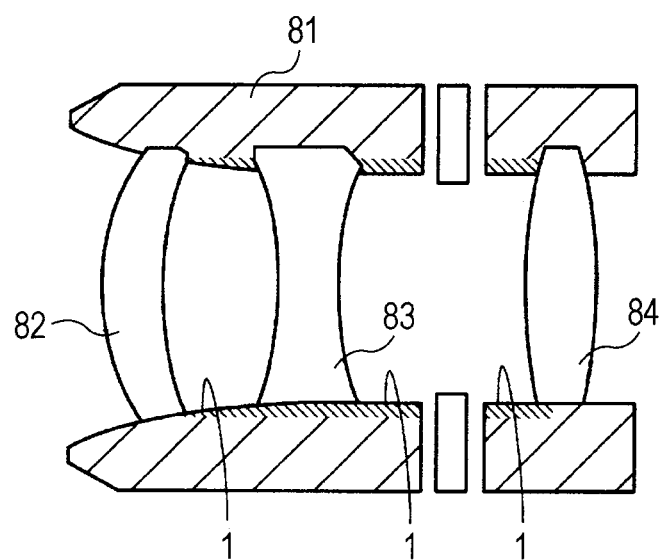
FIG. 29 is a sectional view showing an example of a configuration of a barrel according to a seventeenth embodiment of the present invention.

FIG. 29 is a sectional view showing an example of a configuration of a barrel according to a seventeenth embodiment of the present invention. As shown in FIG. 29, a barrel 81 includes an optical element 1 therein. The specific positions in the barrel where the optical element 1 is provided are, for example, the inner periphery surface of the barrel and the surface of a unit in the barrel. At least one of the optical elements 1 according to the fifteenth and sixteenth embodiments can be used as the optical element 1. Preferably, the optical element 1 is suitably selected in accordance with desired anti-reflection characteristics or the like. The optical element 1 is disposed, for example, in portions between a lens 82 and a lens 83 and between the lens 83 and a lens 84 on the inner periphery surface of the barrel 81. The optical element 1 may be integrally formed with the barrel 81.

In the eighth embodiment, since the optical element 1 is provided to the inner periphery surface of the barrel, the surface of a unit in the barrel, or the like, light reflection caused on the inner periphery surface of the barrel, the surface of a unit in the barrel, or the like can be reduced. Thus, the occurrence of ghost and flare on an image and a decrease in contrast can be suppressed.

<18. Eighteenth Embodiment>

Figure 30A:
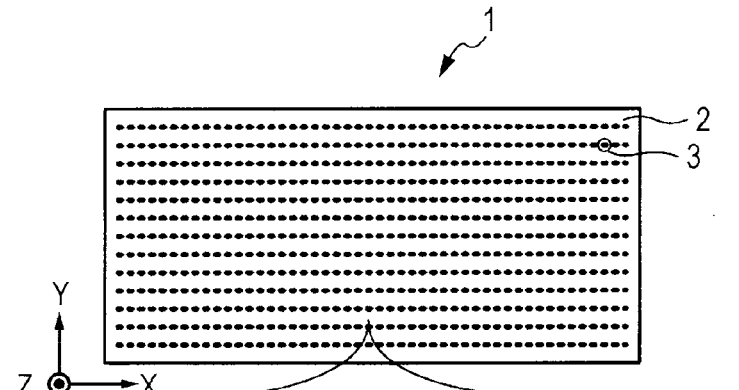
FIG. 30A is a schematic plan view showing an example of a configuration of an optical element according to an eighteenth embodiment of the present invention.
Figure 30B:
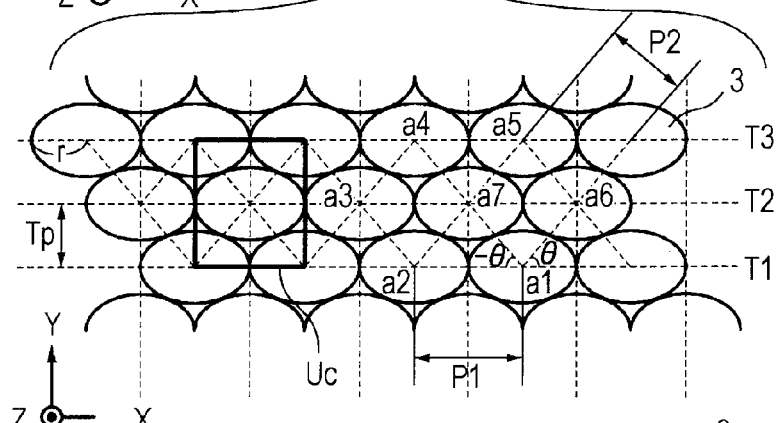
FIG. 30B is a partially enlarged plan view of the optical element shown in FIG. 30A.
Figure 30C:
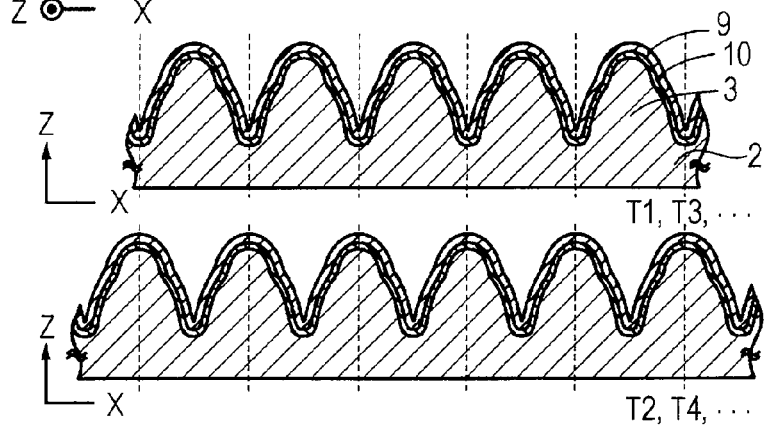
FIG. 30C is a sectional view taken along track T1, T3, ... of FIG. 30B.
Figure 30D:
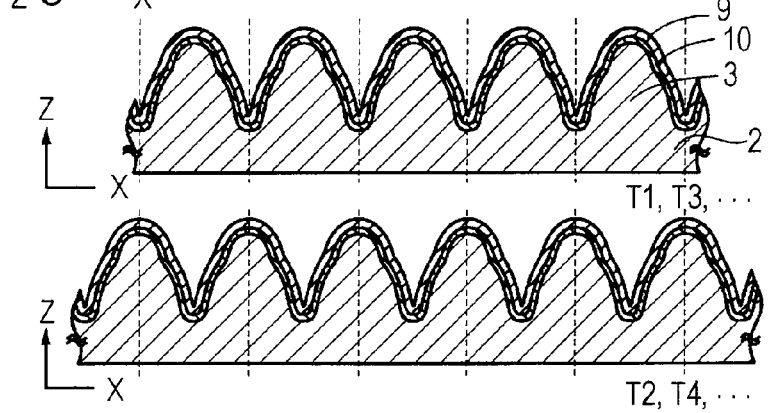
FIG. 30D is a sectional view taken along track T2, T4, ... of FIG. 30B.

FIG. 30A is a schematic plan view showing an example of a configuration of an optical element according to an eighteenth embodiment of the present invention. FIG. 30B is a partially enlarged plan view of the optical element shown in FIG. 30A. FIG. 30C is a sectional view taken along track T1, T3, ... of FIG. 30B. FIG. 30D is a sectional view taken along track T2, T4, ... of FIG. 30B.

An optical element 1 according to the eighteenth embodiment differs from that of the first embodiment in that the optical element 1 is so-called a conductive optical element and further includes a transparent conductive film 9 on the uneven surface of a plurality of structures 2. Furthermore, in view of reduction in surface resistance, a metal film 10 is preferably further formed between the uneven surface of the optical element 1 and the transparent conductive film 9.

(Transparent Conductive Film)

Examples of the material constituting the transparent conductive film 9 include ITO ($In_2O_3$, $SnO_2$), AZO ($Al_2O_3$, ZnO), SZO, FTO, $SnO_2$, GZO, and IZO ($In_2O_3$, ZnO). However, in view of high reliability and low resistivity, ITO is preferred. The transparent conductive film 9 is formed along the surface shape of the structures 3, and the surface shape of the transparent conductive film 9 is preferably substantially similar to that of the structures 3. This is because the change in a refractive index profile caused by the formation of the transparent conductive film 9 can be suppressed and good anti-reflection characteristics and/or transmission characteristics can be maintained.

(Metal Film)

The metal film 10 is preferably formed as a base layer of the transparent conductive film 9. This is because the resistivity can be reduced and the transparent conductive film 9 can be thinned, or when the electrical conductivity does not reach a sufficient value with only the transparent conductive film 9, the electrical conductivity can be compensated. The thickness of the metal film 10 is not particularly limited, and is, for example, about several nanometers. Since the metal film 10 has high electrical conductivity, sufficient surface resistance can be achieved at a thickness of several nanometers. Furthermore, a thickness of about several nanometers hardly produces optical effects such as absorption and reflection due to the metal film 10. The metal film 10 is preferably composed of a metal material having high electrical conductivity. Examples of the metal material include Ag, Al, Cu, Ti, Nb, and Si doped with impurities. However, in view of high electrical conductivity, the use results, and the like, Ag is preferred. Sufficient surface resistance can be achieved with only the metal film 10. However, if the metal film 10 is extremely thin, the metal film 10 has an island structure, which makes it difficult to ensure continuity. In this case, it is important to form the transparent conductive film 9 that is an upper layer of the metal film 10 in order to electrically connect the island-shaped metal films 10 to one another.

<19. Nineteenth Embodiment>

Figure 31:
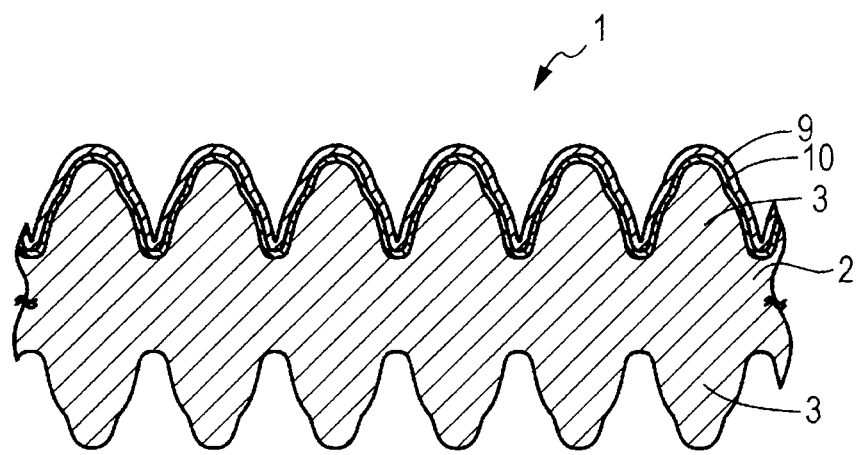
FIG. 31 is a sectional view showing an example of a configuration of an optical element according to a nineteenth embodiment of the present invention.

FIG. 31 is a sectional view showing an example of a configuration of a conductive optical element according to a nineteenth embodiment of the present invention. As shown in FIG. 31, an optical element 1 according to the nineteenth embodiment differs from that of the eighteenth embodiment in that, in addition to one principal surface (first principal surface) on which the structures 3 are formed, structures 3 are further formed on the other principal surface (second principal surface) opposite the first principal surface.

The arrangement patterns and aspect ratios of the structures 3 formed on both principal surfaces of the optical element 1 are not necessarily the same, and different arrangement patterns and aspect ratios may be selected in accordance with desired characteristics. For example, one principal surface may have a quasi-hexagonal lattice pattern as an arrangement pattern and the other principal surface may have a quasi-tetragonal lattice pattern as an arrangement pattern.

In the nineteenth embodiment, since a plurality of structures 3 are formed on both principal surfaces of the base 2, an anti-reflection function of light can be imparted to the light-entering and light-emitting surfaces of the optical element 1. Thus, light transmission characteristics can be further improved.

<20. Twentieth Embodiment>

Figure 32A:
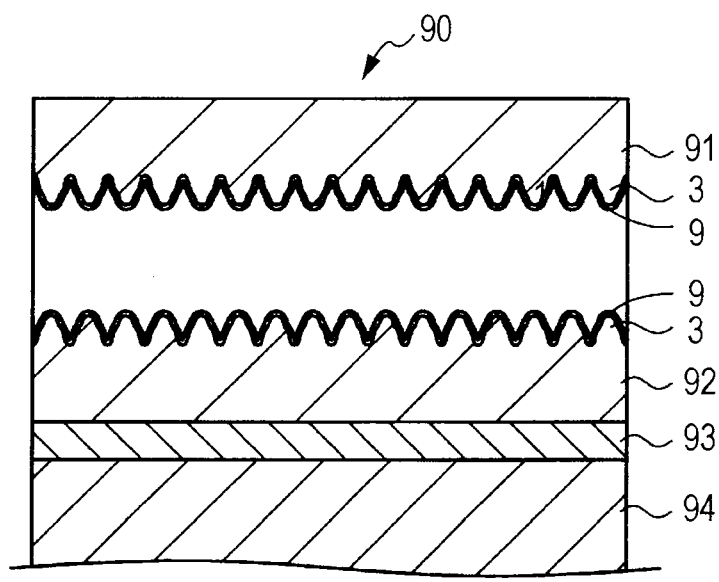
FIG. 32A is a sectional view showing an example of a configuration of a touch panel according to a twentieth embodiment of the present invention.

FIG. 32A is a sectional view showing an example of a configuration of a touch panel according to a twentieth embodiment of the present invention. As shown in FIG. 32A, a touch panel 90 includes a first conductive substrate 91 and a second conductive substrate 92 facing the first conductive substrate 91. The touch panel 90 preferably further includes a hard coat layer or an antifouling hard coat layer on the surface on the touch side of the first conductive substrate 91. Moreover, a front panel may be optionally further disposed on the touch panel 90. For example, the touch panel 90 is attached to a display device 94 through an adhesive layer 93.

Examples of the display device include various display devices such as a liquid crystal display, a CRT (cathode ray tube) display, a plasma display panel (PDP), an electro luminescence (EL) display, and a surface-conduction electron-emitter display (SED).

One of the optical elements 1 according to the eighteenth and nineteenth embodiments is used as at least one of the first conductive substrate 91 and the second conductive substrate 92. When one of the optical elements 1 according to the eighteenth and nineteenth embodiments is used as both the first conductive substrate 91 and the second conductive substrate 92, the optical element 1 according to the same embodiment or the optical elements 1 according to the different embodiments can be used as the conductive substrates.

The structures 3 are formed on at least one of the two surfaces of the first conductive substrate 91 and the second conductive substrate 92, the two surfaces facing each other. In view of anti-reflection characteristics and transmission characteristics, the structures 3 are preferably formed on both the two surfaces.

Figure 32B:
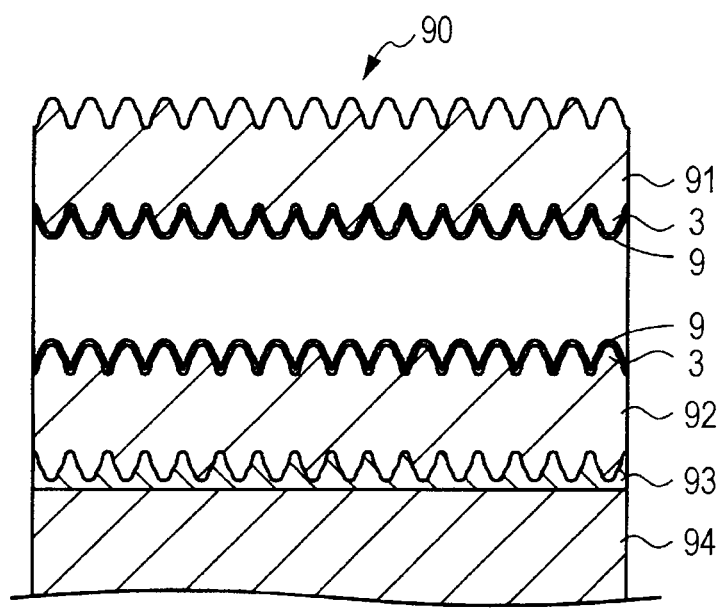
FIG. 32B is a sectional view showing a modification of the configuration of the touch panel according to the twentieth embodiment of the present invention.

FIG. 32B is a sectional view showing a modification of the touch panel according to the twentieth embodiment of the present invention. As shown in FIG. 32B, the optical element 1 according to the nineteenth embodiment is used as at least one of the first conductive substrate 91 and the second conductive substrate 92.

A plurality of structures 3 are formed on at least one of the two surfaces of the first conductive substrate 91 and the second conductive substrate 92, the two surfaces facing each other. Furthermore, a plurality of structures 3 are formed on at least one of the surface on the touch side of the first conductive substrate 91 and the surface on the display device 94 side of the second conductive substrate 92. In view of anti-reflection characteristics and transmission characteristics, the structures 3 are preferably formed on both the surfaces.

In the twentieth embodiment, since the optical element 1 is used as at least one of the first conductive substrate 91 and the second conductive substrate 92, a touch panel 90 having good anti-reflection characteristics and transmission characteristics can be obtained. Thus, the visibility of a display device having the touch panel 90 can be improved. In particular, the visibility of a display device in the outside can be improved.

<21. Twenty-first Embodiment>

Figure 33:
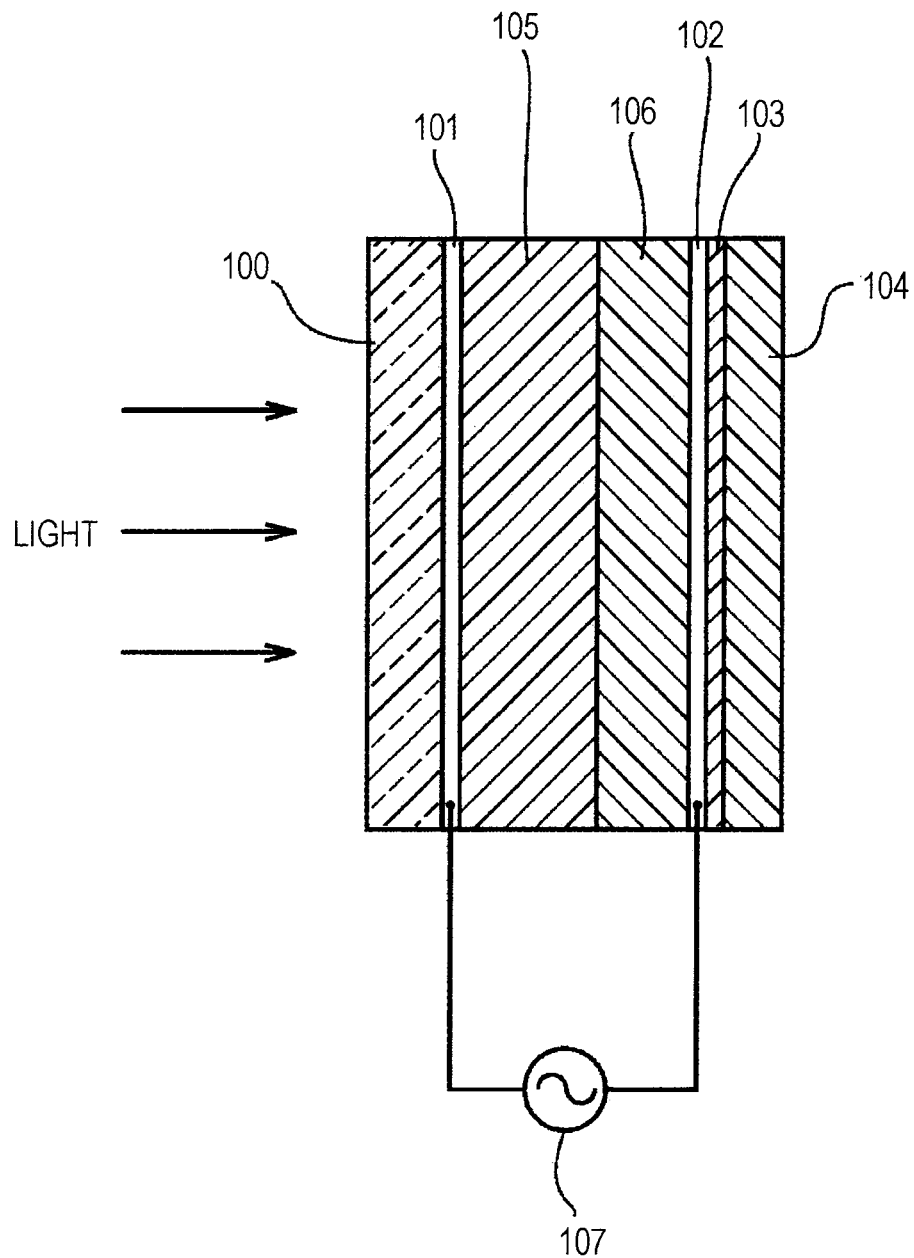
FIG. 33 is a schematic diagram of a dye-sensitized solar cell used as a photoelectric conversion apparatus described in a twenty-first embodiment of the present invention.

FIG. 33 shows a twenty-first embodiment of the present invention. In this embodiment, there is exemplified a dye-sensitized solar cell 110 in which any one of the optical elements 1 having the configurations described in the first to eleventh embodiments is used as a light guide window 100.

The dye-sensitized solar cell 110 of this embodiment is constituted by a stacked body obtained by disposing a metal-oxide semiconductor layer 105 and an electrolyte layer 106 between the light guide window 100 having a transparent conductive film 101 and a substrate 104 having a current collector 103 and a (transparent) conductive film 102 that opposes the transparent conductive film 101. The semiconductor layer 105 has, for example, an oxide semiconductor material and a sensitizing dye. Furthermore, the transparent conductive film 101 and the conductive film 102 are connected to each other through a conducting wire, and a current circuit having an ammeter (amperemeter) 107 is formed.

A glass substrates or a transparent plastic substrate is used for the light guide window 100. The structures 3 described in the first embodiment and having a quasi-hexagonal lattice minute arrangement structure (sub-wavelength structure) are formed on the light-entering surface (light-receiving surface) on the outer side of the light guide window 100 and on the light-emitting surface on the inner side.

The metal-oxide semiconductor layer 105 constitutes a photoelectric conversion layer obtained by sintering metal-oxide particles onto the transparent conductive film 101. Examples of the material of the metal-oxide semiconductor layer 105 include metal oxides such as $TiO_2$, MgO, ZnO, $SnO_2$, $WO_2$, $Nb_2O_5$, and $TiSrO_3$. Furthermore, a sensitizing dye is supported on the metal-oxide semiconductor layer 105, and the metal-oxide semiconductor is sensitized by the sensitizing dye. The sensitizing dye is not particularly limited as long as it provides a sensitization action. Examples of the sensitizing dye include bipyridine, phenanthrene derivatives, xanthene dyes, cyanine dyes, basic dyes, porphyrin compounds, azo dyes, phthalocyanine compounds, anthraquinone dyes, and polycyclic quinone dyes.

The electrolyte layer 106 is obtained by dissolving, in an electrolyte, at least one material system that reversibly causes an oxidation-reduction state change (oxidation-reduction system). The electrolyte may be a liquid electrolyte or may be a gel electrolyte obtained by adding the liquid electrolyte to a polymer material, a polymer solid material, or an inorganic solid electrolyte. Examples of the oxidation-reduction system include halogens such as $I^-/I^{3-}$ and $Br^-/Br_2$, pseudohalogens such as quinone/hydroquinone and $SCN^-/(SCN)_2$, iron (II) ions/iron (III) ions, and copper (I) ions/copper (II) ions. However, the oxidation-reduction system is not limited thereto. There can be used, as a solvent, nitriles such as acetonitrile, carbonates such as propylene carbonate and ethylene carbonate, gamma-butyrolactone, pyridine, dimethylacetamide, other polar solvents, room temperature molten salts such as methylpropylimidazolium-iodine, and mixtures thereof.

In the dye-sensitized solar cell 110 having the above-described configuration, light received on the light-receiving surface of the light guide window 100 excites the sensitizing dye supported on the surface of the metal-oxide semiconductor layer 105, and the sensitizing dye immediately supplies electrons to the metal-oxide semiconductor layer 105. On the other hand, the sensitizing dye that has lost electrons receives electrons from ions in the electrolyte layer 106 that is a carrier transport layer. The molecules that have supplied electrons receive electrons from the counter electrode 102. In such a manner, a current flows between the electrodes 101 and 102.

According to this embodiment, since the light-receiving surface of the dye-sensitized solar cell 110 is constituted by the light guide window 100 as the optical element according to the present invention, the surface reflection of light received on the light-receiving surface (light-entering surface) and the reflection of transmitted light caused on the rear surface (light-emitting surface) of the light guide window 100 can be effectively prevented. This can increase the use efficiency of the received light and can improve photoelectric conversion efficiency, that is, power generation efficiency.

Moreover, the light-entering and light-emitting surfaces of the light guide window 100 have a sub-wavelength structure in which the structures 3 (FIG. 1B) are finely arranged at a pitch shorter than a wavelength of visible light, which can effectively increase the photoelectric conversion efficiency of the photoelectric conversion portion having sensitivity in the range of the near-ultraviolet region to the visible light region and the near-infrared region.

(Thirty-Fourth Embodiment)

Figure 34:
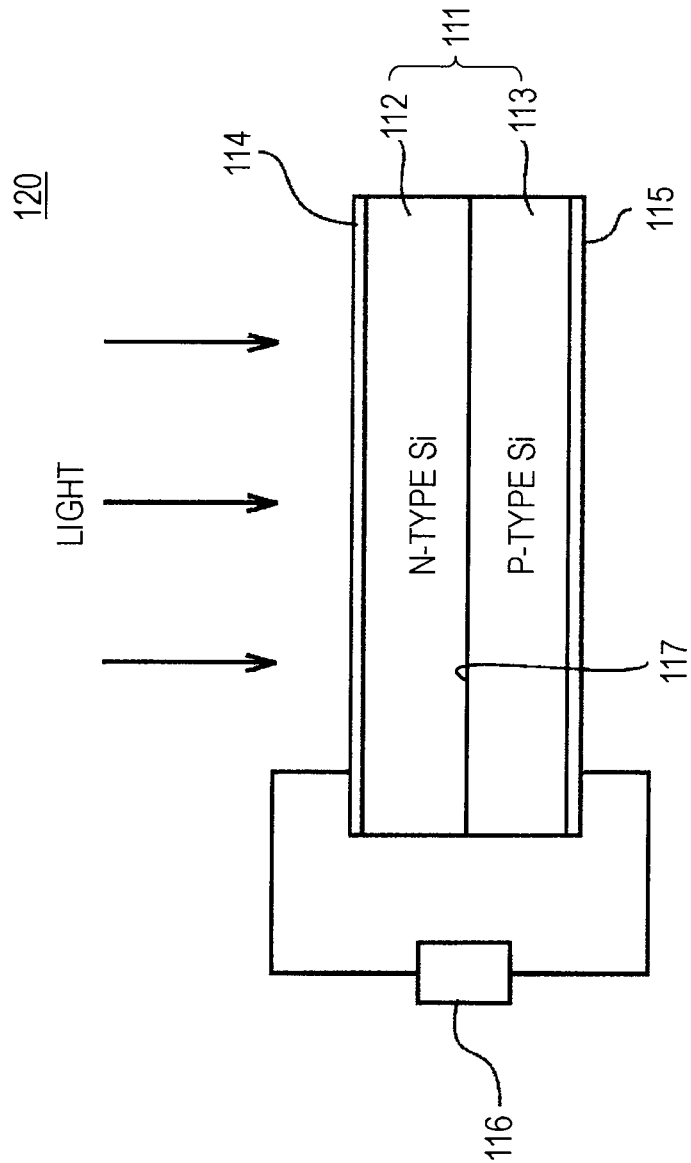
FIG. 34 is a schematic diagram of a silicon solar cell used as a photoelectric conversion apparatus described in a twenty-second embodiment of the present invention.

FIG. 34 shows a thirty-fourth embodiment of the present invention. In this embodiment, there is described an example in which the present invention is applied to a silicon solar cell 120 as a photoelectric conversion apparatus.

FIG. 34 schematically shows a configuration of the silicon solar cell 120. The silicon solar cell 120 includes a silicon substrate 111, transparent conductive films 114 and 115 respectively formed on the front and back surfaces of the silicon substrate 111, and a load 116 connected between the transparent conductive films 114 and 115. The silicon substrate 111 is a junction Si substrate having an n-type semiconductor layer 112 and a p-type semiconductor layer 113. A pn junction 117 of the n-type semiconductor layer 112 and the p-type semiconductor layer 113 constitutes a photoelectric conversion layer that generates electricity based on the intensity of incident light that enters the n-type semiconductor layer 112.

In this embodiment, the surface of the n-type semiconductor layer 112 that constitutes a light-receiving surface has a sub-wavelength structure in which the structures 3 (FIG. 1B) are arranged in a quasi-hexagonal lattice at a fine pitch shorter than or equal to a wavelength of incident light to prevent the reflection of light on the light-entering surface of the n-type semiconductor layer 112 and to improve transmission characteristics. This can increase the photoelectric conversion efficiency at the pn junction 117.

Furthermore, a minute arrangement structure of the structures 3 (FIG. 1B) formed on the light-entering surface of the silicon substrate 111 is formed at a fine pitch shorter than or equal to a wavelength of near-ultraviolet light, whereby the photoelectric conversion efficiency of a Si solar cell having sensitivity in the wide range of the near-ultraviolet region to the near-infrared region can be dramatically improved.

The silicon solar cell 120 having the above-described configuration can be manufactured by directly etching the surface of the silicon substrate 111 constituting the n-type semiconductor layer 112. FIG. 35 is a sectional view of a principal part of a processing chart for describing a method for manufacturing the silicon solar cell.

First, as shown in FIG. 35A, a resist layer 130 is formed on the surface of the silicon substrate 111. A mask pattern of the resist layer 130 is formed on the surface of the silicon substrate 111 by using an exposure technology based on the optical disc recording technology described in the second embodiment and by performing development treatment. Next, etching is performed with fluorocarbon gas such as $CF_4$ using the mask pattern of the manufactured resist layer 130 as a mask to form an uneven pattern constituted by depressions 131 having a conical form on the surface of the silicon substrate 111 as shown in FIG. 35B. Through the steps described above, a silicon substrate 111 having a sub-wavelength structure surface is manufactured.

EXAMPLES

Hereinafter, the present invention is specifically described using Examples, but is not limited to only Examples. Note that a simulation used in Examples is a RCWA (Rigorous Coupled Wave Analysis) simulation.

Examples of the present invention are described in the following order.
1. Investigation about the shape of structures through a simulation
2. Investigation about the relationship between inflection point and reflectivity through a simulation (1)
3. Investigation about the relationship between inflection point and reflectivity through a simulation (2)
4. Evaluation about the reflection characteristics with an actually prepared sample <1. Investigation about the Shape of Structures Through a Simulation>

The shape of structures whose effective refractive index monotonically increases and has two or more inflection points was investigated through a simulation. Note that the pitch of structures in the following Examples is a length of the short sides of a rectangular lattice as shown in FIG. 36A. However, when the lattice is a tetragonal lattice as shown in FIG. 36B, the sides are not particularly differentiated and the length of the sides is referred to as a pitch.

Examples 1-1 to 1-3

Figure 37C:
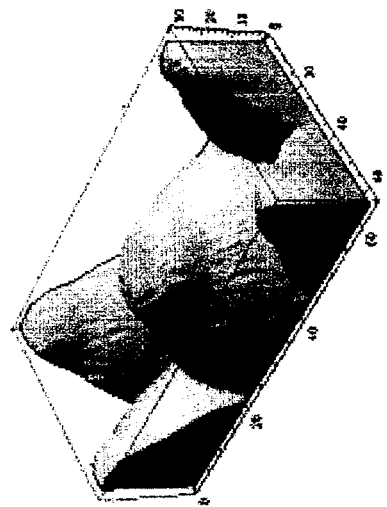
FIG. 37 is a perspective view showing the shape of structures in Examples 1-1 to 1-3.
Figure 37B:
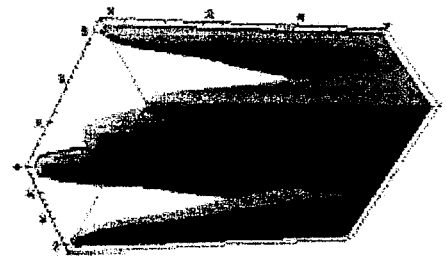
Figure 37A:
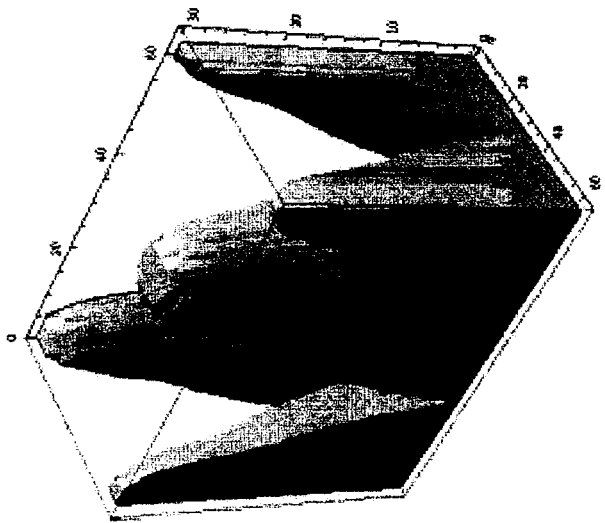

In the case where the structures are arranged in a hexagonal lattice, there were investigated the shapes of the structures whose effective refractive index in the depth direction thereof monotonically increases and has two inflection points. FIGS. 37A to 37C show the results.

Examples 2-1 to 2-3

Figure 38A:
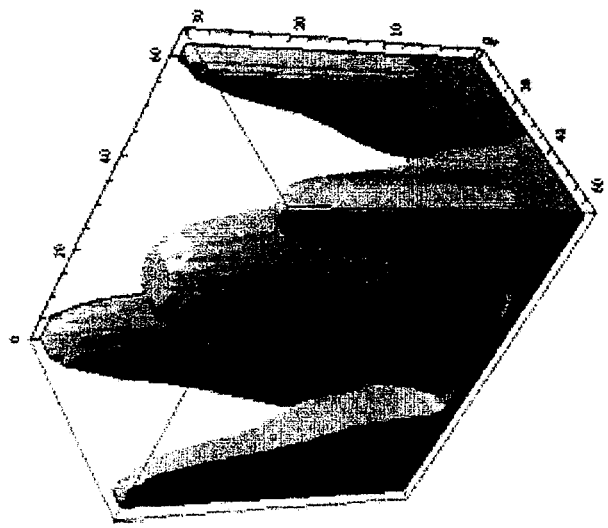
FIG. 38 is a perspective view showing the shape of structures in Examples 2-1 to 2-3.
Figure 38B:
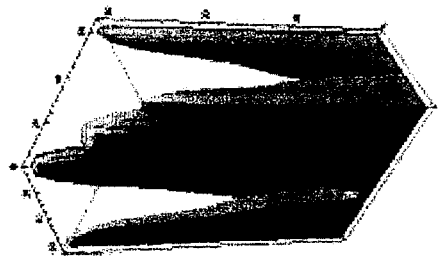
Figure 38C:
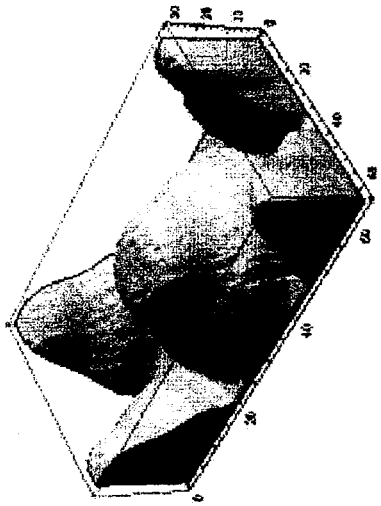

In the case where the structures are arranged in a hexagonal lattice, there were investigated the shapes of the structures whose effective refractive index in the depth direction thereof monotonically increases and has three inflection points. FIGS. 38A to 38C show the results.

Examples 3-1 to 3-3

In the case where the structures are arranged in a hexagonal lattice, there were investigated the shapes of the structures whose effective refractive index in the depth direction thereof monotonically increases and has five inflection points. FIGS. 39A to 39C show the results.

Examples 4-2 to 4-3

Figure 40A:
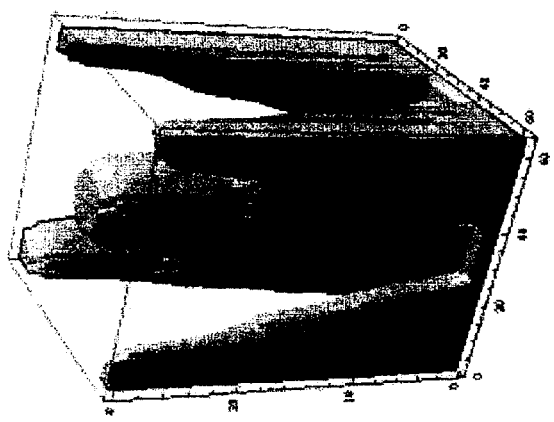
FIG. 40 is a perspective view showing the shape of structures in Examples 4-1 to 4-3.
Figure 40B:
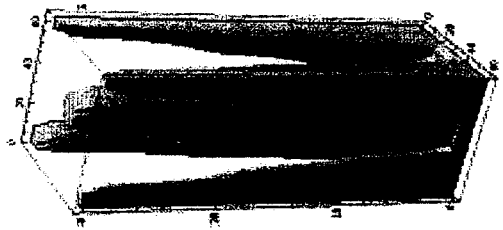
Figure 40C:
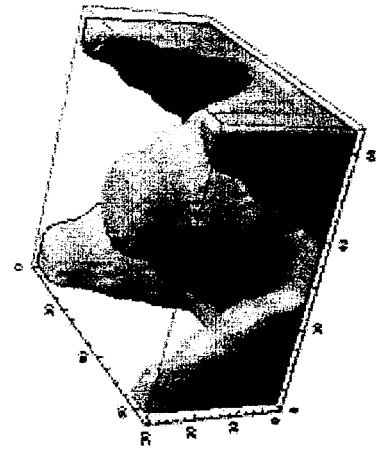

In the case where the structures are arranged in a tetragonal lattice, there were investigated the shapes of the structures whose effective refractive index in the depth direction thereof monotonically increases and has five inflection points. FIGS. 40A to 40C show the results.

Example 5

Figure 41A:
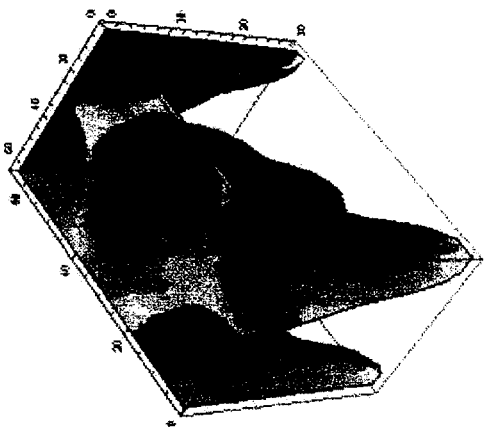
FIG. 41A is a perspective view showing the shape of structures in Example 5.

In the case where the structures are arranged in a quasi-hexagonal lattice, there was investigated the shape of the structures whose effective refractive index in the depth direction thereof monotonically increases and has three inflection points. FIG. 41A shows the result.

Example 6

Figure 41B:
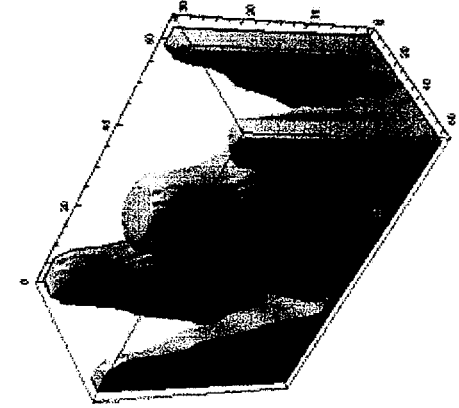
FIG. 41B is a perspective view showing the shape of structures in Example 6.

In the case where the structures are arranged in a quasi-hexagonal lattice, there was investigated the shape of the structures whose effective refractive index in the depth direction thereof monotonically increases and has five inflection points. FIG. 41B shows the result.

Example 7

Figure 41C:
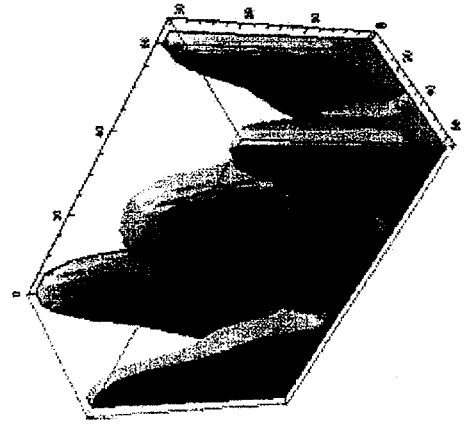
FIG. 41C is a perspective view showing the shape of structures in Example 7.

In the case where the structures are arranged in a hexagonal lattice, there was investigated the shape in which the projections/depressions of the structures whose effective refractive index in the depth direction thereof monotonically increases and has three inflection points are reversed. FIG. 41C shows the result.

It is clear from FIGS. 37A to 41C that the inflection point and the shape of the structures have the following relationships.

Examples 1-1 to 1-3 (two inflection points, hexagonal lattice): there are a slope step at the top and one slope step on the curved surface of structures.

Examples 2-1 to 2-3 (three inflection points, hexagonal lattice): there are a slope step at the top, one slope step on the curved surface of structures, and a slope step at the bottom.

Examples 3-1 to 3-3 (five inflection points, hexagonal lattice): there are a slope step at the top, two slope steps on the curved surface of structures, and a slope step at the bottom.

Examples 4-1 to 4-3 (five inflection points, tetragonal lattice): there are a slope step at the top, two slope steps on the curved surface of structures, and a slope step at the bottom.

Example 5 (three inflection points, quasi-hexagonal lattice): there are a slope step at the top, one slope step on the curved surface of structures, and a slope step at the bottom.

Example 6 (five inflection points, quasi-hexagonal lattice): there are a slope step at the top, two slope steps on the curved surface of structures, and a slope step at the bottom.

<2. Investigation about the Relationship Between Inflection Point and Reflectivity Through a Simulation (1)>

Assuming a refractive index profile having inflection points, the relationship between inflection point and reflectivity was investigated on the basis of the refractive index profile through a simulation.

Examples 8 to 10

Figure 42A:
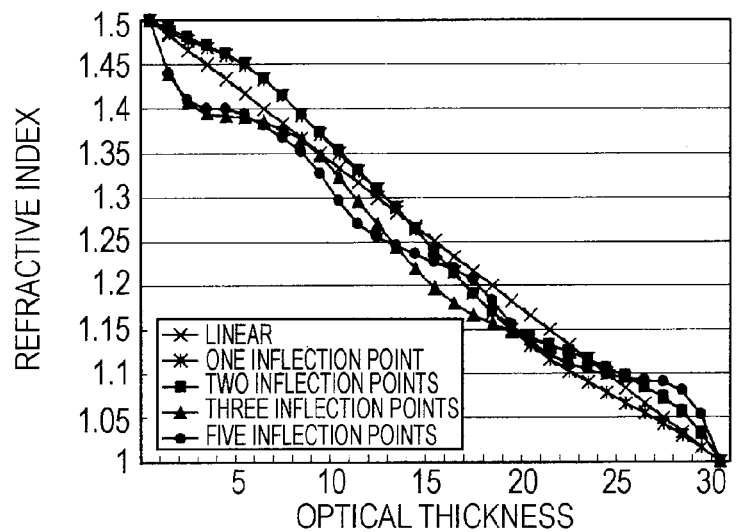
FIG. 42A is a graph showing refractive index profiles of Examples 8 to 10 and Comparative Examples 1 and 2.
Figure 42B:
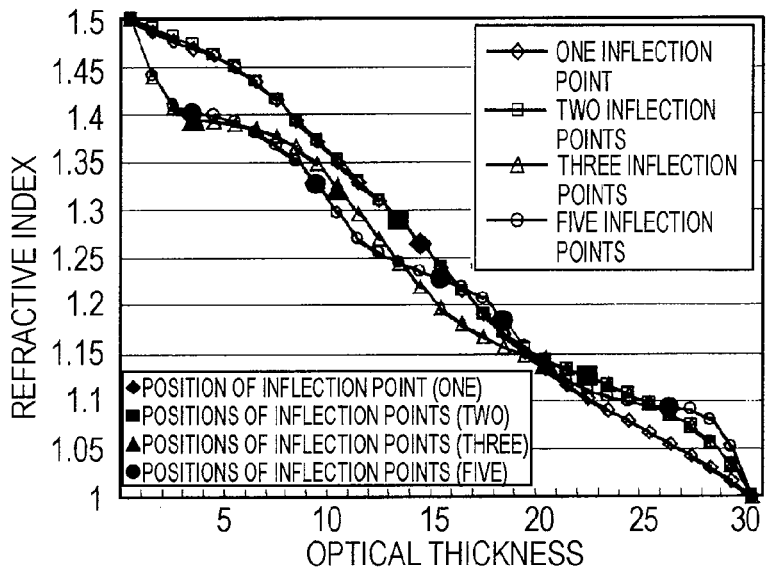
FIG. 42B is a graph showing the positions of inflection points in the refractive index profiles of Examples 8 to 10 and Comparative Examples 1 and 2.
Figure 42C:
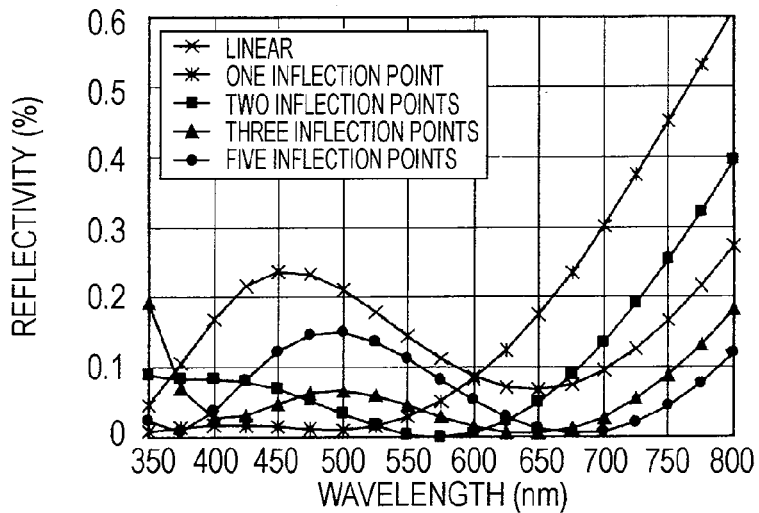
FIG. 42C is a graph showing the wavelength dependence of reflectivities of Examples 8 to 10 and Comparative Examples 1 and 2.

First, as shown in FIGS. 42A and 42B, refractive index profiles were assumed in which the numbers of inflection points of effective refractive indices in the depth direction of structures are two, three, and five. Note that, since the optical thickness is based on the bottom surface of the structures in FIGS. 42A and 42B, the refractive index profile is opposite to that shown in FIG. 2. Next, the reflectivities of the optical elements were obtained on the basis of the refractive index profiles. Herein, the height of the structures was 250 nm. FIG. 42C shows the results.

Comparative Example 1

First, as shown in FIG. 42A, a refractive index profile was assumed in which the number of inflection points of an effective refractive index in the depth direction of structures is one. Next, the reflectivity of the optical element was obtained on the basis of the refractive index profile. Herein, the height of the structure was 250 nm. FIG. 42C shows the result.

Comparative Example 2

First, as shown in FIG. 42A, a refractive index profile was assumed in which an effective refractive index in the depth direction of structures has no inflection points and is linear. Next, the reflectivity of the optical element was obtained on the basis of the refractive index profile. Herein, the height of the structure was 250 nm. FIG. 42C shows the result.

It is clear from FIGS. 42A to 42C that the number of inflection points and reflectivity have the following relationships.

Comparative Example 1 (one inflection point): the reflectivity increases in the long wavelength region.

Comparative Example 2 (no inflection point): the reflectivity increases in the entire spectrum (in particular, in the short wavelength region).

Example 8 (two inflection points): the reflectivity tends to increase to some extent in the long wavelength region, but the amount of the increase is smaller than that in Comparative Example 1. The reflectivity is 0.1% or less in the substantially entire region of a visible light region of 400 nm to 700 nm.

Example 9 (three inflection points): the amount of the increase in the reflectivity is small in the long wavelength region, and the reflectivity is 0.1% or less in the entire region of a visible light region of 400 nm to 700 nm.

Example 10 (five inflection points): the reflectivity increases to some extent around a wavelength of 500 nm, but is extremely low in the short and long wavelength regions. The reflectivity decreases in the wide range of wavelength 350 to 800 nm.

<3. Investigation about the Relationship Between Inflection Point and Reflectivity Through a Simulation (2)>

Assuming a refractive index profile having inflection points, the relationship between inflection point and reflectivity was investigated on the basis of the refractive index profile through a simulation.

Examples 11 to 12

Figure 43A:
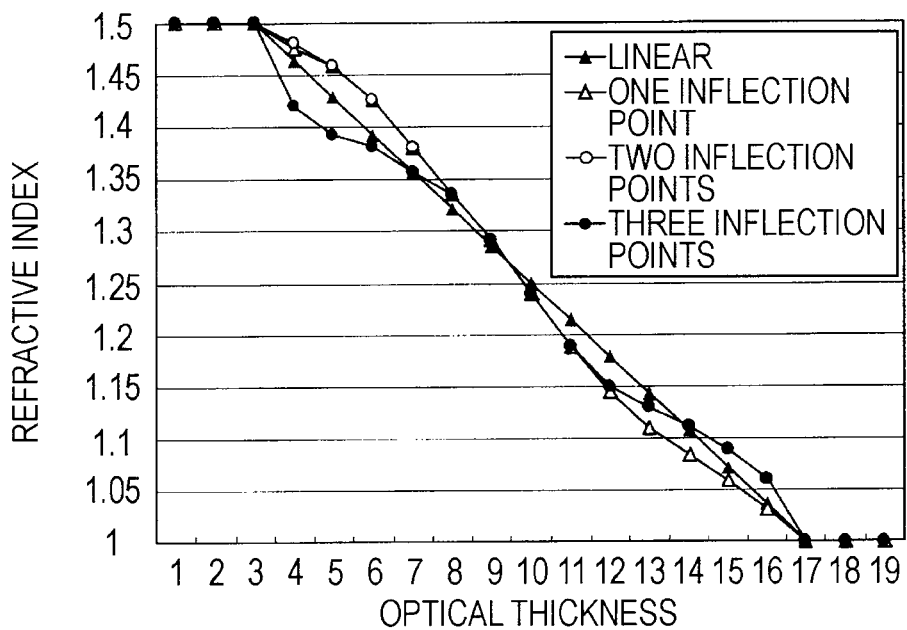
FIG. 43A is a graph showing refractive index profiles of Examples 11 and 12 and Comparative Examples 3 and 4.
Figure 43B:
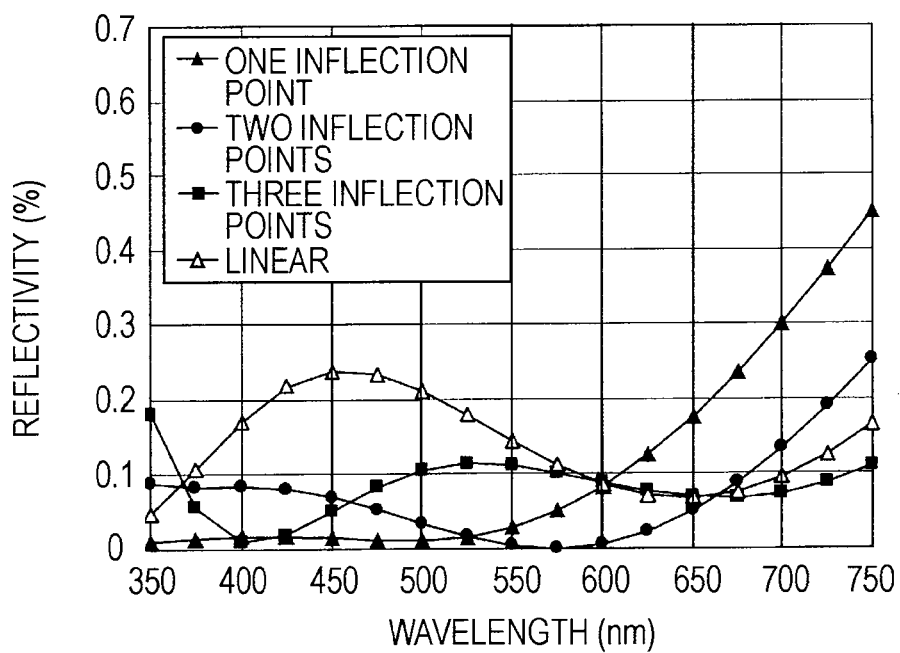
FIG. 43B is a graph showing the wavelength dependence of reflectivities of Examples 11 and 12 and Comparative Examples 3 and 4.

First, as shown in FIG. 43A, refractive index profiles were assumed in which the numbers of inflection points of effective refractive indices in the depth direction of structures are two and three. Next, the reflectivities of the optical elements were obtained on the basis of the refractive index profiles. Herein, the height of the structures was 250 nm. FIG. 43B shows the results.

Comparative Example 3

First, as shown in FIG. 43A, a refractive index profile was assumed in which the number of inflection points of an effective refractive index in the depth direction of structures is one. Next, the reflectivity of the optical element was obtained on the basis of the refractive index profile. Herein, the height of the structures was 250 nm. FIG. 43B shows the result.

Comparative Example 4

First, as shown in FIG. 43A, a refractive index profile was assumed in which an effective refractive index in the depth direction of structures has no inflection points and is linear. Next, the reflectivity of the optical element was obtained on the basis of the refractive index profile. Herein, the height of the structures was 250 nm. FIG. 43B shows the result.

It is clear from FIGS. 43A and 43B that the number of inflection points and reflectivity have the following relationships.

Comparative Example 3 (one inflection point): the reflectivity increases in the long wavelength region.

Comparative Example 4 (no inflection point): the reflectivity increases in the entire spectrum (in particular, in the short wavelength region).

Example 11 (two inflection points): the reflectivity tends to increase to some extent in the long wavelength region, but the amount of the increase is smaller than that in Comparative Example 1. The reflectivity is 0.1% or less in the substantially entire region of a visible light region of 400 nm to 700 nm.

Example 12 (three inflection points): the amount of the increase in the reflectivity is small in the long wavelength region, and the reflectivity is 0.1% or less in the entire region of a visible light region of 400 nm to 700 nm.

Up to this point, the embodiments and Examples of the present invention have been specifically described. However, the present invention is not limited to the above-described embodiments and Examples, and various modifications can be made on the basis of the technical ideas of the present invention.

For example, the numerical values, shapes, materials, and configurations exemplified in the embodiments and Examples are mere examples, and different numerical values, shapes, materials, and configurations may be optionally used.

<4. Evaluation about the Reflection Characteristics with an Actually Prepared Sample>

A sample was actually prepared and the reflection characteristics of the prepared sample were evaluated.

Example 13

First, a glass roll master having an outer diameter of 126 mm was prepared, and a resist layer was formed on the surface of the glass roll master as follows. That is to say, a photoresist was diluted with a thinner by a factor of 1/10, and the diluted resist was applied on the columnar surface of the glass roll master by dipping so as to have a thickness of about 70 nm, whereby the resist layer was formed. Next, the glass roll master as a recording medium was transferred to the roll master exposure apparatus shown in FIG. 7. By exposing the resist layer, a latent image having a quasi-hexagonal lattice pattern in the three adjacent rows of tracks was patterned on the resist layer so as to form a single spiral shape.

Specifically, a region where a quasi-hexagonal lattice pattern was to be formed was irradiated with laser beams having a power of 0.50 mW/m that reach the surface of the glass roll master to form the quasi-hexagonal lattice pattern having depressions. Note that the thickness of the resist layer in the column direction of track rows was about 60 nm and the thickness of the resist layer in the track extending direction was about 50 nm.

Subsequently, by subjecting the resist layer on the glass roll master to development treatment, an exposed portion of the resist layer was dissolved to perform development. Specifically, an undeveloped glass roll master was placed on a turntable of a developing apparatus (not shown). A developer was dropwise applied onto the surface of the glass roll master while the glass roll master was rotated together with the turntable, to develop the resist layer on the surface. Thus, a resist glass roll master whose resist layer has openings in a quasi-hexagonal lattice pattern was obtained Next, etching treatment and ashing treatment were alternately performed on the resist glass roll master using a roll etching machine. Thus, a pattern of structures (depressions) having a conical form was formed. Furthermore, by suitably adjusting the processing time of the etching treatment and ashing treatment, the top of the structures was shaped into a convex curved surface and steps were formed on the side surface. That is to say, steps were formed on the top and the side surface. Thus, the shape of the structures whose effective refractive index in the depth direction thereof gradually increases toward a base and has two inflection points was obtained.

Herein, the roll etching machine is a plasma etching apparatus having a pillar-shaped electrode, and is configured such that the pillar-shaped electrode is inserted into the hollow of the cylindrical glass roll master and plasma etching is performed on the cylindrical surface of the glass roll master.

Finally, by completely removing the resist layer by $O_2$ ashing, a moth-eye glass roll master having a depressed quasi-hexagonal lattice pattern was obtained. The depth of the depression in the column direction was larger than that in the track extending direction.

Subsequently, the moth-eye glass roll master was brought into close contact with an acrylic sheet to which an ultraviolet curable resin has been applied, and they were then detached from each other while being cured by applying ultraviolet rays. Consequently, an optical sheet having a surface on which a plurality of structures were arranged was obtained.
(Evaluation of Shape)

Figure 44:
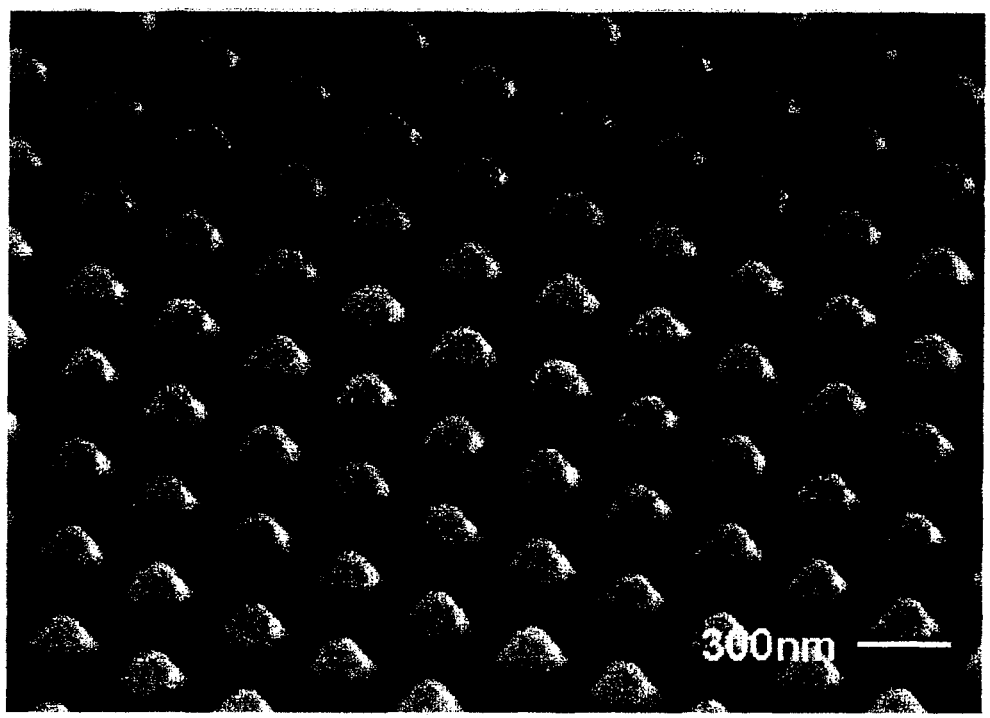
FIG. 44 is a photograph showing a SEM observation result of the structure-formed surface of an optical element of Example 13.

The uneven surface of the optical element of Example 13 manufactured as described above was observed using a scanning electron microscope (SEM). FIG. 44 shows the result.

The pitch, height, and the like of the structures obtained from the SEM observation are shown below.
Arrangement: quasi-hexagonal lattice
Pitch (track extending direction): 300 nm
Height: 200 nm
Shape: a shape having steps at the top and on the side surface (an effective refractive index has two inflection points)
Polarization: none
(Evaluation of Reflectivity)

Figure 45:
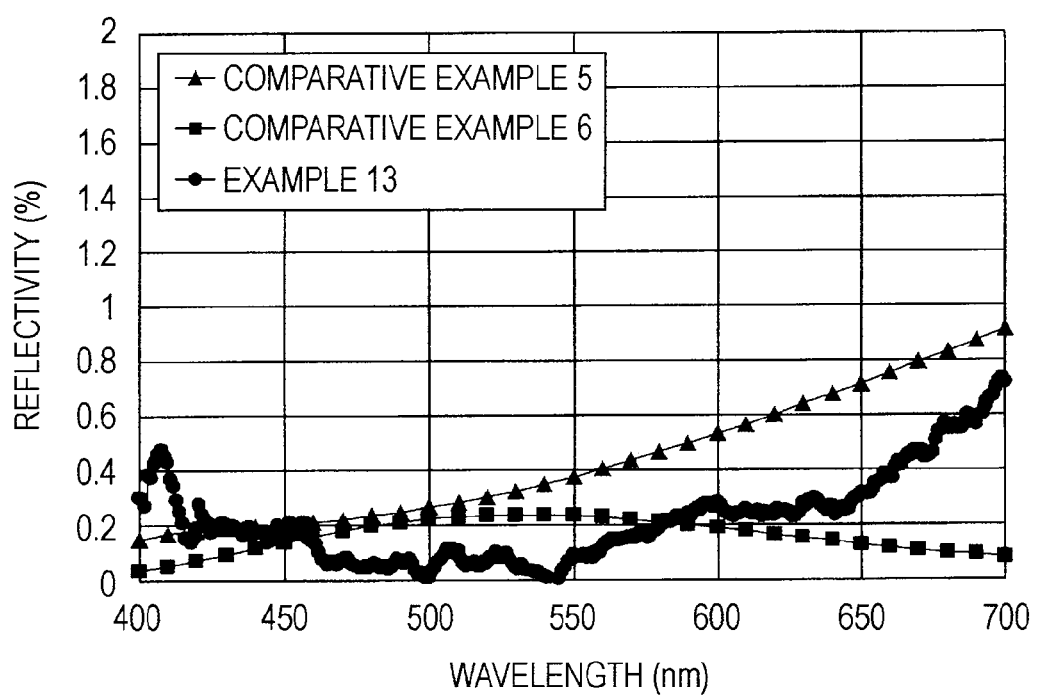
FIG. 45 is a graph showing the reflection characteristics of optical elements of Example 13 and Comparative Examples 5 and 6.

The reflectivity of the optical element of Example 13 manufactured as described above was evaluated using an evaluation apparatus (V-550) available from JASCO Corporation. FIG. 45 shows the result.

Comparative Example 5

The reflection characteristics of an optical element having a surface on which a plurality of structures having no inflection points have been arranged were obtained through a simulation. FIG. 45 shows the result.
The conditions of the simulation are shown below.
Arrangement: hexagonal lattice
Pitch (track extending direction): 300 nm
Height: 200 nm
Shape: cone-like shape
Polarization: none Comparative Example 6

The reflection characteristics of an optical element having a surface on which a plurality of structures having no inflection points have been arranged were obtained through a simulation. FIG. 45 shows the result.
The conditions of the simulation are shown below.
Arrangement: hexagonal lattice
Pitch (track extending direction): 300 nm
Height: 300 nm
Shape: hanging bell shape
Polarization: none
The following is clear from FIG. 44.

There is obtained the shape of structures whose effective refractive index in the depth direction thereof gradually increases toward a base and has two inflection points.

Furthermore, such a shape is obtained using a method in which a process for making a master of optical discs is combined with an etching process, by adjusting the processing time of the etching treatment in the etching process and the ashing treatment.

The following is clear from FIG. 45.

In Example 13 that represents a shape whose effective refractive index has two inflection points, the reflectivity is reduced in a visible light region of about 450 nm to 700 nm compared with Comparative Example 5 that represents a cone-like shape.

In Example 13, the reflectivity tends to increase in a wavelength region longer than about 580 nm compared with Comparative Example 6. This is because the structures in Example 13 are smaller in height than those in Comparative Example 6. If the height of the structures in Example 13 is about 300 nm that is the height in Comparative Example 6, it is believed that the increase in reflectivity is suppressed even in a longer wavelength region. Note that the reflectivity in Example 13 is reduced in a wavelength region of about 450 nm to 580 nm compared with Comparative Example 6.

It is clear from the above description that good reflection characteristics can be achieved when an effective refractive index in the depth direction of structures gradually increases toward a base and has two or more inflection points.

Furthermore, the configurations of the above-described embodiments can be combined with each other as long as they do not depart from the spirit of the present invention.

Furthermore, in the above-described embodiments, the case where the present invention is applied to a liquid crystal display device has been described as an example, but the present invention can also be applied to various display devices other than the liquid crystal display device. For example, the present invention can be applied to various display devices such as a CRT (cathode ray tube) display, a plasma display panel (PDP), an electro luminescence (EL) display, and a surface-conduction electron-emitter display (SED).

Furthermore, in the above-described embodiments, the case where the optical element 1 is manufactured by a method in which a process for making a master of optical discs is combined with an etching process has been described as an example. However, the method for manufacturing the optical element 1 is not limited thereto, and any method may be adopted as long as an optical element having an effective refractive index in the depth direction that gradually increases toward a base and has two or more inflection points can be manufactured. For example, the optical element may be manufactured using electron-beam exposure or the like. Alternatively, the optical element may be manufactured by performing coating with a gradient film obtained by blending hollow silica or the like while the ratio of the hollow silica is changed such that the effective refractive index gradually changes or with a gradient film obtained through reactive sputtering.

Furthermore, in the above-described embodiments, a low refractive index layer may be further formed on the surface, of the base 2, where the structures 3 have been formed. Preferably, the low refractive index layer is mainly composed of a material having a lower refractive index than the materials constituting the base 2, the structures 3, and the secondary structures 4. Examples of the material of such a low refractive index layer include organic materials such as fluorine resins and inorganic low refractive index materials such as LiF and $MgF_2$.

Furthermore, in the above-described embodiments, the configuration in which the surface of the base has the structures 3 that are projections has been described as an example, but a configuration in which the surface of the base has structures that are depressions may be adopted. Herein, when the structures 3 are depressions, the height H of the structures 3 in formula (1) or the like is replaced with the depth H of the structures 3.

Furthermore, in the above-described embodiments, the optical element may be manufactured by thermal transfer. Specifically, the optical element 1 may be manufactured by heating a base mainly composed of a thermoplastic resin and then by pressing a stamp (mold) such as the roll master 11 or the disc master 41 against the base sufficiently softened by the heat treatment. Moreover, the optical element may be manufactured by injection molding.

Furthermore, in the above-described embodiments, by suitably changing the pitch of structures, diffracted light is generated in the oblique direction from the front, whereby a peep prevention function may be imparted to the optical element.

Furthermore, in the above-described embodiments, the case where the structures that are depressions or projections are formed on the outer circumferential surface of the column- or cylinder-shaped master has been described as an example. However, when the master is cylinder-shaped, the structures that are depressions or projections may be formed on the inner circumferential surface of the master.

Furthermore, in the above-described embodiments, an example in which the present invention is applied to a resistive film touch panel has been described. However, the present invention is not limited to the example, and can be applied to, for example, a capacitive, ultrasonic, or optical touch panel.

Furthermore, in the above-described embodiments, the case where the plurality of structures are regularly arranged on the surface of the base in a hexagonal lattice, a tetragonal lattice, or the like has been described as an example, but the plurality of structures may be arranged on the surface of the base at random.

Furthermore, in the above-described embodiments, the case where a single thin film composed of a material whose composition is gradually (continuously) changed in the thickness direction is used as the gradient film has been described as an example, but a stacked film obtained by stacking, on the base, a plurality of thin films having slightly different refractive indices may be used as the gradient film.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

Explanation of Reference Numerals
- 1: optical element
- 2: base
- 2a: gap
- 3: structure, primary structure
- 3t: top
- 3b: bottom
- 3c: hem
- 4: secondary structure
- 4a: uneven portion
- 5: structure
- 6: gradient film
- 7: light-absorbing layer
- 8a: adhesive layer
- 8b: detachment layer
- 9: transparent conductive film
- 10: metal film
- 11: roll master
- 12: master
- 13: structure
- 12a: gap
- 51: liquid crystal panel
- 51a, 51b: polarizer
- 52: anti-reflective polarizer
- 53: backlight
- 54: front member
- 61: resin layer
- 62: mold
- 71: package
- 72: image sensor element
- 73: cover glass
- 81: barrel
- 90: touch panel
- Pa: first changing point
- Pb: second changing point
- Nn: inflection point
- St: slope step
- st: parallel step

The invention claimed is:

1. An optical element having an anti-reflection function comprising:
   a base; and
   a large number of structures arranged on a surface of the base, the structures being projections or depressions, wherein the structures are arranged in a hexagonal lattice, a quasi-hexagonal lattice, a tetragonal lattice, or a quasi-tetragonal lattice at a pitch shorter than or equal to a wavelength of light in a use environment, wherein an effective refractive index in a depth direction of the structures gradually increases toward the base and has two or more inflection points, wherein at least one pair of a first changing point and a second changing point formed in that order in a direction from the top to the bottom of the structures are formed on a side surface of the structures excluding the top and the bottom, and wherein a slope in the direction from the top to the bottom of the structures becomes gentler at the first changing point and then becomes steeper at the second changing point.

2. The optical element according to claim 1, wherein the structures have two or more steps between the top and the bottom of the structures, the steps including either the top or the bottom or both the top and the bottom.

3. The optical element according to claim 2, wherein the steps are slope steps that are inclined with respect to the surface of the base.

4. The optical element according to claim 1, wherein the structures have a curved surface so as to become wider from the top to the bottom of the structures.

5. The optical element according to claim 1, wherein the top of the structures has a convex curved surface.

6. The optical element according to claim 1, wherein the structures have a hem at the bottom thereof, the hem broadening with a gradually decreasing slope.

7. The optical element according to claim 1, wherein a change in the effective refractive index in the depth direction of the structures on the top side of the structures is greater than an average of a slope of the effective refractive index.

8. The optical element according to claim 1, wherein a change in the effective refractive index in the depth direction of the structures on the base side of the structures is greater than an average of a slope of the effective refractive index.

9. The optical element according to claim 1, wherein the light in the use environment is visible light.

10. The optical element according to claim 1, wherein the height of the structures is smaller than or equal to an average of the wavelength of the light in the use environment.

11. The optical element according to claim 1, wherein the structures have a conical form, and the structures are two-dimensionally arranged on the surface of the base.

12. The optical element according to claim 11, wherein the conical form is a cone-like shape or an elliptic cone-like shape whose top has a curvature, or a truncated cone-like shape or a truncated elliptic cone-like shape.

13. A display device comprising an optical element having:
a base; and
a large number of structures arranged on a surface of the base, the structures being projections or depressions, wherein the structures are arranged in a hexagonal lattice, a quasi-hexagonal lattice, a tetragonal lattice, or a quasi-tetragonal lattice at a pitch shorter than or equal to a wavelength of light in a use environment, wherein an effective refractive index in a depth direction of the structures gradually increases toward the base and has two or more inflection points, wherein at least one pair of a first changing point and a second changing point formed in that order in a direction from the top to the bottom of the structures are formed on a side surface of the structures excluding the top and the bottom, and wherein a slope in the direction from the top to the bottom of the structures becomes gentler at the first changing point and then becomes steeper at the second changing point.

14. An optical component having an anti-reflection function comprising:
an optical component; and
a large number of structures arranged on a light-entering surface of the optical component, the structures being projections or depressions, wherein the structures are arranged in a hexagonal lattice, a quasi-hexagonal lattice, a tetragonal lattice, or a quasi-tetragonal lattice at a pitch shorter than or equal to a wavelength of light in a use environment, wherein an effective refractive index in a depth direction of the structures gradually increases toward a base and has two or more inflection points, wherein at least one pair of a first changing point and a second changing point formed in that order in a direction from the top to the bottom of the structures are fanned on a side surface of the structures excluding the top and the bottom, and wherein a slope in the direction from the top to the bottom of the structures becomes gentler at the first changing point and then becomes steeper at the second changing point.

15. The optical component having an anti-reflection function according to claim 14, wherein the optical component is one of a polarizer, a lens, an optical waveguide, a window material, and a display element.

16. A master comprising:
a base; and
a large number of structures arranged on a surface of the base, the structures being projections or depressions, wherein the structures are used for forming a surface shape of an optical element having an anti-reflection function, the structures are periodically arranged in a hexagonal lattice, a quasi-hexagonal lattice, a tetragonal lattice, or a quasi-tetragonal lattice at a pitch shorter than or equal to a wavelength of light in an environment where the optical element is used, wherein an effective refractive index in a depth direction of the optical element forming by the structures gradually increases toward the base of the optical element and has two or more inflection points, wherein at least one pair of a first changing point and a second changing point formed in that order in a direction from the top to the bottom of the structures are formed on a side surface of the structures excluding the top and the bottom, and wherein a slope in the direction from the top to the bottom of the structures becomes gentler at the first changing point and then becomes steeper at the second changing point.

17. An optical element having an anti-reflection function comprising:
a base; and
a large number of structures arranged on a surface of the base, the structures being projections or depressions, wherein the structures are arranged at a pitch shorter than or equal to a wavelength of light in a use environment, the structures have a cone-like shape or an elliptic cone-like shape whose top has a curvature, or a truncated cone-like shape or a truncated elliptic cone-like shape, wherein an effective refractive index in a depth direction of the structures gradually increases toward the base and has two or more inflection points, wherein at least one pair of a first changing point and a second changing point formed in that order in a direction from the top to the bottom of the structures are formed on a side surface of the structures excluding the top and the bottom, and wherein a slope in the direction from the top to the bottom of the structures becomes gentler at the first changing point and then becomes steeper at the second changing point.

18. The optical element according to claim 17, wherein the structures have a pillar shape that extends in a single direction on the surface of the base, and the pillar-shaped structures are one-dimensionally arranged on the surface of the base.

* * * * *